(12) United States Patent
Dommisse et al.

(10) Patent No.: US 7,986,319 B2
(45) Date of Patent: Jul. 26, 2011

(54) METHOD AND SYSTEM FOR DYNAMIC, THREE-DIMENSIONAL GEOLOGICAL INTERPRETATION AND MODELING

(75) Inventors: Robin Dommisse, Austin, TX (US); Tron Isaksen, Austin, TX (US)

(73) Assignee: Austin Gemodeling, Inc., Austin, TX (US)

( * ) Notice: Subject to any disclaimer, the term of this patent is extended or adjusted under 35 U.S.C. 154(b) by 968 days.

(21) Appl. No.: 11/832,514

(22) Filed: Aug. 1, 2007

(65) Prior Publication Data

US 2009/0043507 A1    Feb. 12, 2009

(51) Int. Cl.
*G06T 15/00* (2006.01)

(52) U.S. Cl. ............ 345/419; 345/427; 345/440; 702/6; 702/14; 702/16; 702/17; 715/850

(58) Field of Classification Search .................. 345/419, 345/420, 440, 427; 702/6, 14, 16, 17
See application file for complete search history.

(56) References Cited

U.S. PATENT DOCUMENTS

| | | | | |
|---|---|---|---|---|
| 6,138,075 | A * | 10/2000 | Yost | 702/14 |
| 6,665,117 | B2 * | 12/2003 | Neff et al. | 359/451 |
| 7,328,139 | B2 * | 2/2008 | Dulac et al. | 703/2 |
| 7,373,612 | B2 * | 5/2008 | Risch et al. | 715/850 |
| 2002/0055868 | A1 * | 5/2002 | Dusevic et al. | 705/9 |
| 2007/0276604 | A1 * | 11/2007 | Williams et al. | 702/16 |

OTHER PUBLICATIONS

Brandale et al. "Geological Interpretation makes earth models easier to build", Neitherlands, Jun. 11-15, 2001.*

* cited by examiner

*Primary Examiner* — Kimbinh T Nguyen
(74) *Attorney, Agent, or Firm* — Hulsey, P.C.; William N. Hulsey, III; Loren T. Smith

(57) ABSTRACT

Techniques and a system for performing geological interpretation operations in support of energy resources exploration and production perform well log correlation operations for generating a set of graphical data describing the predetermined geological region. The process and system interpret the geological environment of the predetermined geological region from measured surface and fault data associated with the predetermined geological region. Allowing the user to query and filter graphical data representing the predetermined geological region, the method and system present manipulable three-dimensional geological interpretations of two-dimensional geological data relating to the predetermined geological region and provide displays of base map features associated with the predetermined geological region. The method and system automatically update the manipulable three-dimensional geological interpretations of two-dimensional data relating to the predetermined geological region, as well as calculate three-dimensional well log and seismic interpretations of geological data relating to the predetermined geological region.

93 Claims, 44 Drawing Sheets
(40 of 44 Drawing Sheet(s) Filed in Color)

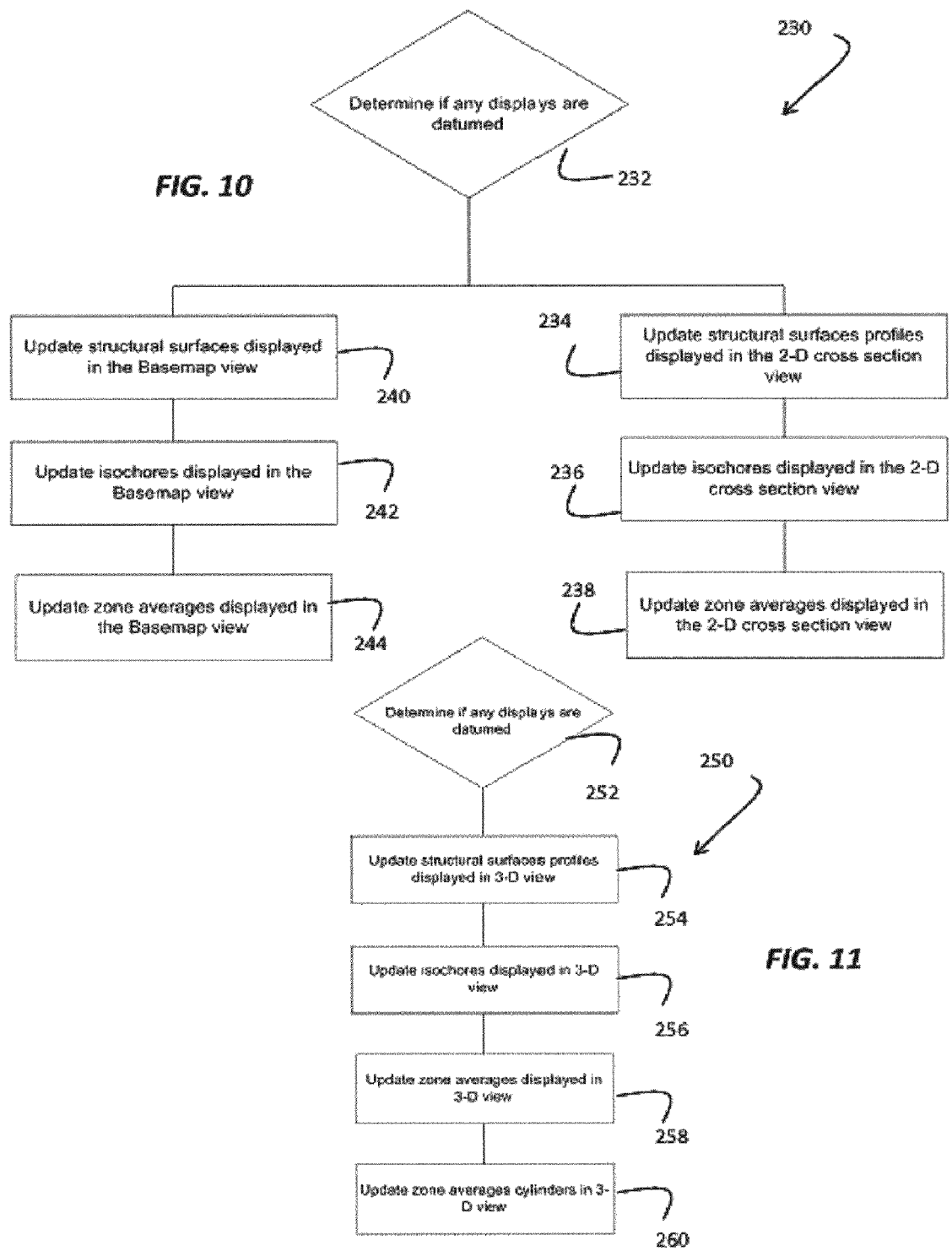

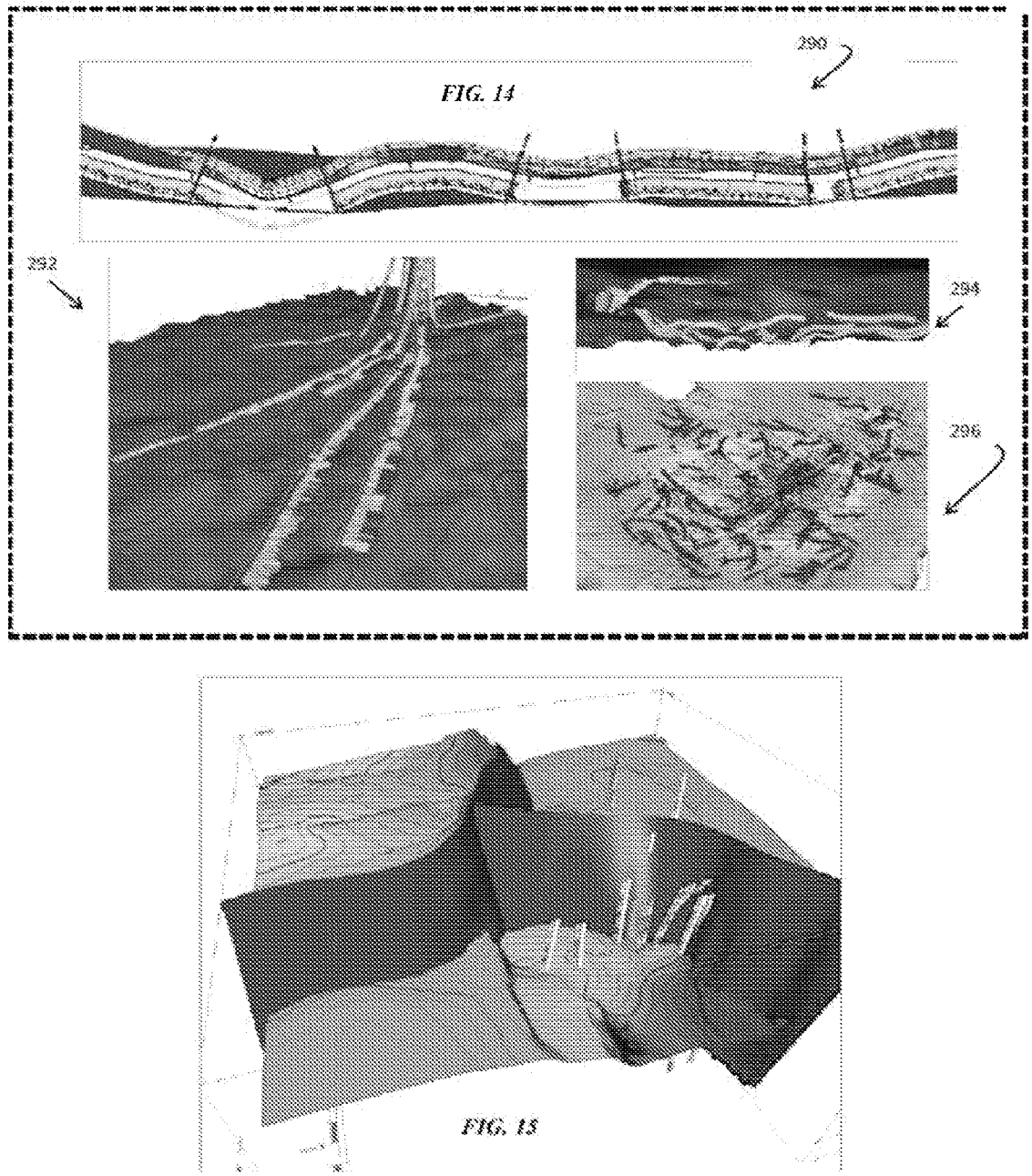

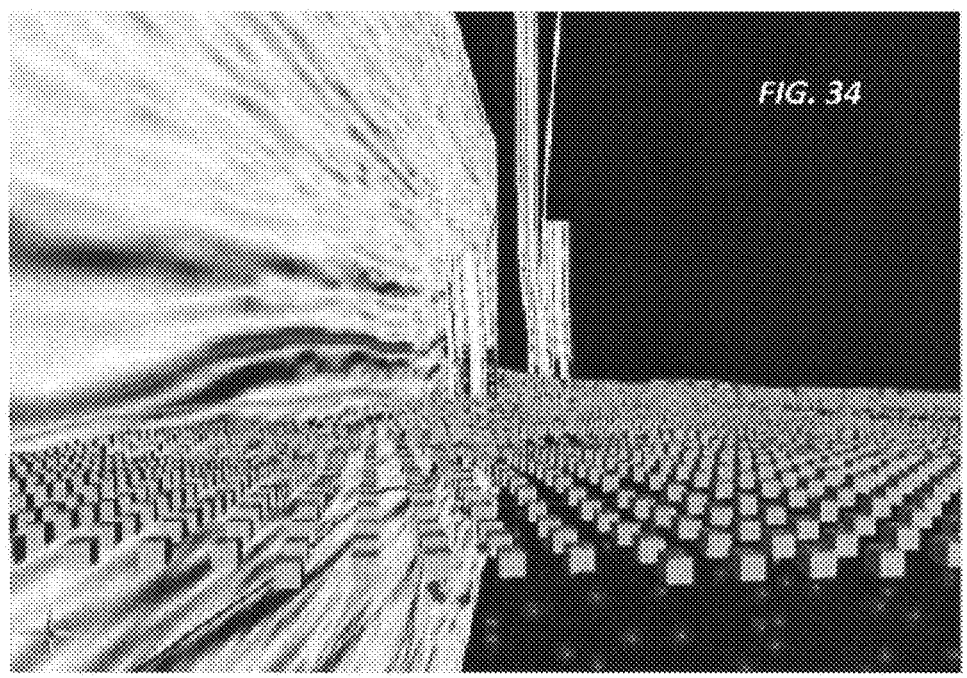

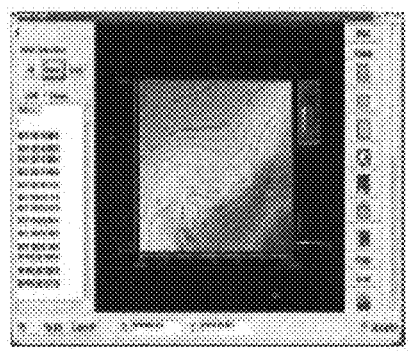
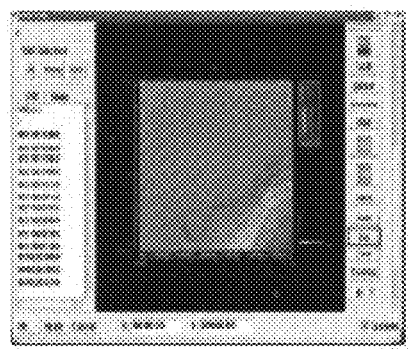
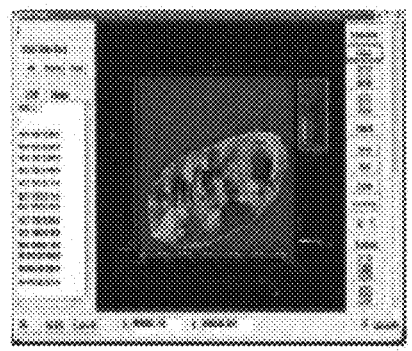
*FIG. 46*
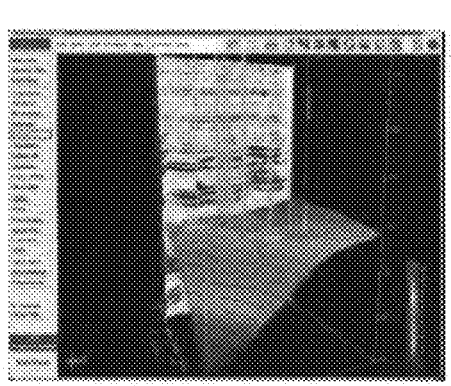
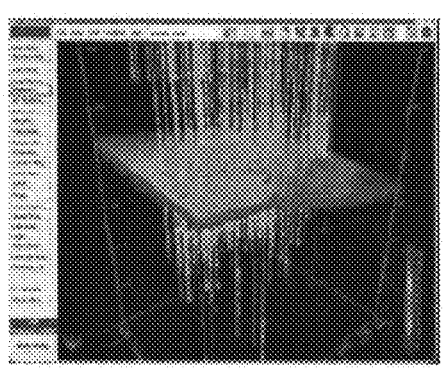
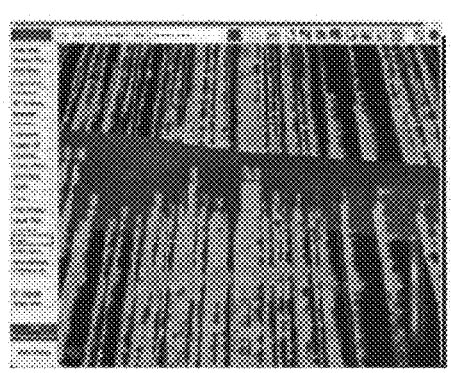
*FIG. 47*

METHOD AND SYSTEM FOR DYNAMIC, THREE-DIMENSIONAL GEOLOGICAL INTERPRETATION AND MODELING

FIELD

The disclosed subject matter relates to geological information analysis and processing methods and systems. More particularly, this disclosure relates to a method and system for dynamic, three-dimensional geological interpretation and modeling.

DESCRIPTION OF THE RELATED ART

Known well log correlation software tools succeed in transferring the paper-based workflows to the computer workstation. The drawback of such tools includes that they solve correlation and mapping problems in a two-dimensional environment, merely replacing the paper workflows with computer screens without truly speeding the geological interpretation process. Current three-dimensional modeling applications are not capable of rendering real-time results, because they do not work practically as geological interpretation tools. Not surprisingly, many geologists in both major and independent oil and gas companies continue to prefer to perform geological interpretation using traditional hard copy well logs. With such systems, three-dimensional visualization is implemented as an afterthought or is introduced during the three-dimensional geological modeling phase, where such visualization is often performed by expert three-dimensional modelers or reservoir engineers instead of interpreting geoscientists.

Just as major oil companies have embraced sequence stratigraphic concepts and computer technology in exploration and production, so, too, must independent exploration and production companies. This is because a company's success increasingly depends on data management, visualization, stratigraphic analysis or interpretation technologies. Moreover, these activities depend on the speed at which they develop and deliver a energy resource (oil or gas) production prospect to an investor.

A typical interpretation system example is its ability to visualize and correlate hundreds of horizontal wells directly in three-dimensional, thus significantly simplifying the geological interpretation process involving complex well trajectories. Currently, geoscientists have to use separate applications for well-log correlation, surface modeling, and mapping, and for three-dimensional modeling and visualization. The functional development of these applications has stagnated in recent years, despite costing oil and gas companies millions of dollars in maintenance and deployment costs.

Today, market-leading products are not easily portable or scalable. Instead of creating an environment of continuous innovation, no known solutions enable oil and gas companies to optimize their workflows through timesavings or the use of new features. The known systems require expensive and complicated software maintenance and support, essentially due to their lack of integration between the ever-growing lists of PC or smaller applications.

One key limitation of known systems supporting geological interpretation, derives from the use of centralized databases. Centralized database systems have been invaluable in bringing order to the chaotic abundance of data managed by asset teams and interpreters. Building a database project forces the user to address data related issues such as quality and relevance. Because data is obtained from a wide variety of sources, this is not a trivial task and often requires days, and sometimes weeks, to complete. One of the drawbacks of centralized database systems is an inflexibility regarding the quick integration of certain geological data types. Database schemas also are rigidly defined, forcing the user to spend significant amounts of time massaging data in preparation for database loading. As a result, exclusion of important data occurs due to a lack of time.

Another limitation of known systems and process for geological interpretation is that well plans created using static geological interpretation and modeling tools rarely match the real world geology encountered during drilling. Conventional well planning solutions spread the interpretation while drilling (IWD) workflows across multiple applications and data management modules, making it difficult and time consuming for energy resource exploration and production teams to integrate new data in order to reconstruct the geological interpretation. Increasingly more complex drilling environments call for more accurate predictive well planning, using real-time operational decisions to drill more cost-effective wells.

One of the advantages of sequence stratigraphy in well log interpretation, for example, lies in the power of its predictive capacity. A robust interpretation, based on complete log suites, cores and sequence stratigraphic correlation, may help predict reservoir-prone facies. The speed and accuracy of this process has been greatly enhanced by advancements in computer technology and more versatile software programs.

However, for those who are trying to compete using paper-based interpretation workflows, the development of a robust interpretation is a slow and tedious process. Furthermore, with each new data point, updating paper cross-sections and maps is frustratingly slow and cumbersome. Valuable time is therefore lost throughout the entire process, from data collection to the delivery of a finalized prospect.

In traditional interpretation application suites, if a geoscientist identifies an interpretation problem in a three-dimensional modeling application, he must return to his two-dimensional well log correlation software to change the interpretation, then re-grid the horizons in the mapping software, before returning to the three-dimensional modeling software to observe the changes. This process may take from hours to days to complete, and is tediously repetitive, costing valuable time and resources before finalizing an interpretation.

To address the two-dimensional focus of traditional well log correlation and mapping software, a need exists for new geological interpretation tools to enable transitioning the geological interpretation process from the two-dimensional domain to the three-dimensional domain.

There is the need for a system that enables a geologist to solve complex geological interpretation problems that cannot be resolved using software that relies on traditional two-dimensional technology.

There is a need for a system that employs computer technologies to create a three-dimensional environment of sequence stratigraphic interpretation workflows.

There is a further need for a method and system that provides drilling and production businesses having limited capital and human resources face the ability to upgrade their interpretation technology and speed to gain a competitive edge.

There is yet the need for a geological interpretation process and supporting system that enable real-time updates and interactive three-dimensional geological interpretation environment optimized for sequence stratigraphic interpretation.

SUMMARY

Techniques here disclosed include a geological interpretation method and system replaces that replaces known two-dimensional process with an integrated, three-dimensional geological interpretation environment. The disclosed subject matter combines seismic and well-log data into an interactive three-dimensional geological interpretation environment. The disclosed geological interpretation system focuses on interpretation speed, ease of use, and improved accuracy. In essence, the presently disclosed subject matter allows a user to perform geology on a computer workstation to a degree not previously possible.

According to one aspect of the disclosed subject matter, there is provided a method and system for performing geological interpretation operations in support of energy resources exploration and production. The disclosed method and system perform well log correlation operations for generating a set of graphical data that describes the predetermined geological region. The process and system interpret the geological environment of the predetermined geological region from measured surface and fault data associated with the predetermined geological region. The method and system allow the user to query and filter graphical data representing the predetermined geological region, the method and system present manipulable three-dimensional geological interpretations of two-dimensional geological data relating to the predetermined geological region and provide displays of base map features associated with the predetermined geological region. The method and system automatically update the manipulable three-dimensional geological interpretations of two-dimensional data relating to the predetermined geological region, as well as create three-dimensional well log and seismic interpretations of geological data relating to the predetermined geological region. Moreover, time-related visualizations of production volumes relating to the predetermined geological region are provided for enhancing the ability to interpret and model various geological properties of various geological regions.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGURES and detailed description. It is intended that all such additional systems, methods, features and advantages be included within this description, be within the scope of the accompanying claims.

BRIEF DESCRIPTIONS OF THE DRAWINGS

The file of this patent contains at least one drawing executed in color. Copies of this patent with color drawing(s) will be provided by the Patent and Trademark Office upon request and payment of the necessary fee. The features, nature, and advantages of the disclosed subject matter will become more apparent from the detailed description set forth below when taken in conjunction with the drawings in which like reference characters identify correspondingly throughout and wherein:

FIGS. 1 and 2 an exemplary system for employing the novel aspects of the presently disclosed multi-dimensional geological interpretation method and system;

FIG. 3 shows selected aspects of the three-dimensional interpretation environment cascade technology as here disclosed;

FIGS. 4 and 5 presents various displays and interpretation functions provided by the disclosed subject matter;

FIG. 6 provides a diagram representing the automatic cascading updating process as presently disclosed;

FIGS. 7 through 11 show in further detail the various aspects of the automatic cascading updating process as presently disclosed;

FIG. 12 portrays one embodiment of a geological interpretation as a single workflow application according to the present disclosure;

FIG. 14 shows the disclosed functions of immediately updating all interpretational changes in all views of the present geological interpretation system;

FIG. 15 shows how the present system communicates data with a plurality of third-party geological data management systems;

Figure 20:
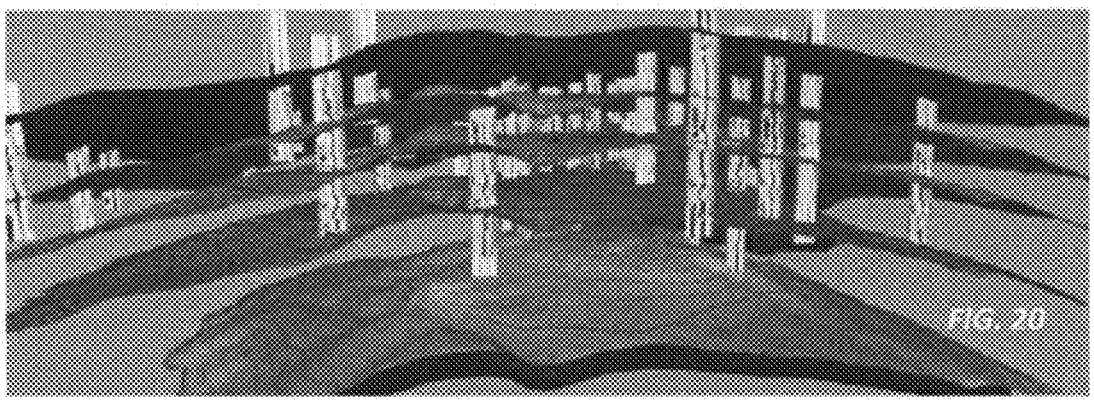
Figure 21:
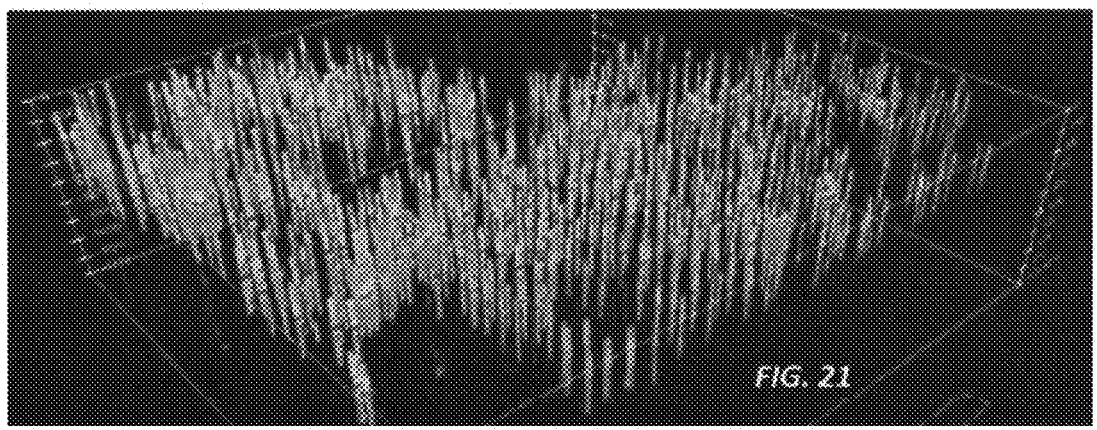
Figure 22:
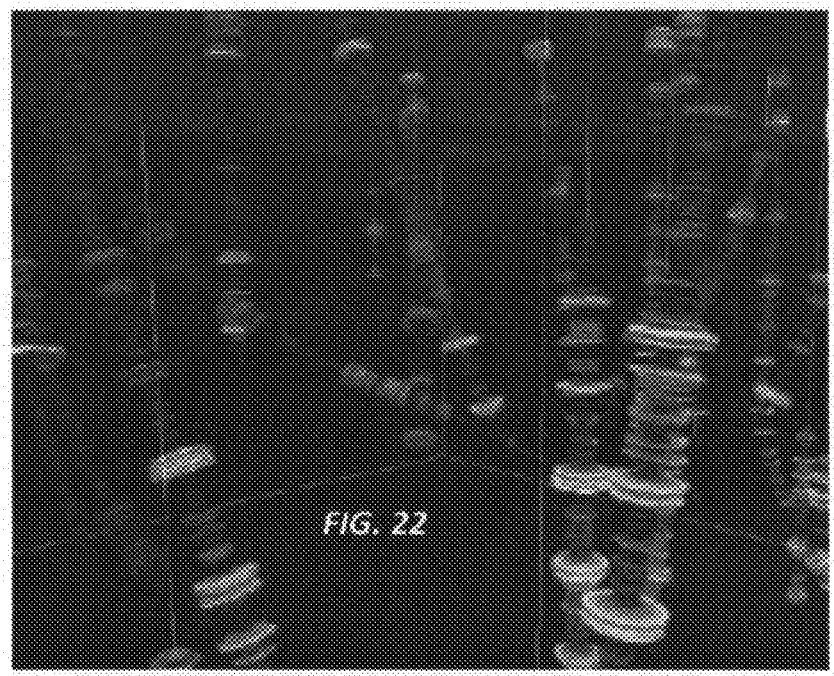
Figure 23:
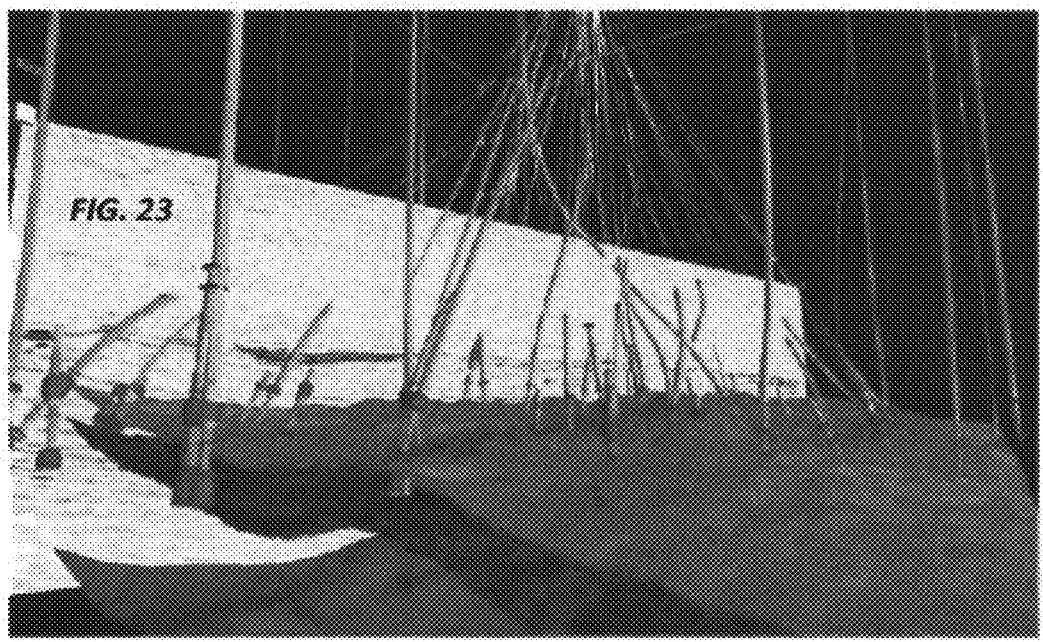
Figure 24:
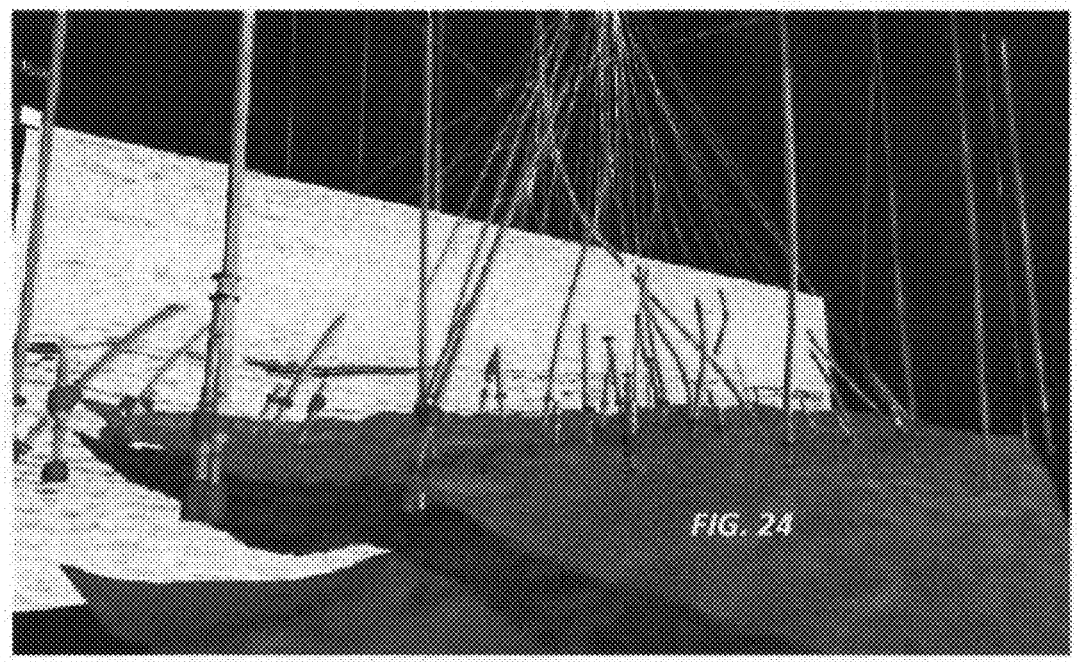
Figure 25:
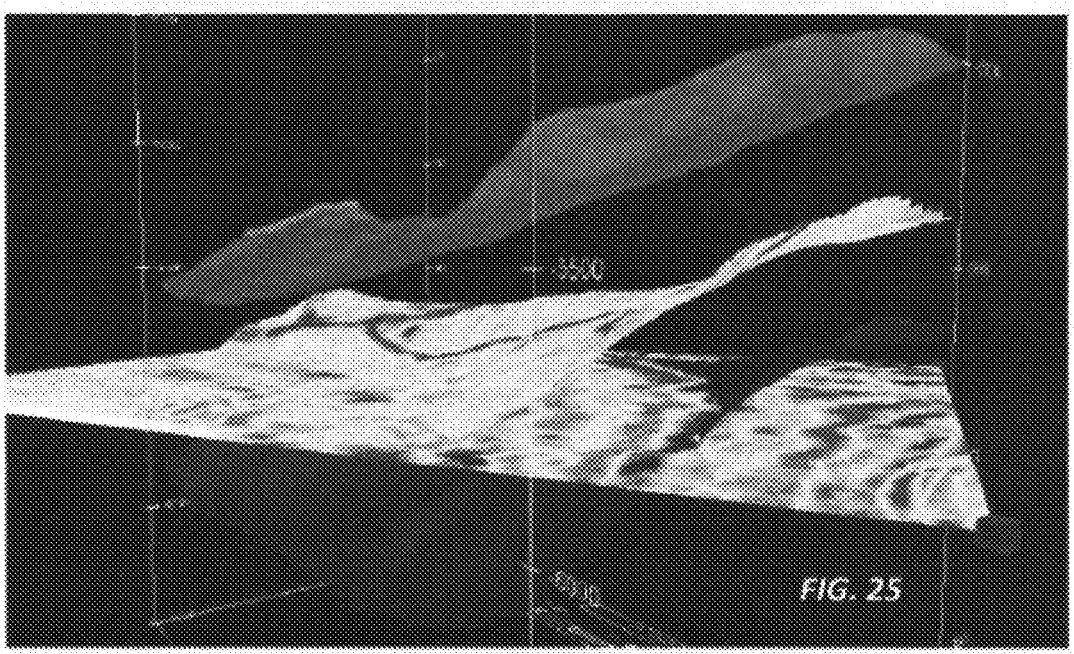
Figure 26:
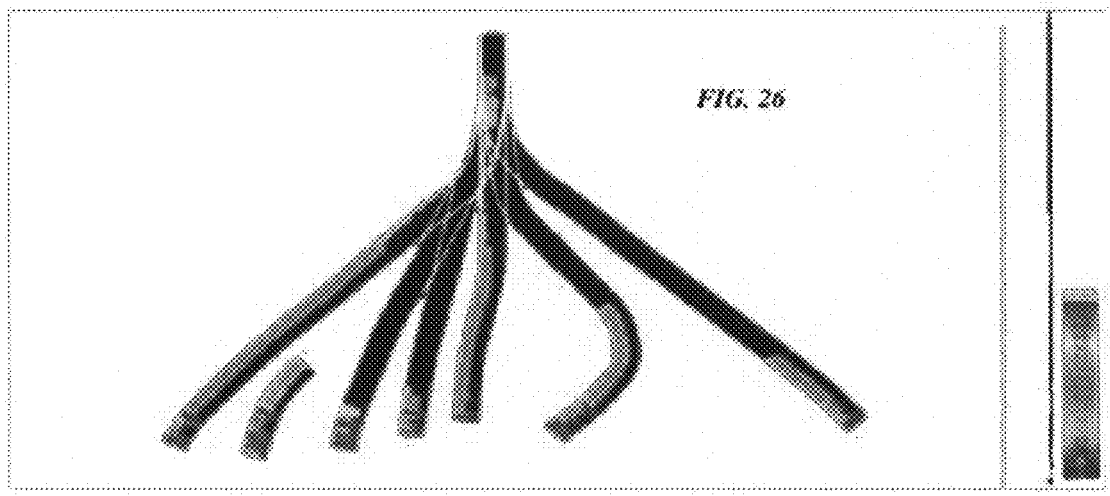
Figure 31:
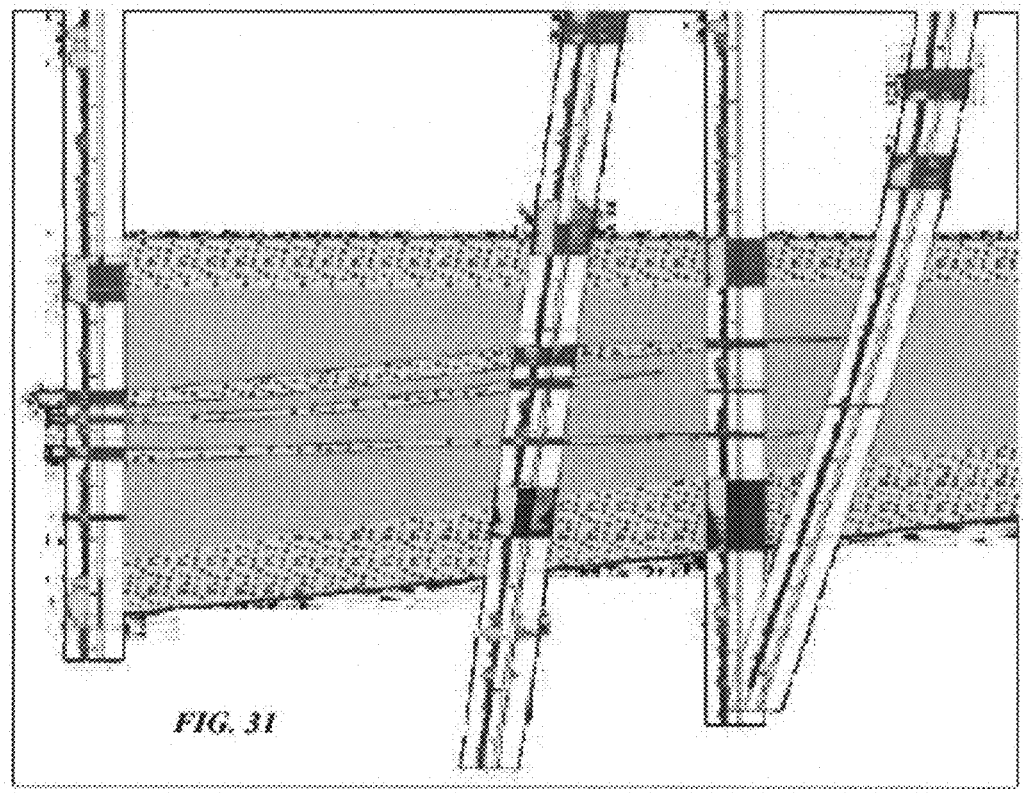
Figure 32:
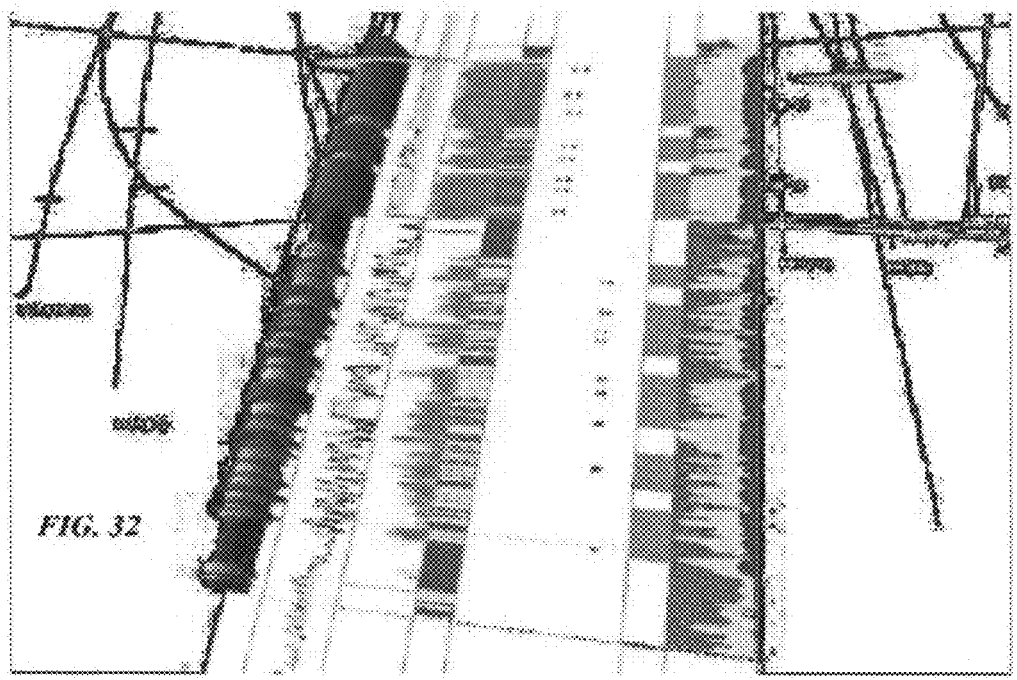
Figure 35:
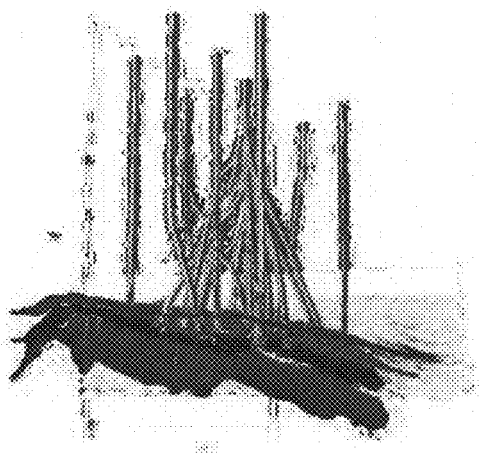
Figure 36:
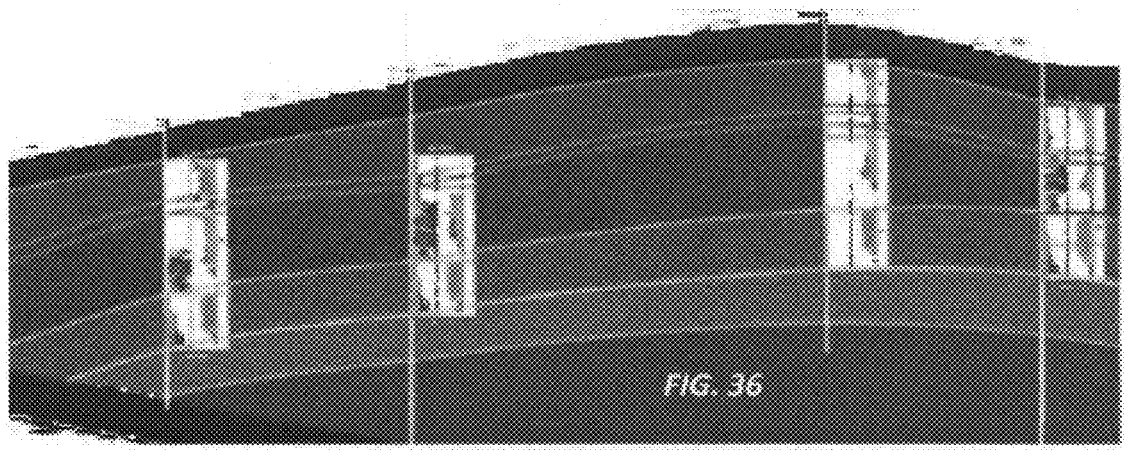
Figure 37:
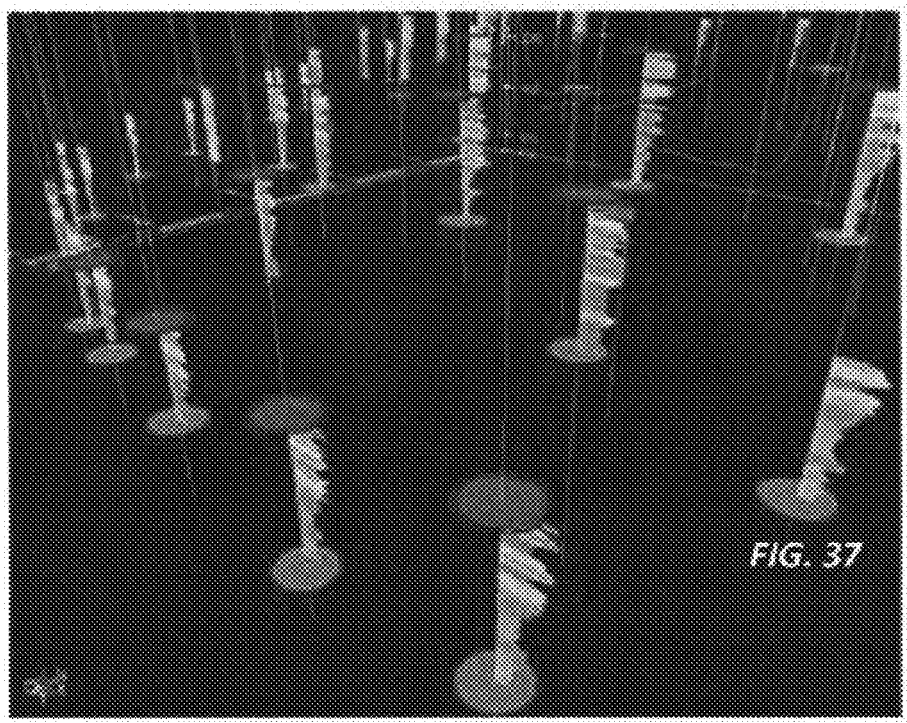
Figure 38:
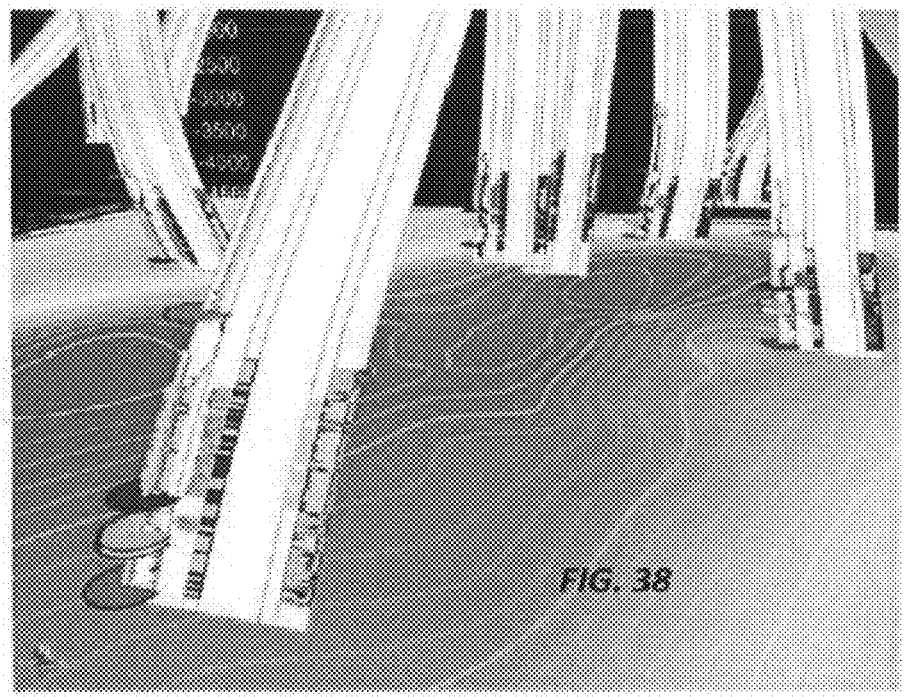
Figure 39:
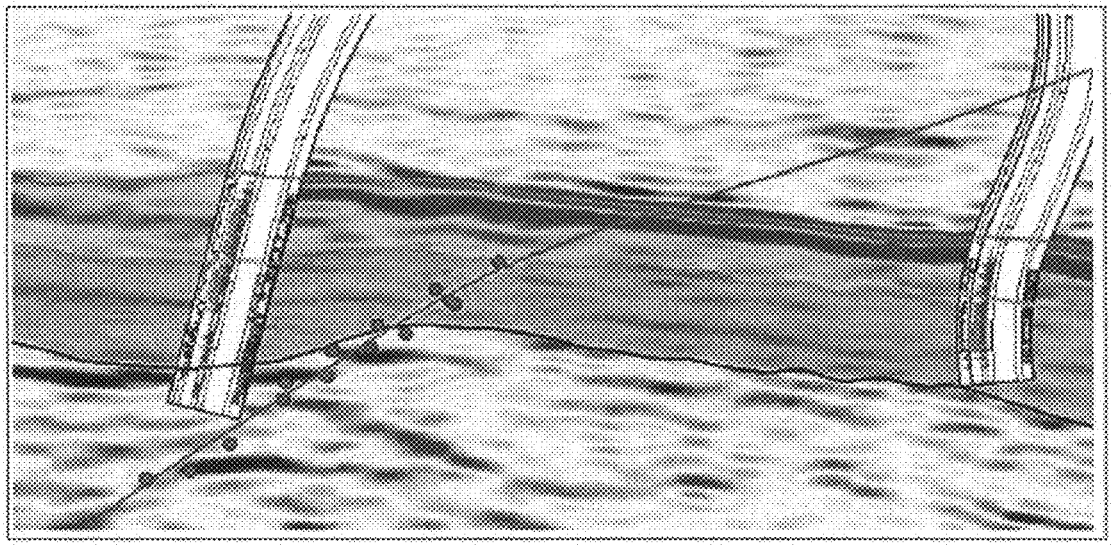
Figure 40:
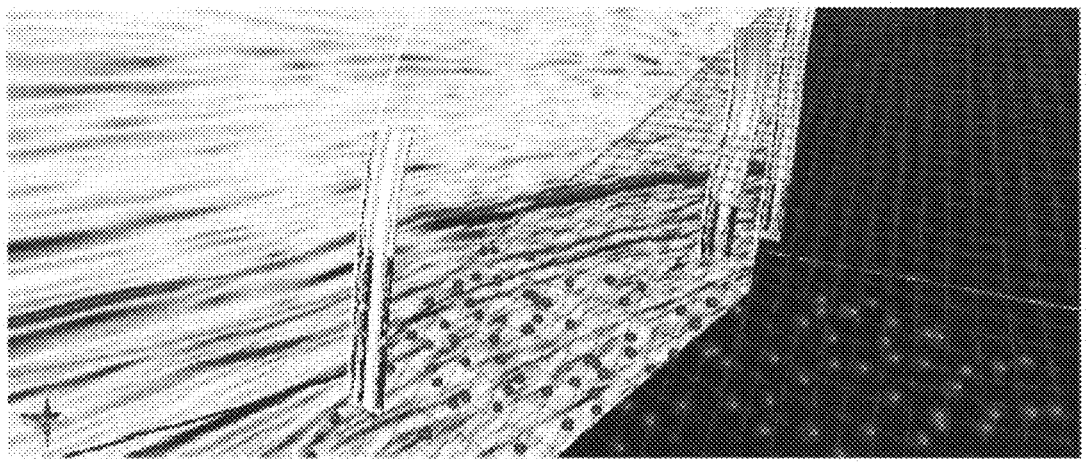
Figure 41:
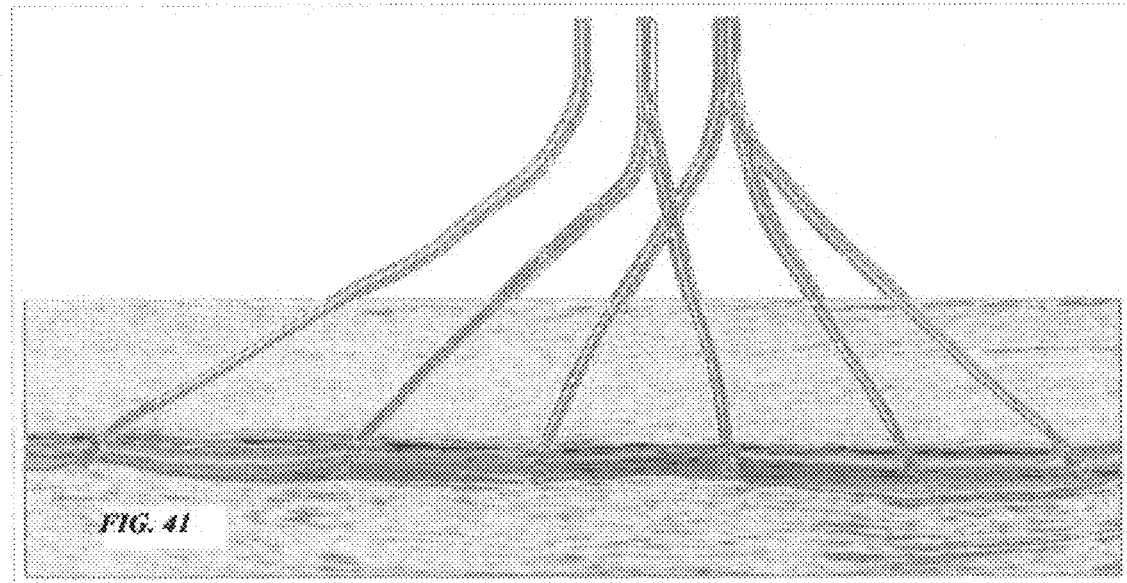
Figure 42:
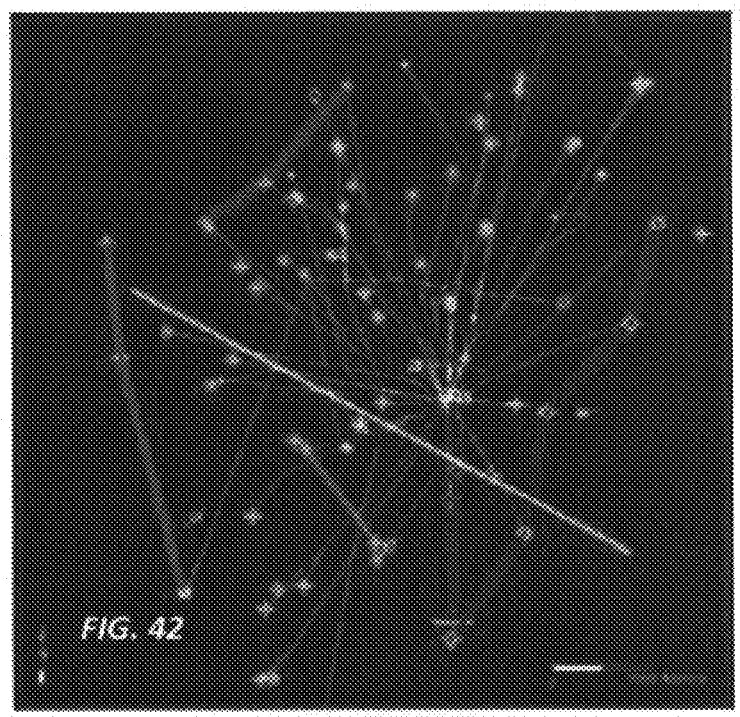
Figure 43:
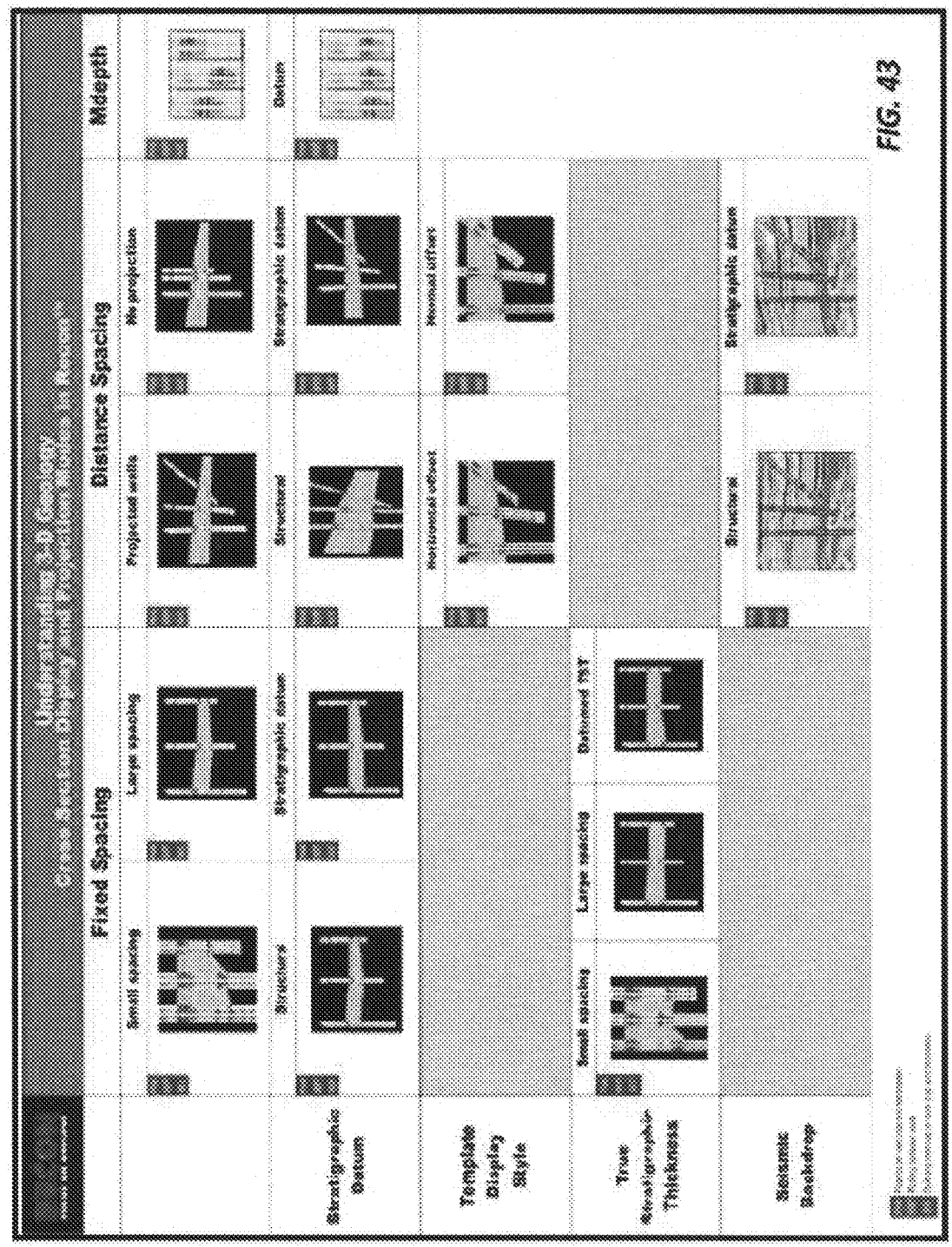
Figure 44:
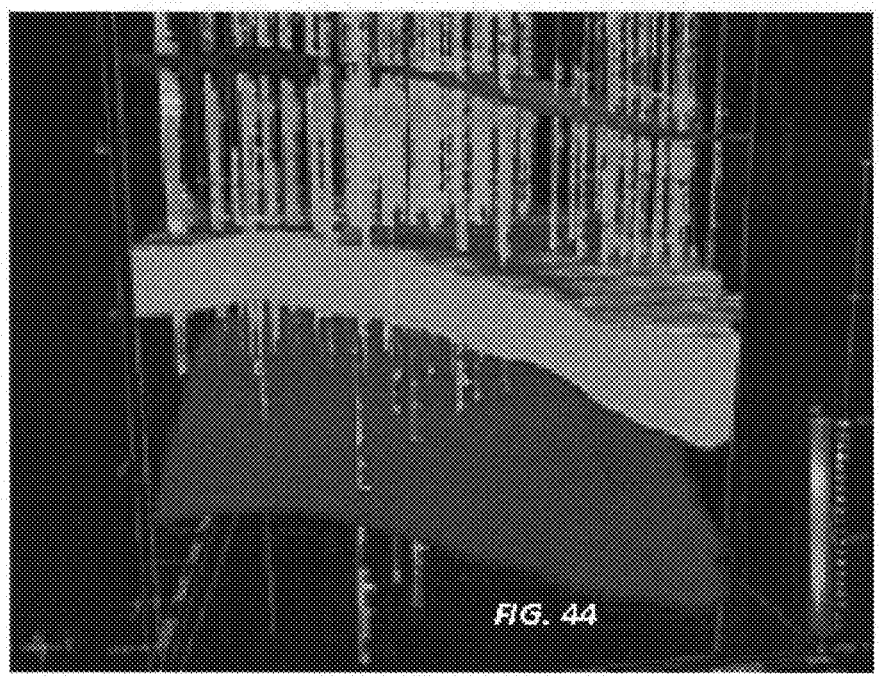
Figure 45:
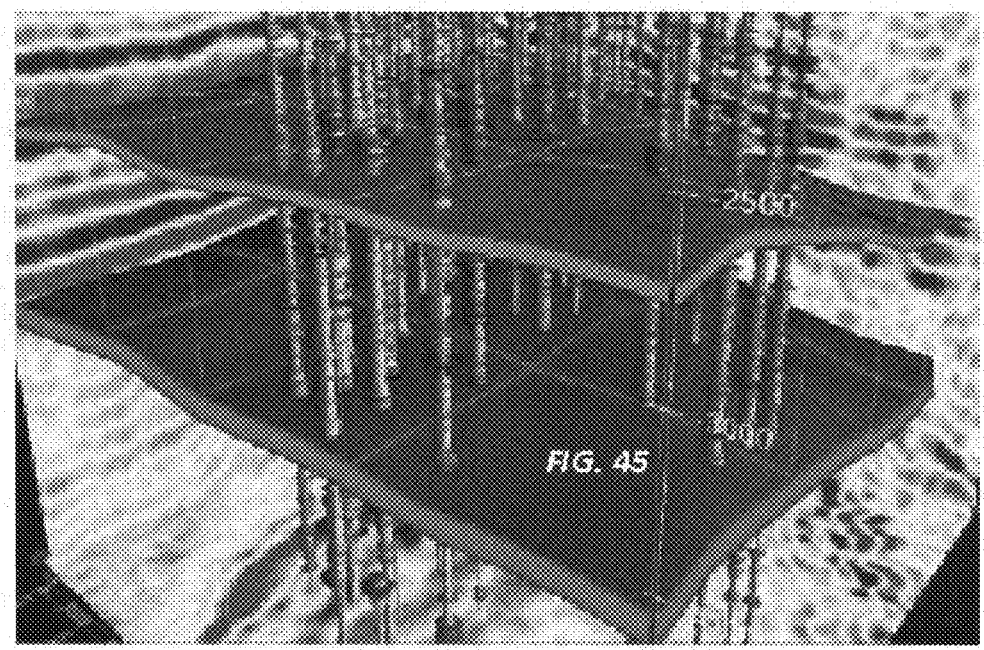
Figure 48:
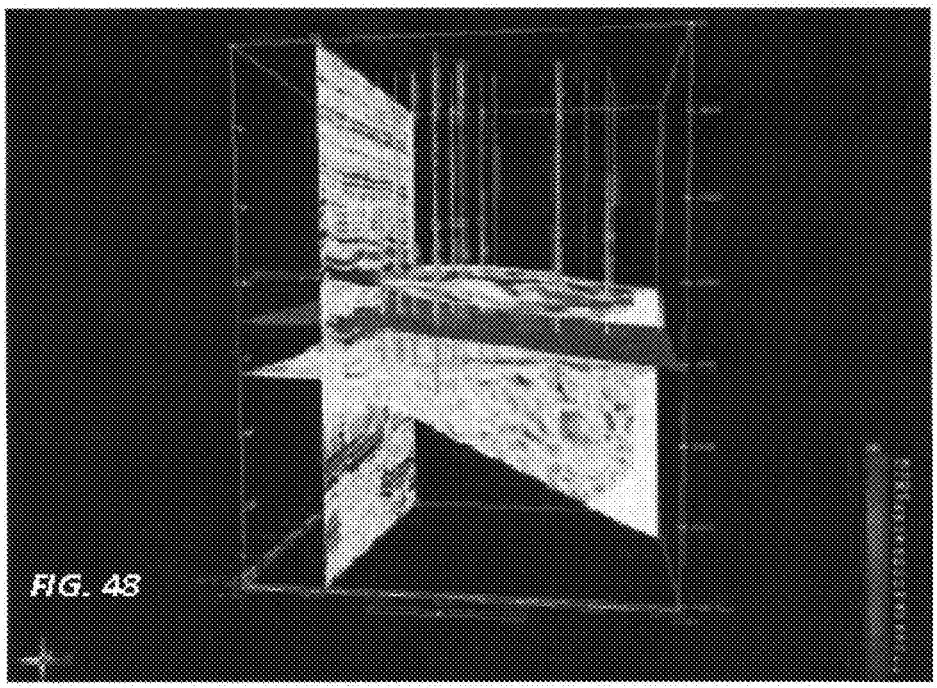
Figure 49:
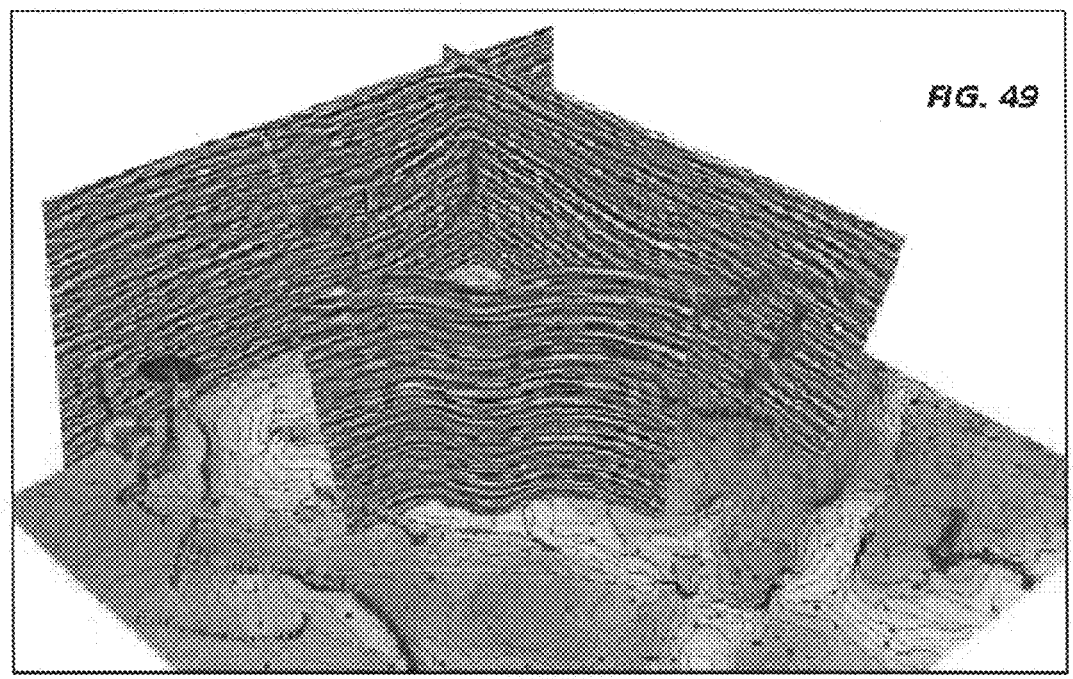
Figure 50:
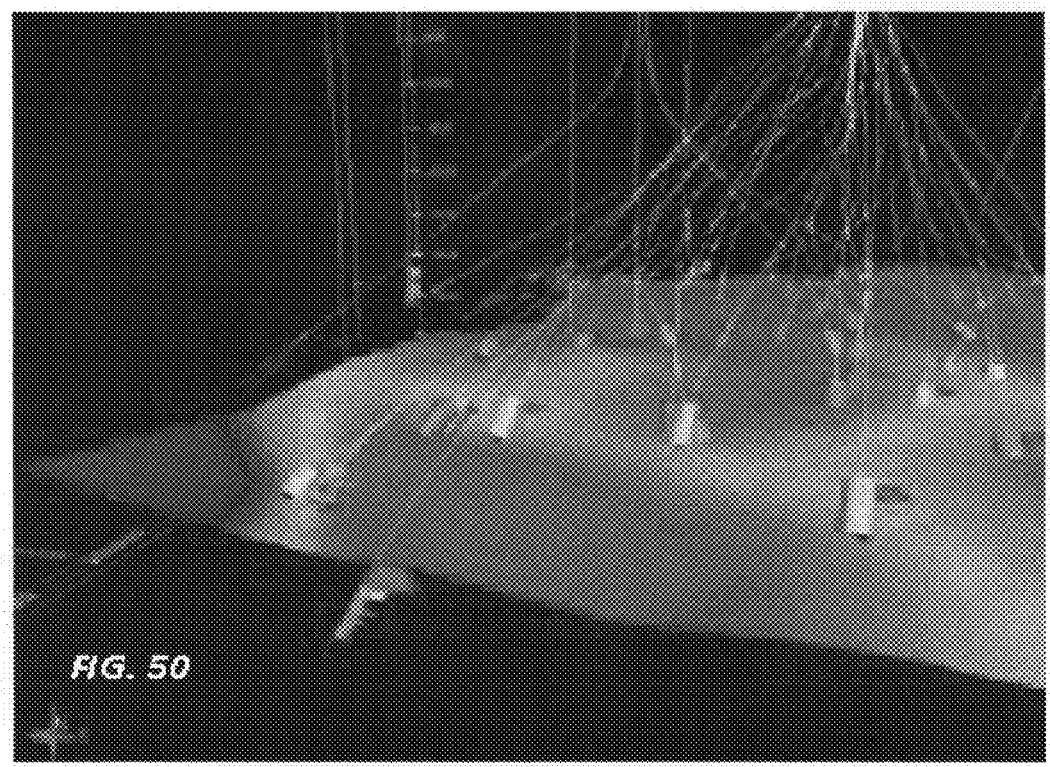
Figure 51:
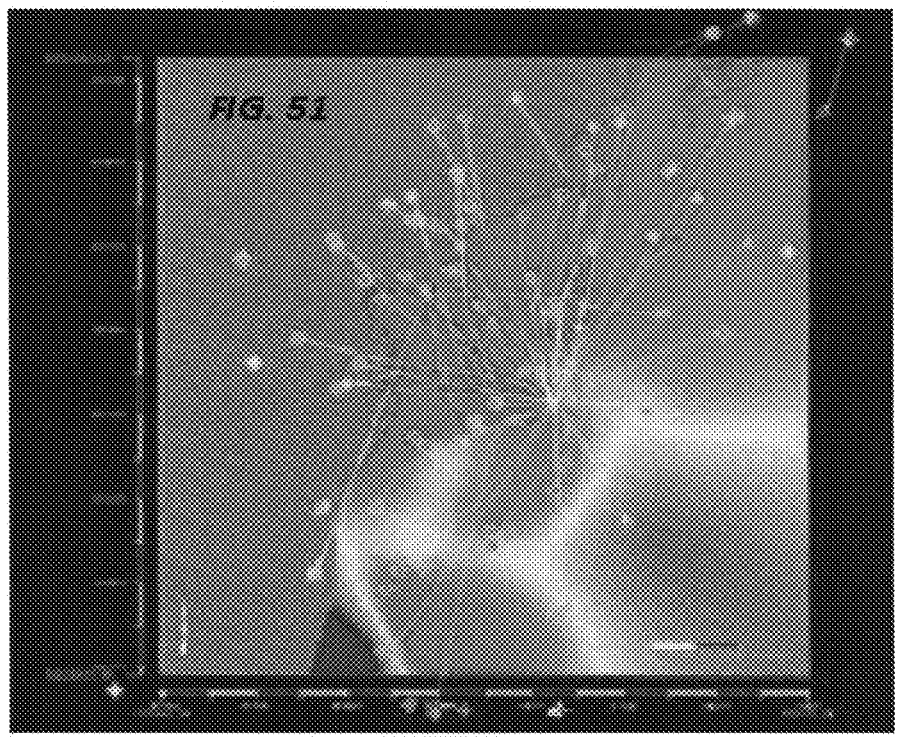
Figure 52:
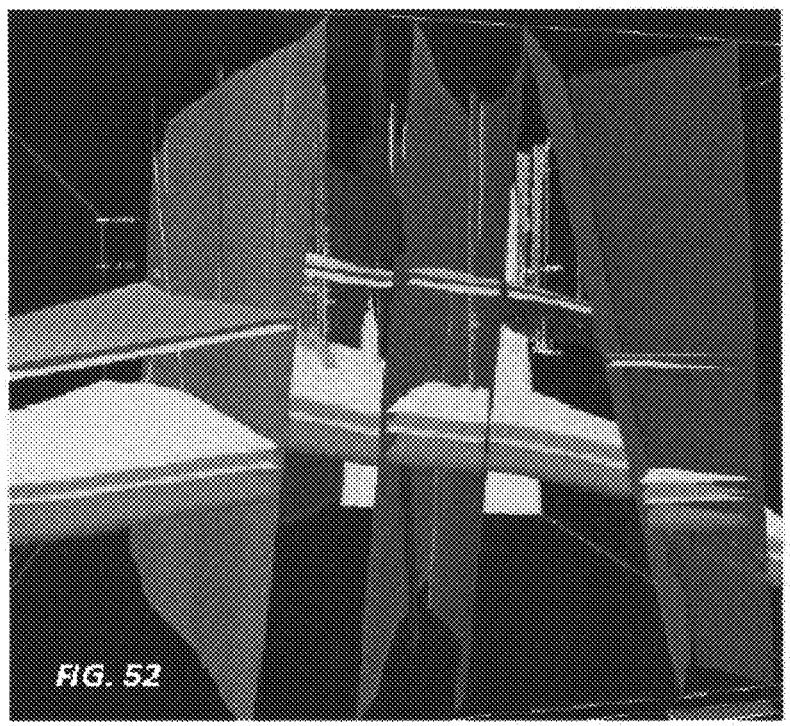
Figure 53:
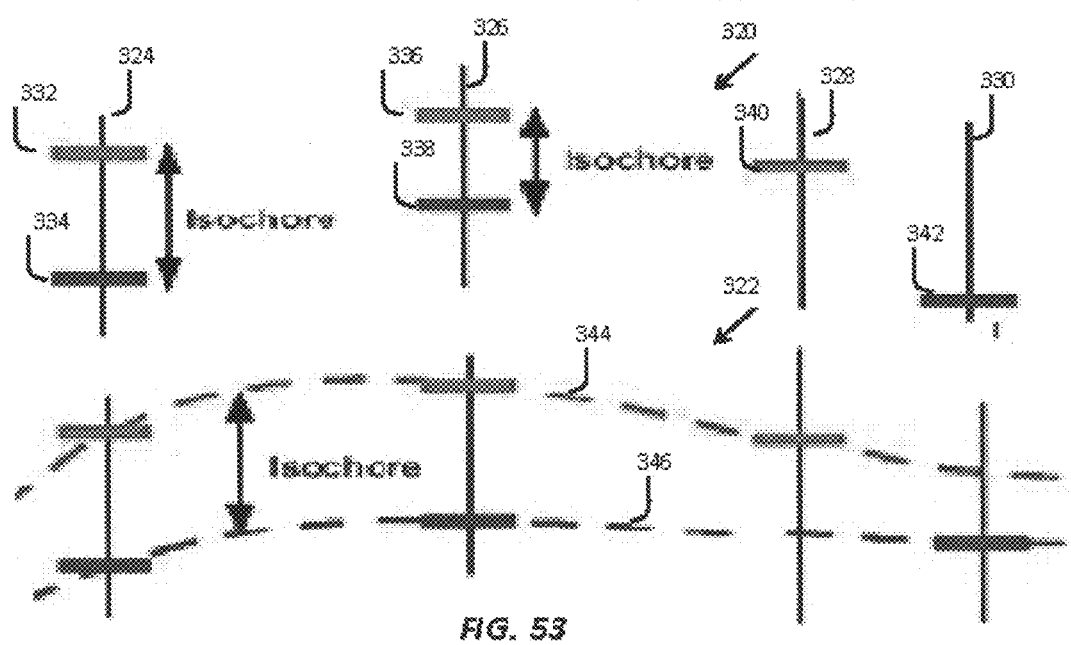
Figure 54:
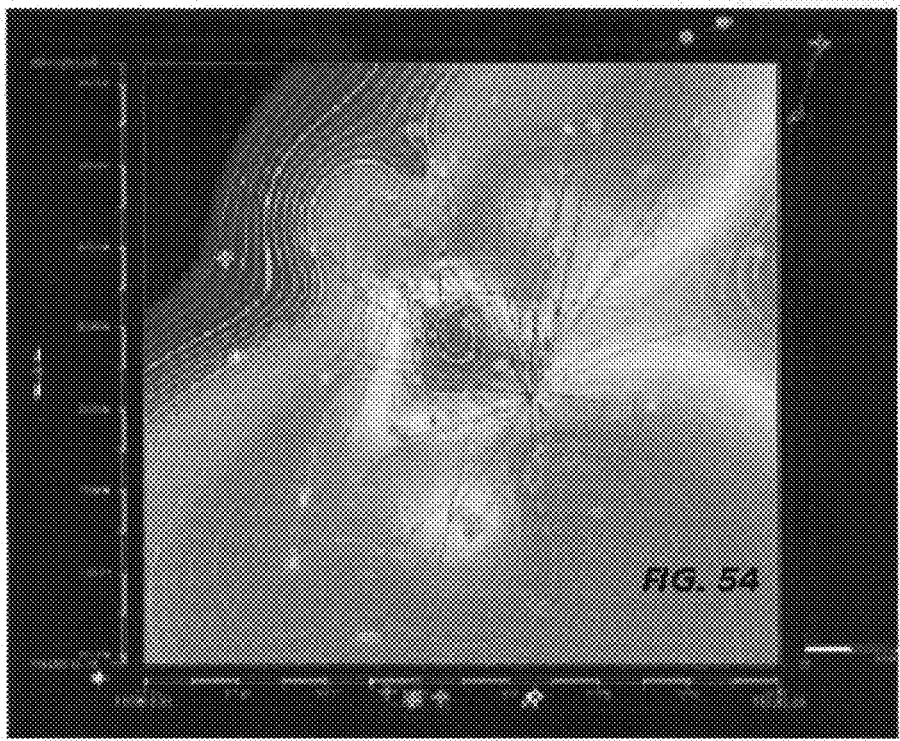
Figure 55:
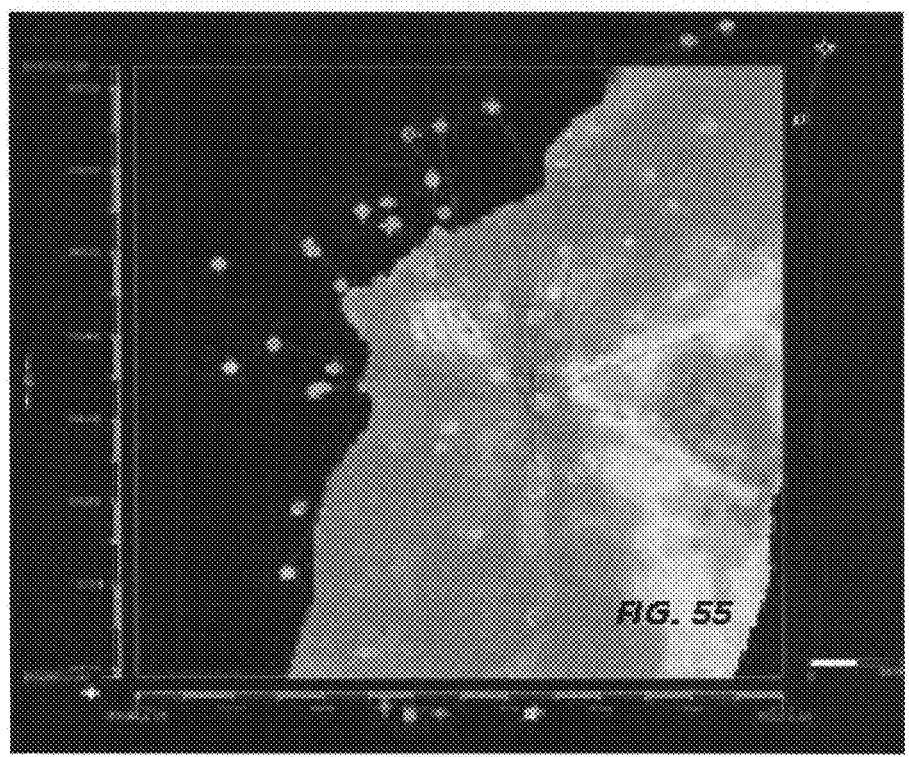
Figure 56:
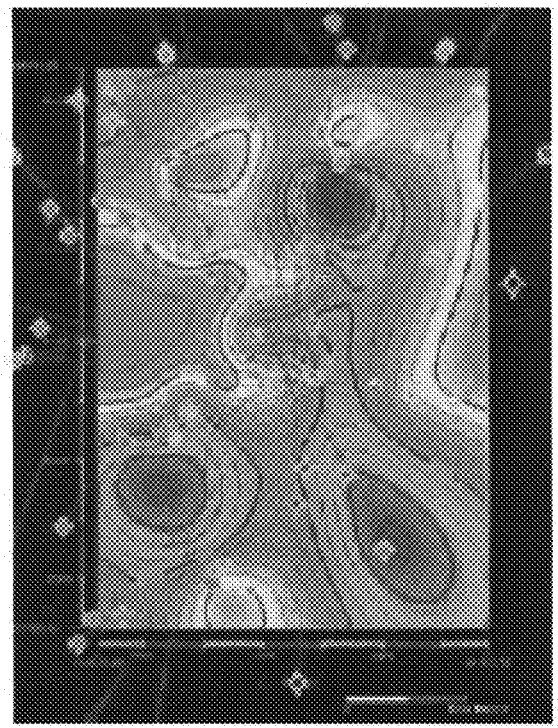
Figure 57:
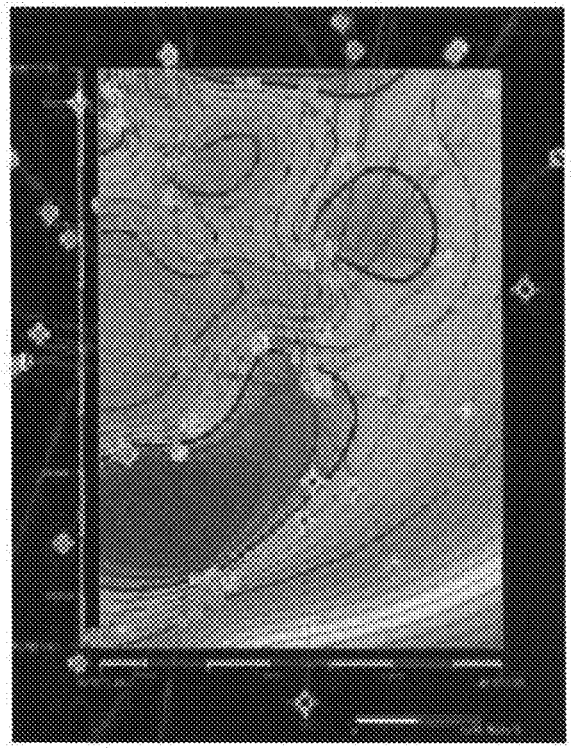
Figure 58:
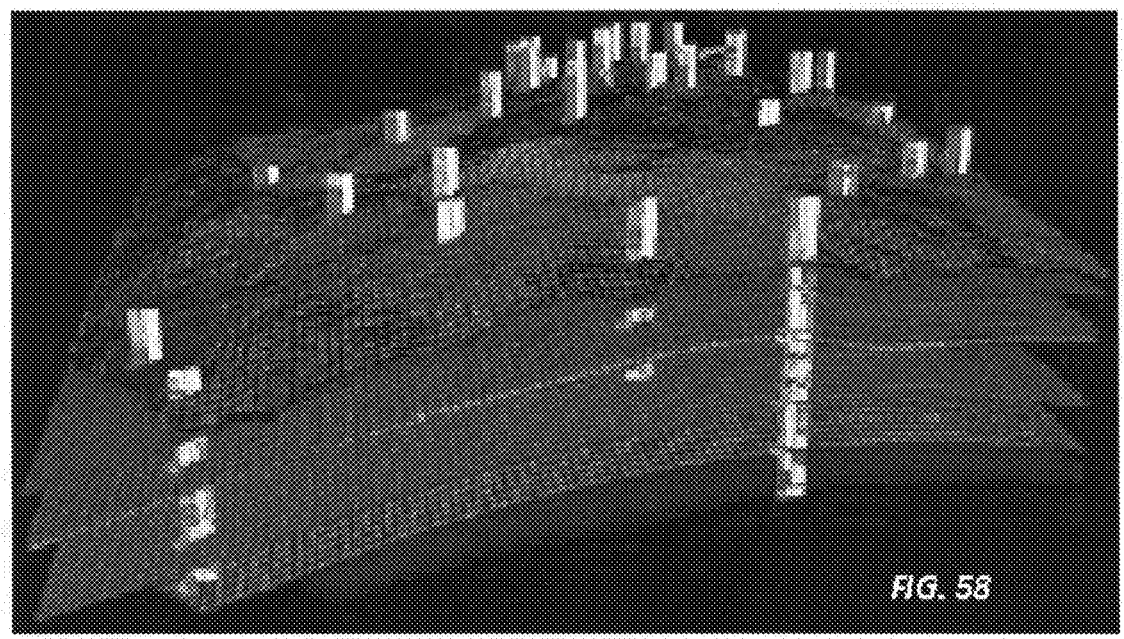
Figure 59:
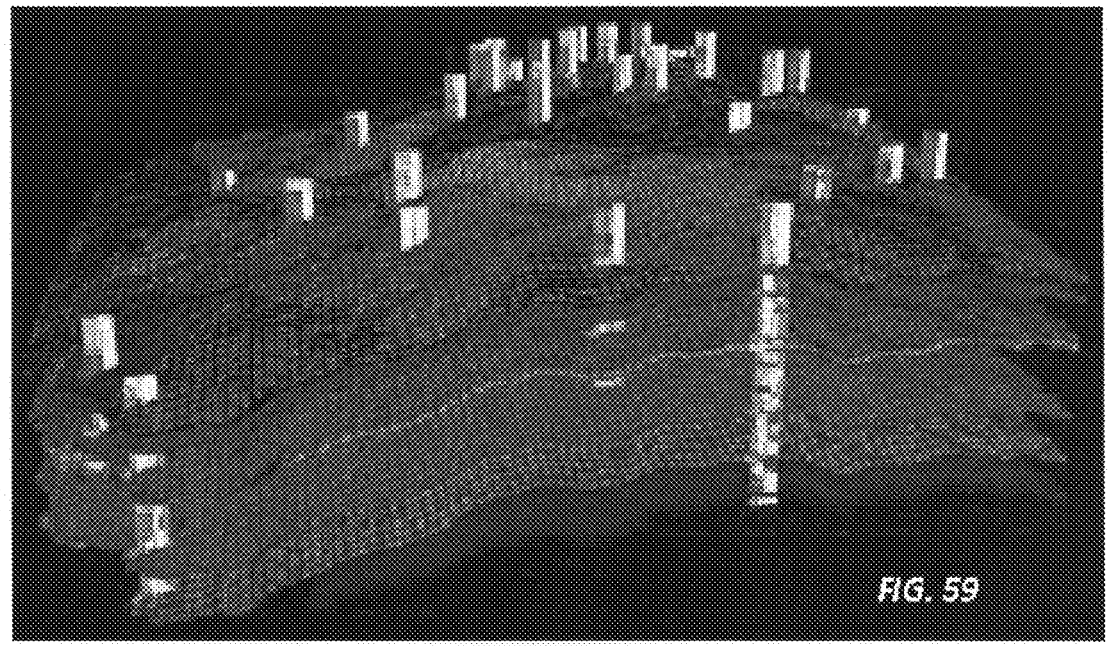
Figure 60:
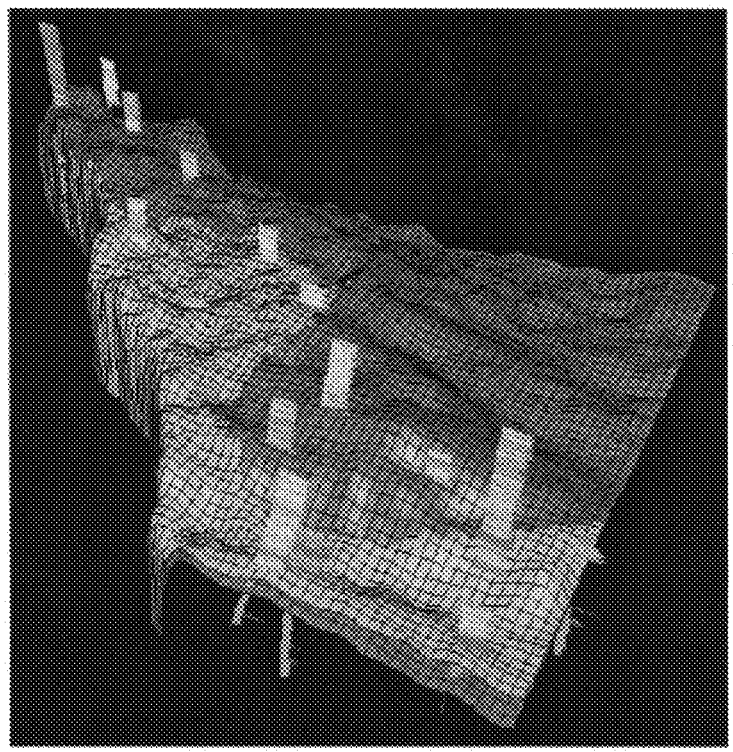
Figure 61:
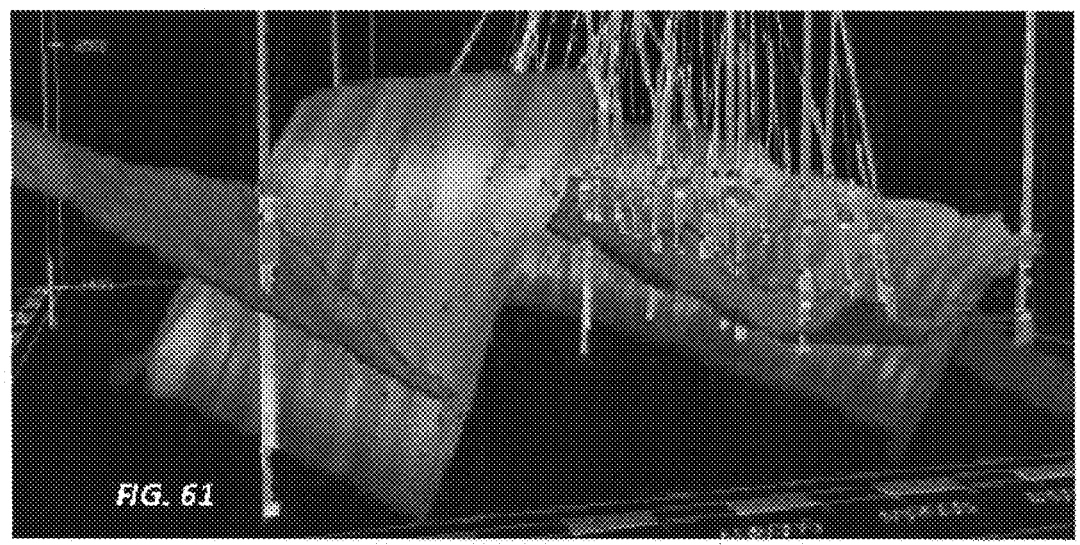
Figure 62:
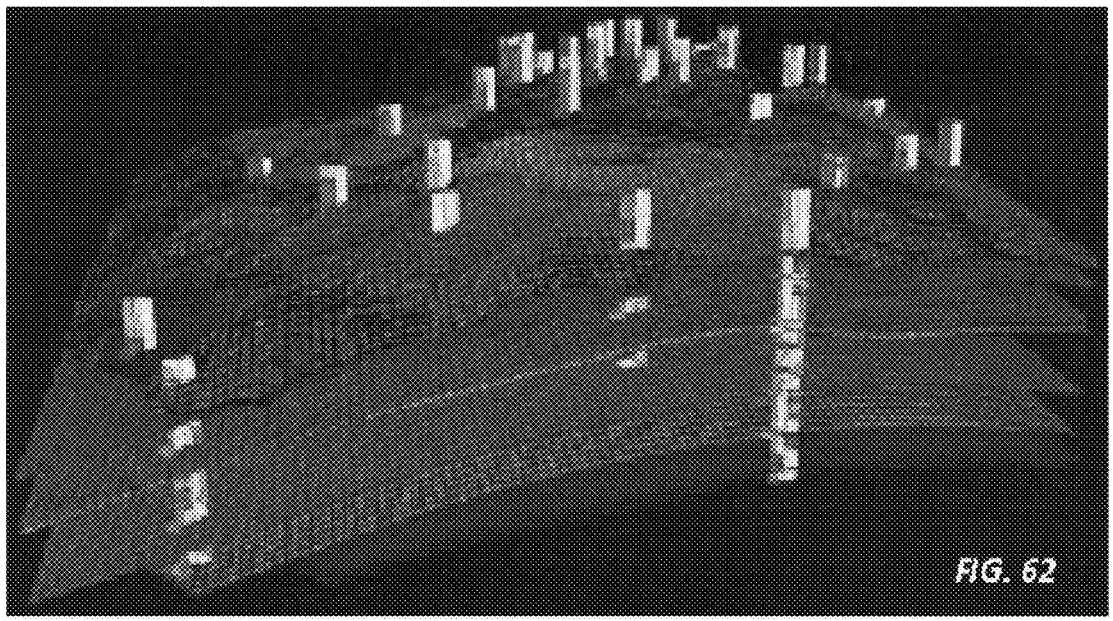
Figure 63:
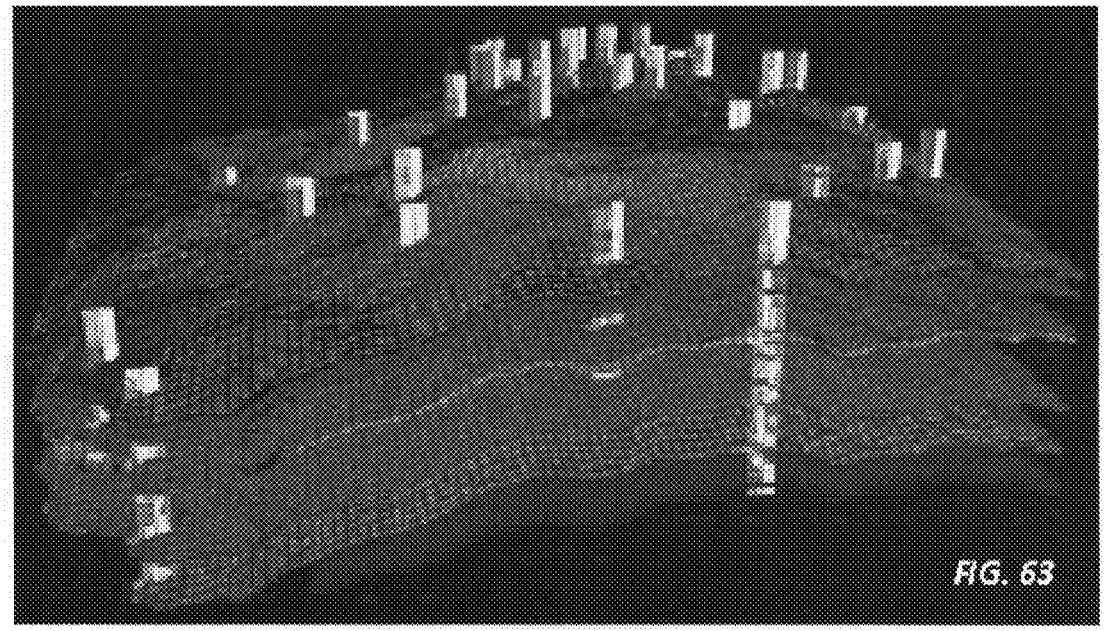
Figure 64:
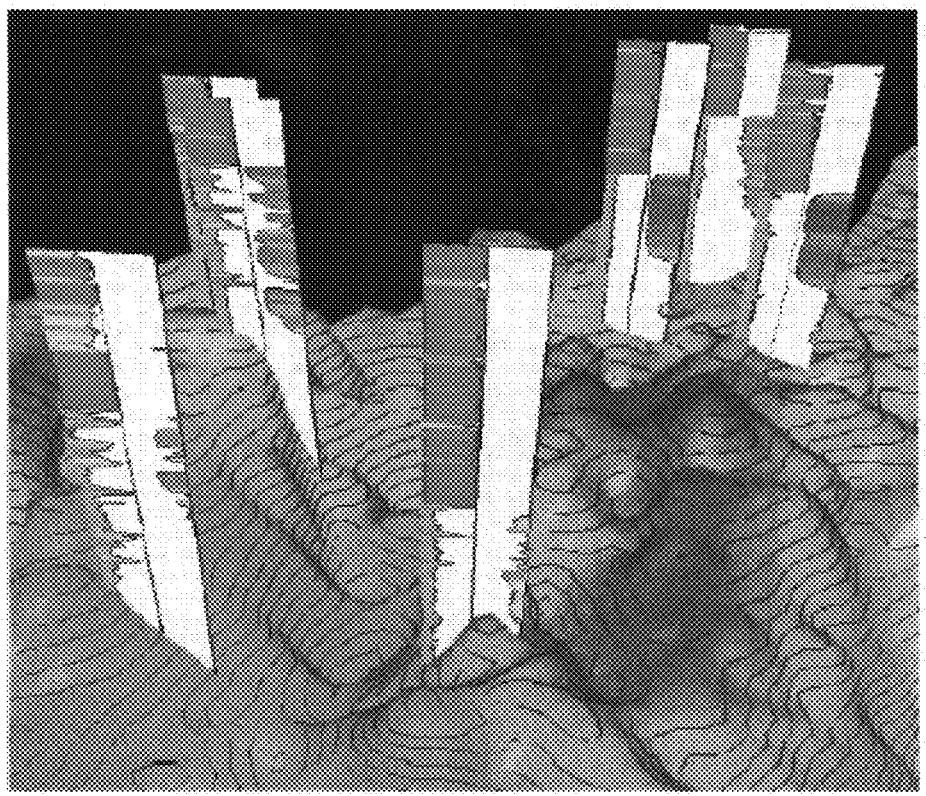
Figure 65:
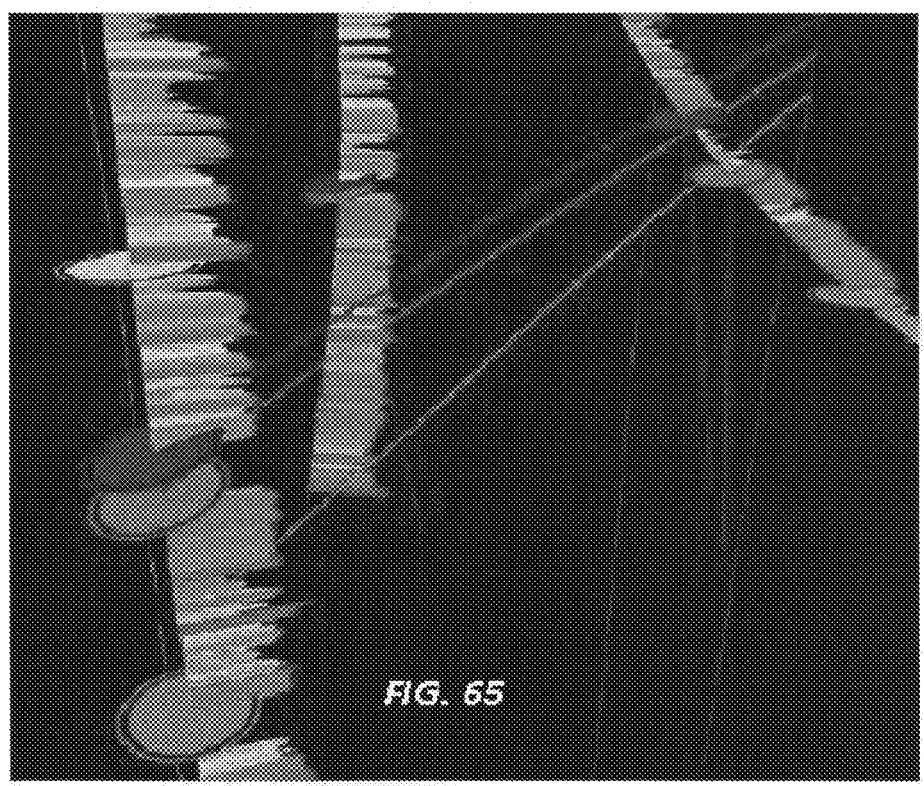
Figure 66:
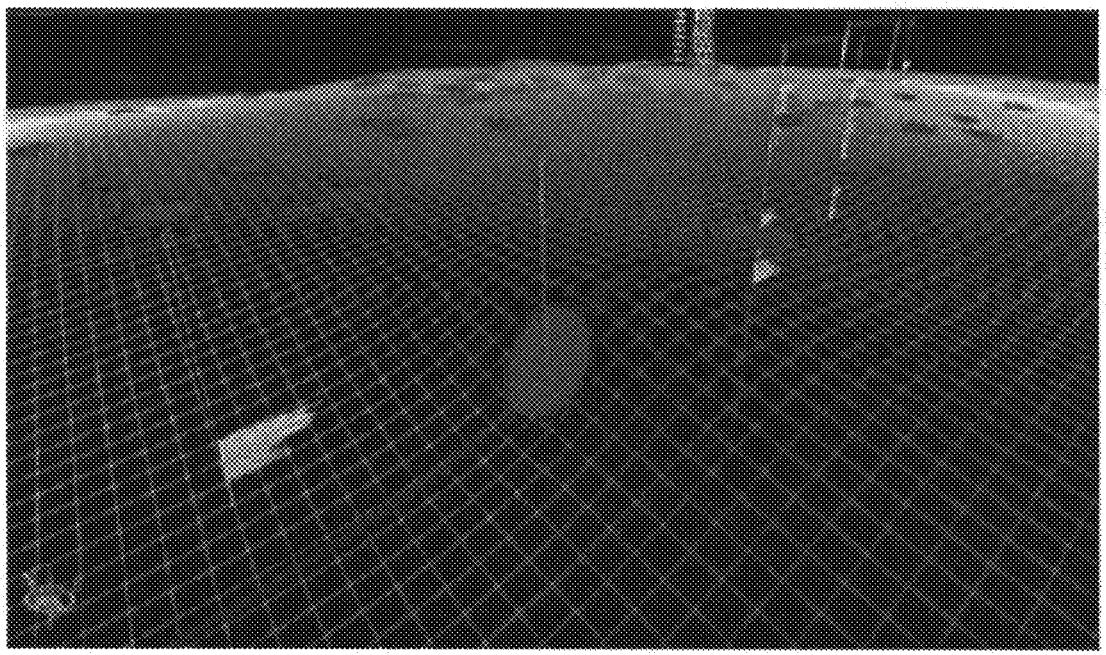
Figure 67:
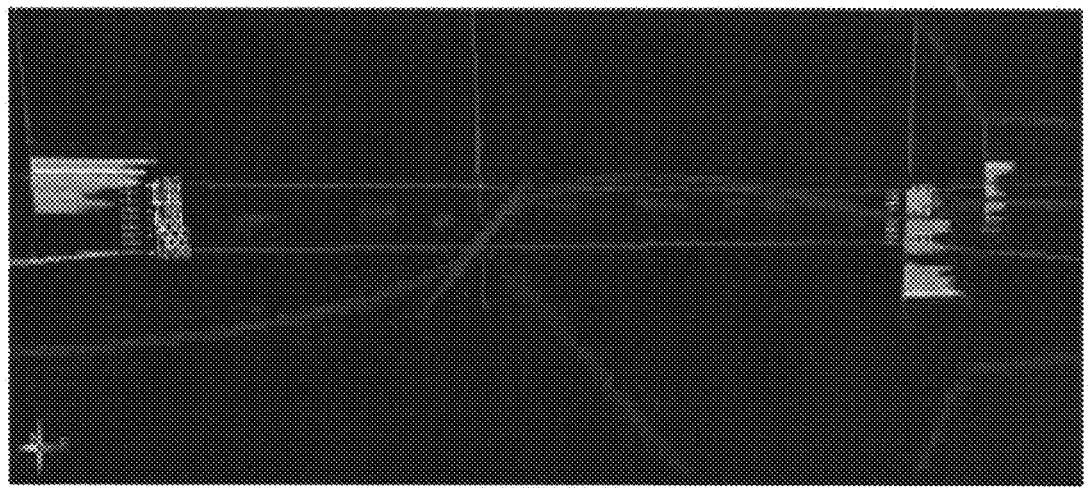
Figure 68:
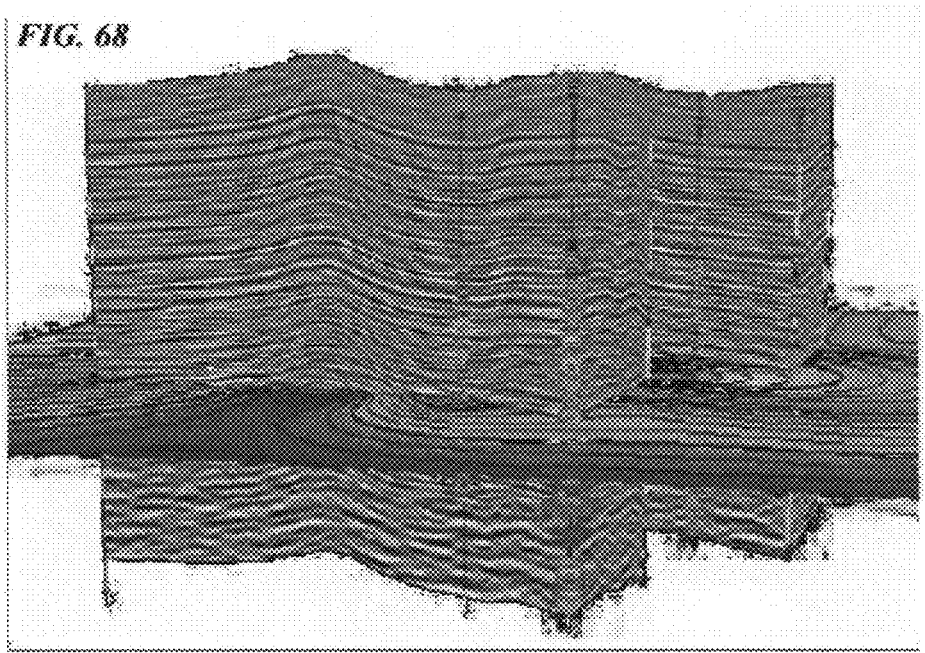
Figure 69:
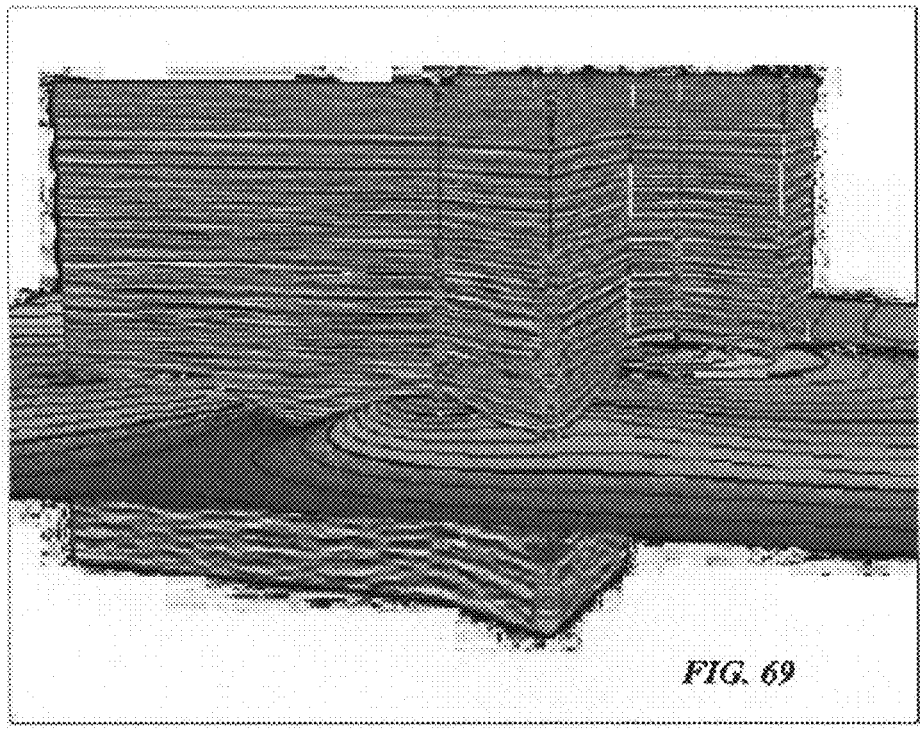
Figure 70:
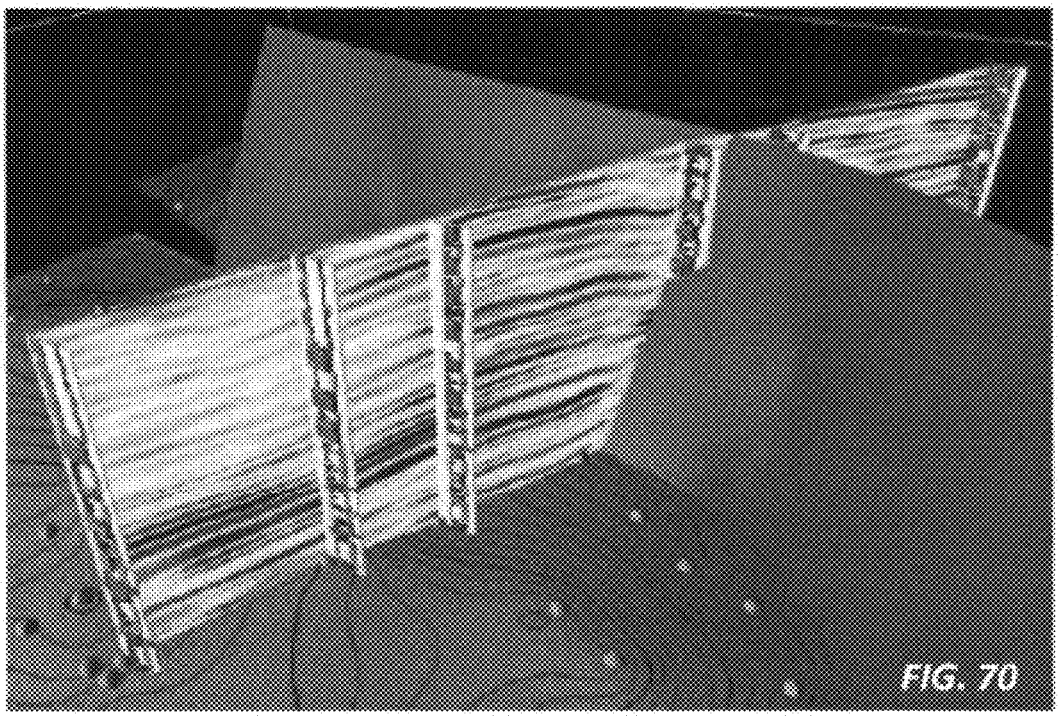
Figure 71:
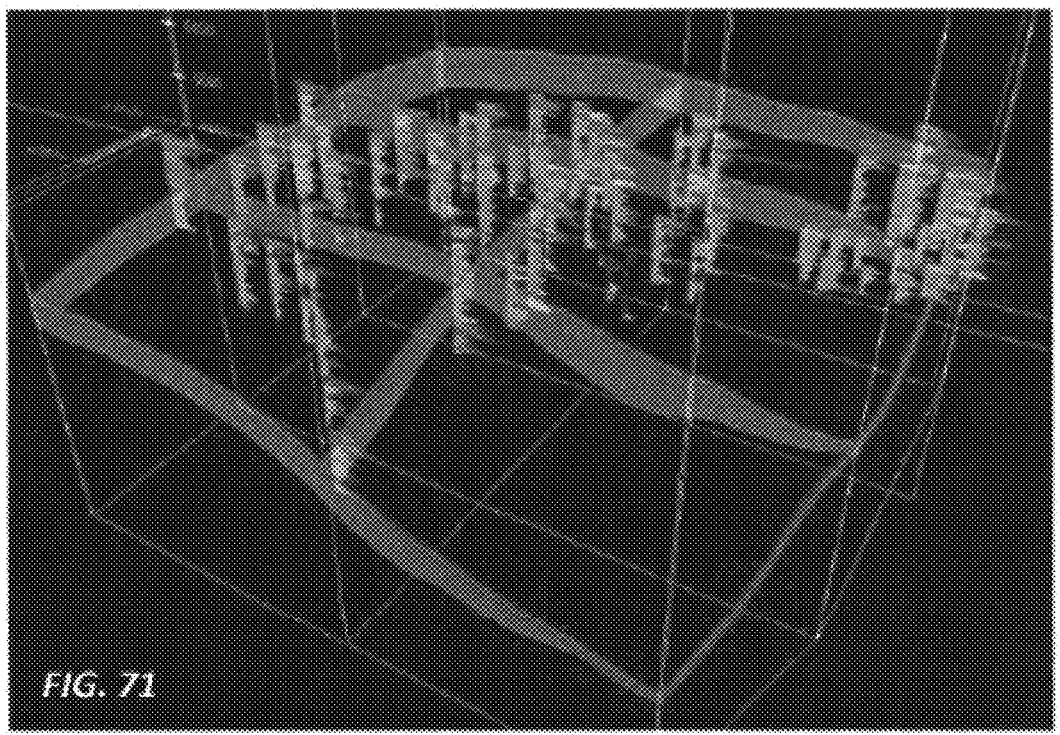
Figure 72:
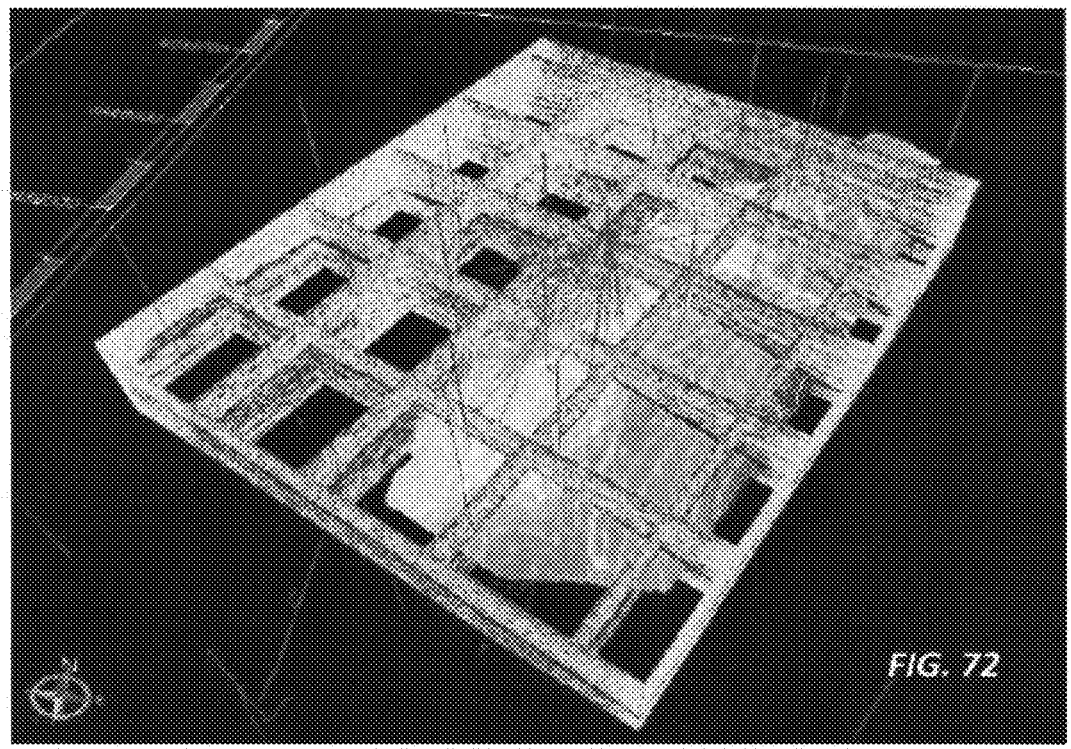
Figure 73:
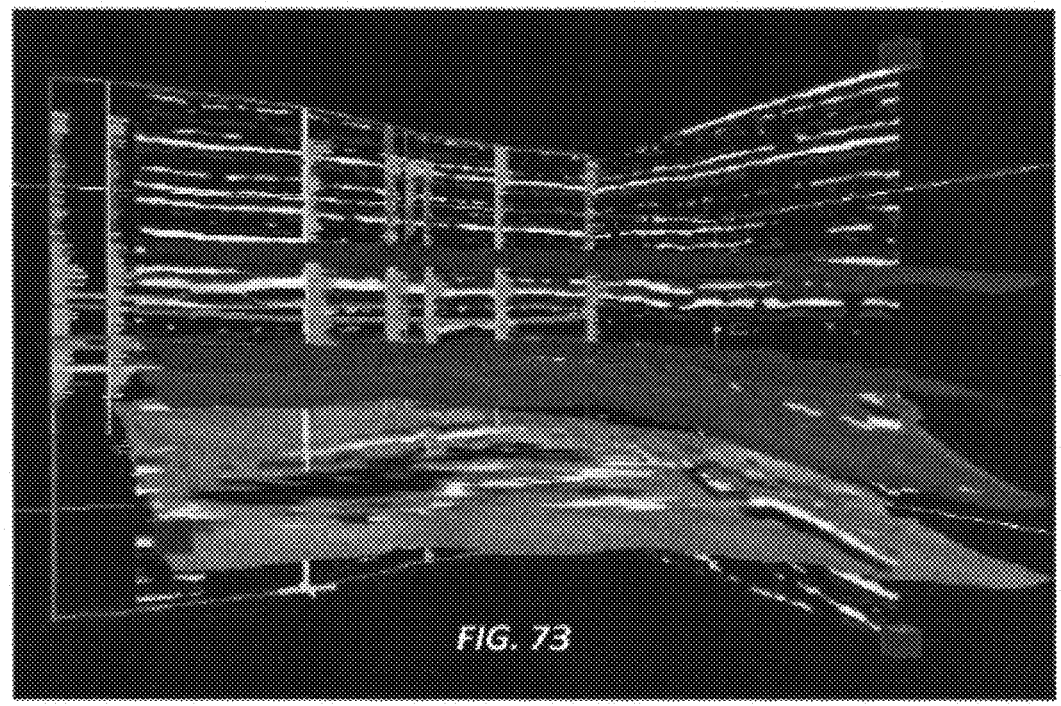
Figure 74:
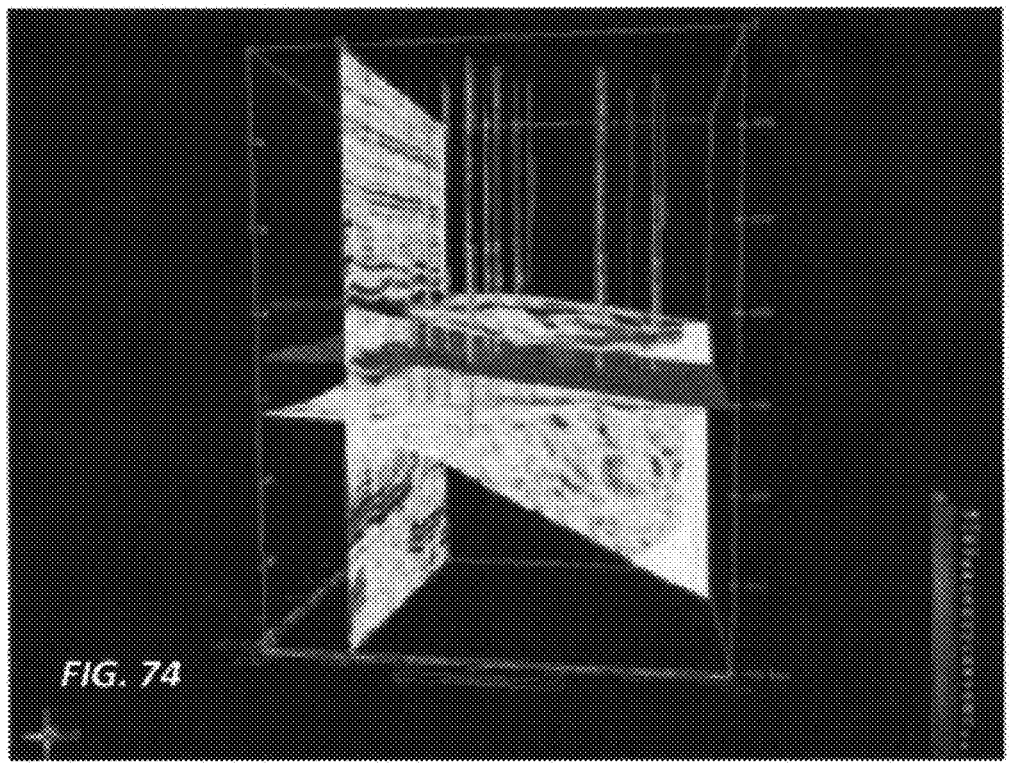
Figure 75:
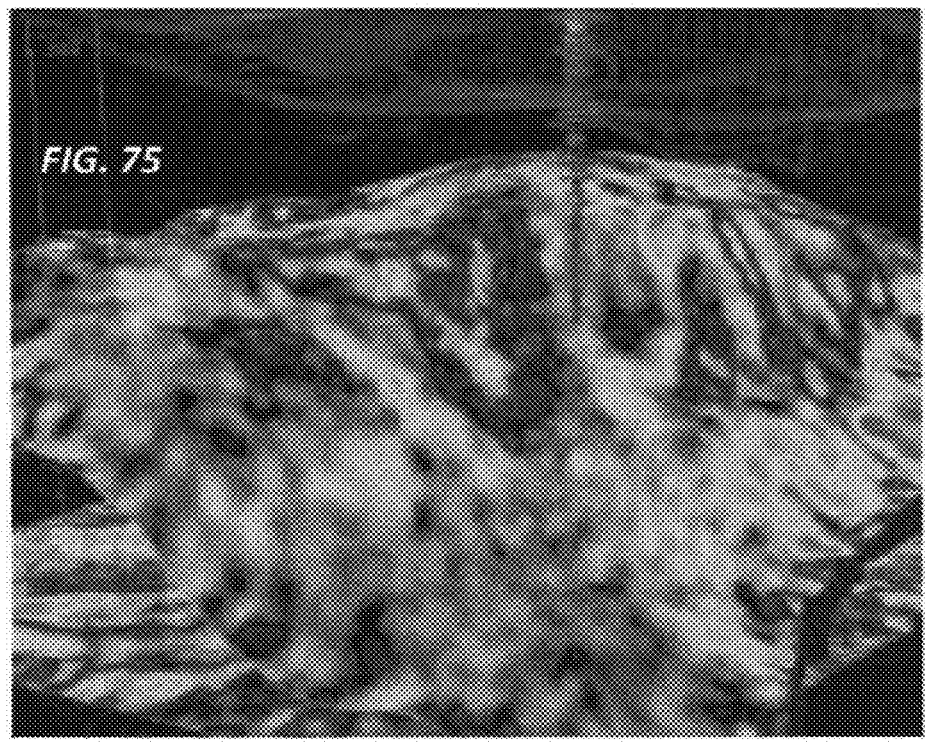
Figure 76:
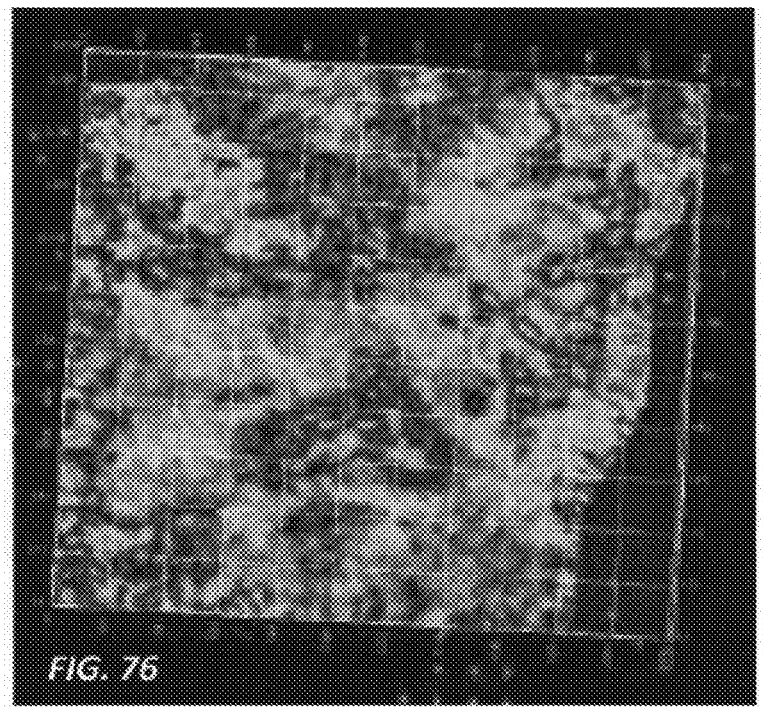
Figure 77:
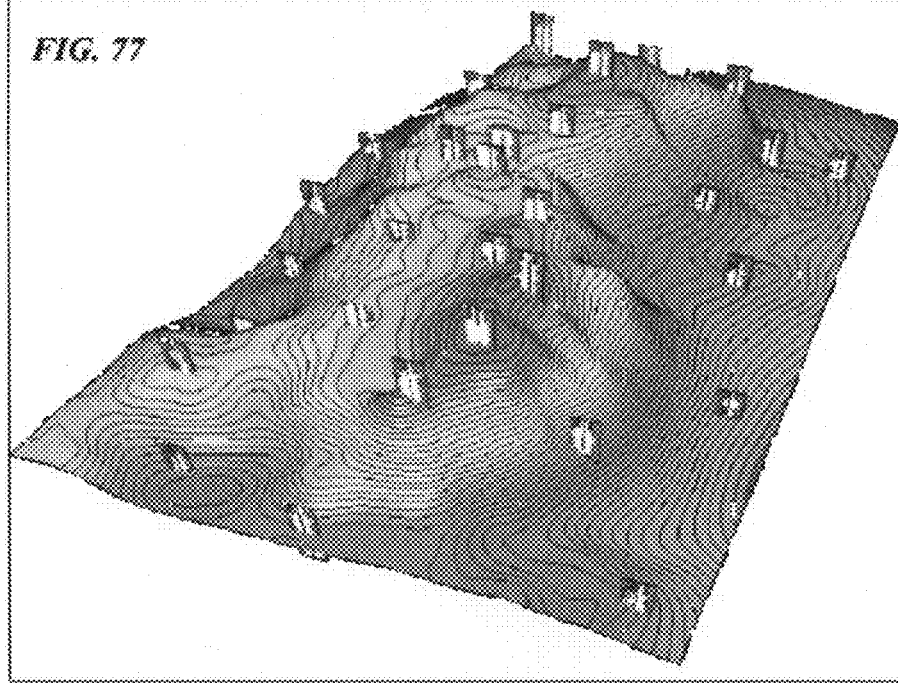
Figure 78:
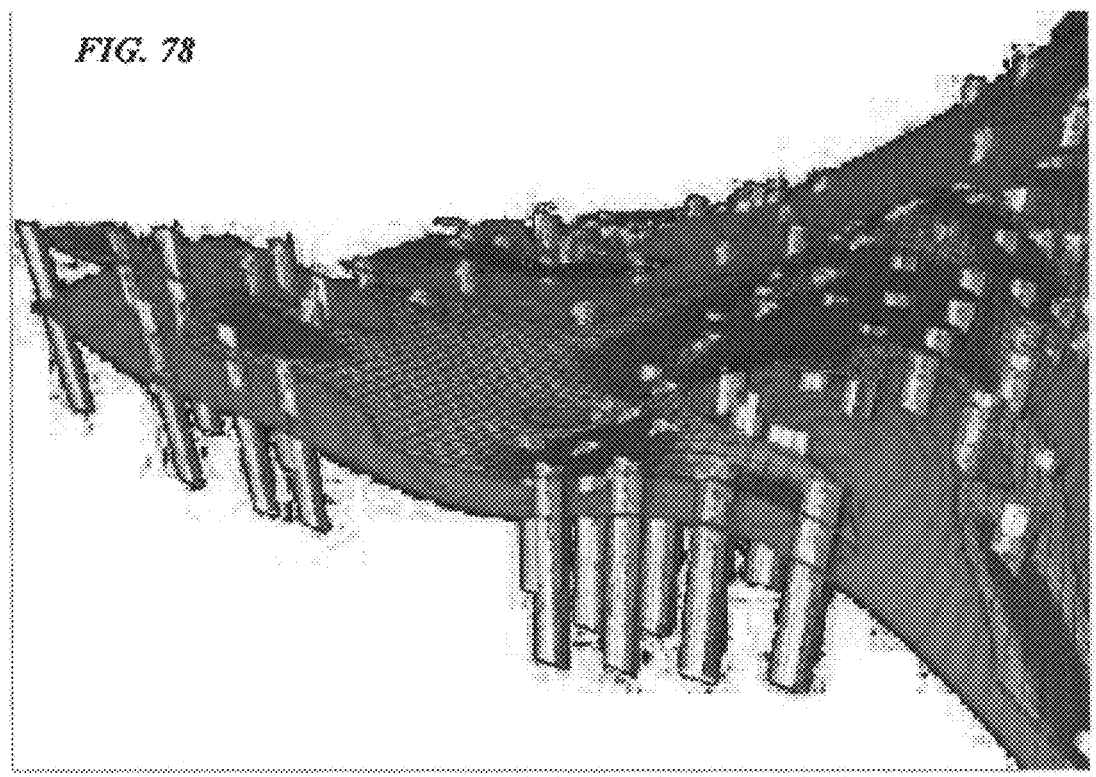
Figure 79:
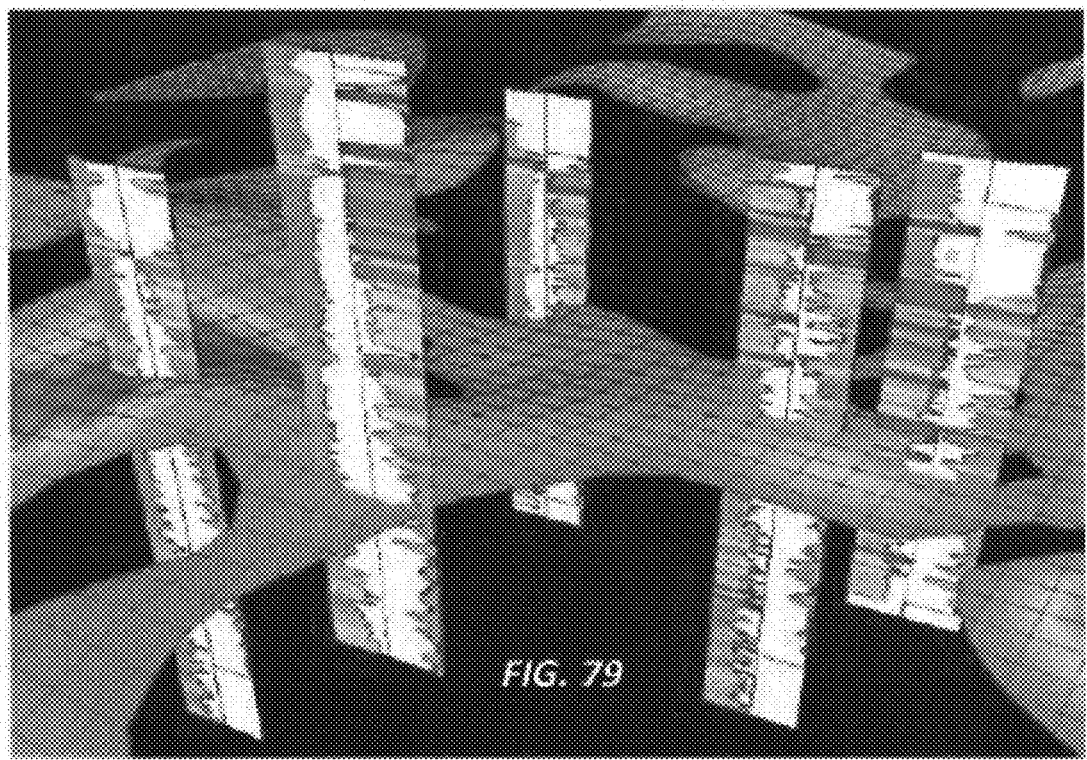
Figure 80:
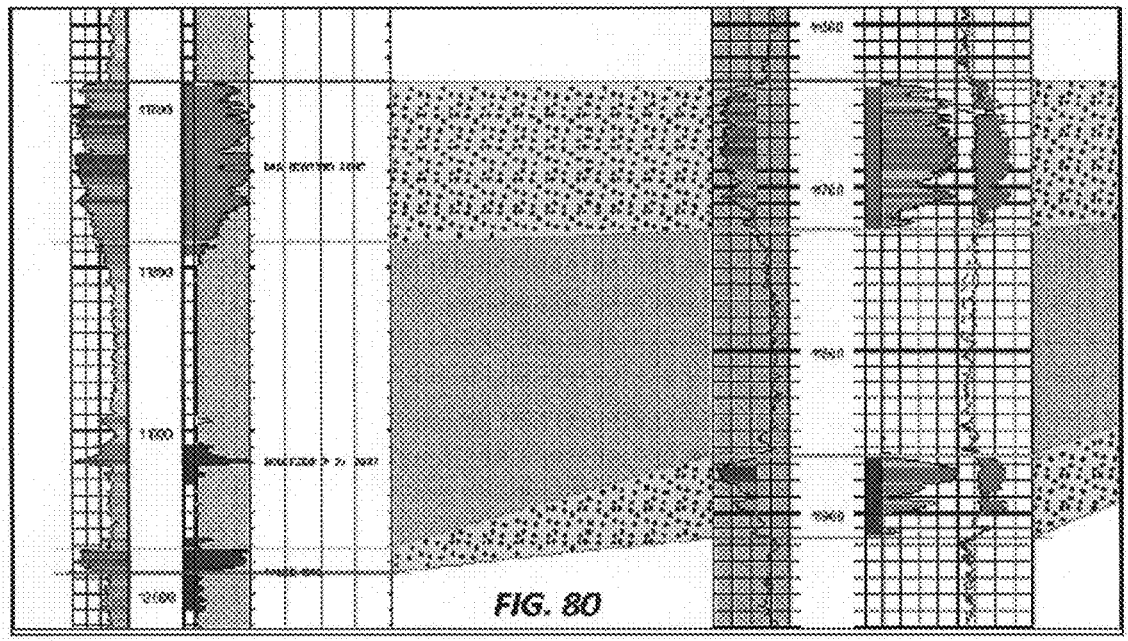
Figure 81:
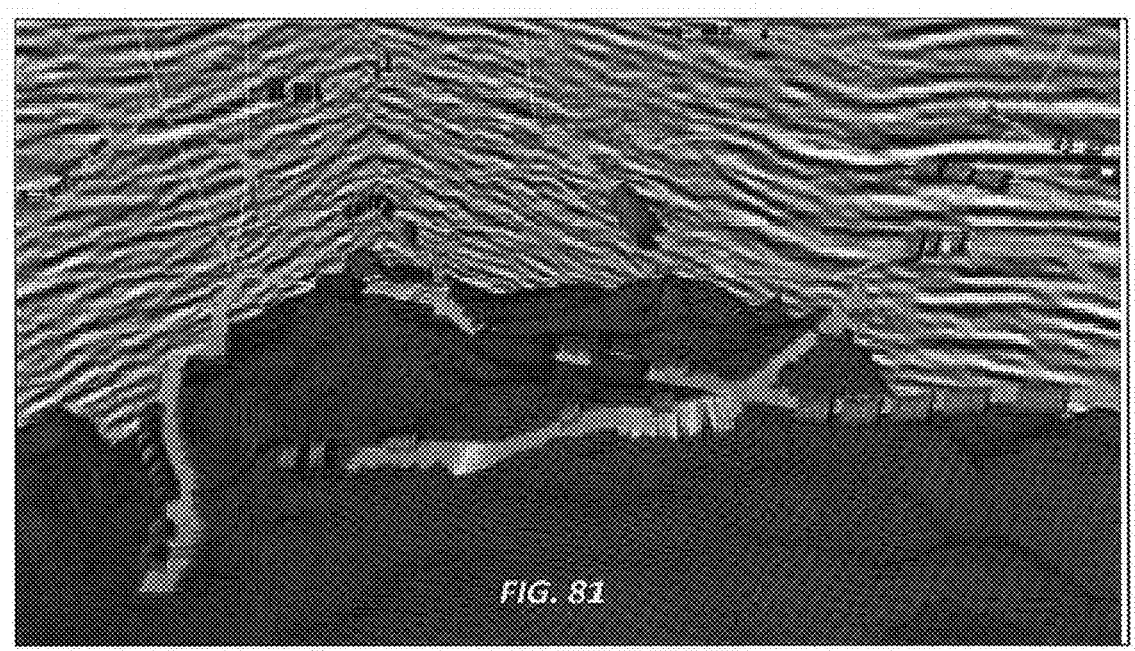
Figure 82:
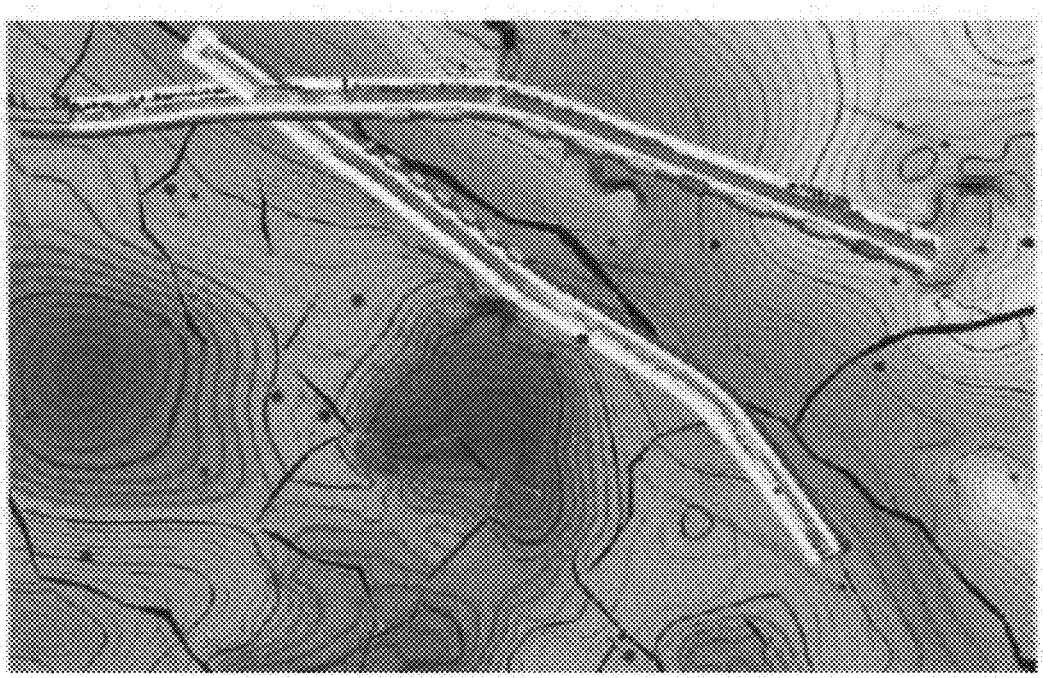
Figure 83:
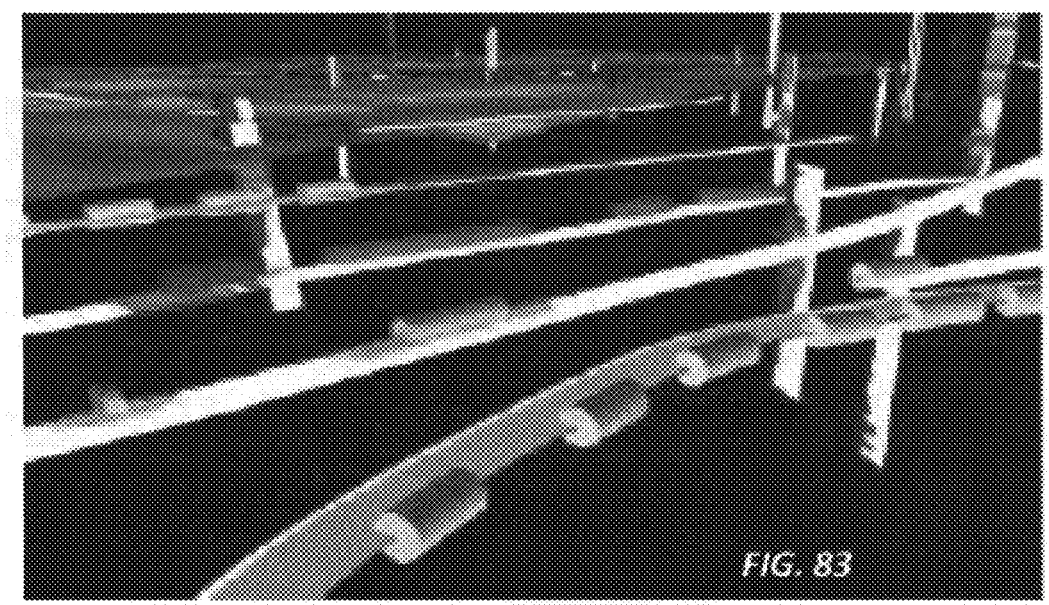
Figure 84:
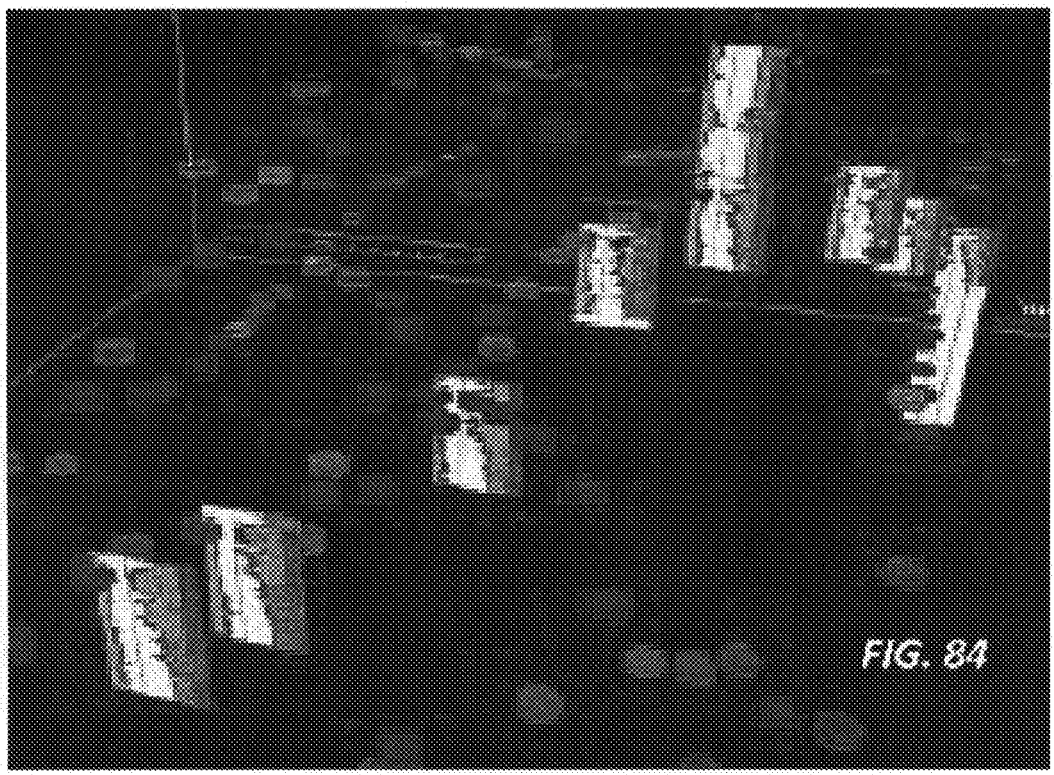
Figure 85:
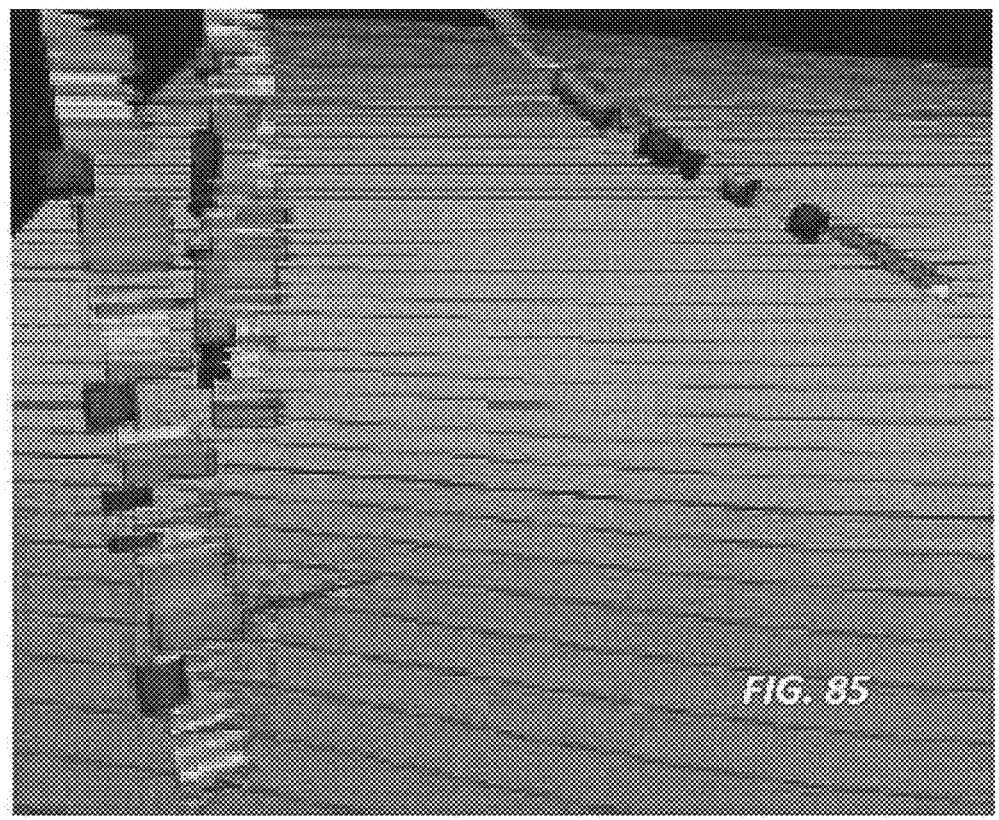
Figure 86:

FIG. 16 through 19 exhibit integrating stratigraphic erosional rules into the present geological interpretation system;

FIG. 20 through 22 show importing log curve data into the present geological interpretation system;

FIGS. 23 and 24 importing three-dimensional seismic data into the present geological interpretation system;

FIGS. 25 and 26 display importing deviated and horizontal well data into the present geological interpretation system;

FIGS. 27 through 30 depict an instance of importing well header data into the present geological interpretation system;

FIGS. 31 and 32 show importing interval data into the present geological interpretation system;

FIGS. 32 and 34 present views of importing pointset data into the present geological interpretation system;

FIG. 35 shows exporting grid and map data from the present geological interpretation system;

FIGS. 36 and 37 depict graphical data querying and filtering in association with manipulation of the present geological interpretation system;

FIG. 38 shows adding three-dimensional editable pick representations in association with manipulation of the present geological interpretation system;

FIGS. 39 and 40 provide views of interwell pick interpretation in association with manipulation of the present geological interpretation system;

FIGS. 41 and 42 exhibit forming cross-sectional definitions in association with manipulation of the present geological interpretation system;

FIG. 43 shows forming correlation representations of the predetermined geological region from the present geological interpretation system;

FIGS. 44 and 45 present performing three-dimensional thickness calculations in association with manipulation of the present geological interpretation system;

FIGS. 46 and 47 show displays from the group consisting essentially of structure maps, isochore maps, and well log zone average maps in association with manipulation of the present geological interpretation system;

FIGS. 48 and 49 display seismic slices of the predetermined geological region;

FIGS. 50 and 51 show how the manipulating net-to-gross maps may occur based on well log cutoffs or calculated log curves for the predetermined geological region in association with manipulation of the present geological interpretation system;

FIG. 52 present performing surface modeling of the predetermined geological region in association with manipulation of the present geological interpretation system;

FIGS. 53 through 55 show forming isochore visualizations of the predetermined geological region from the present geological interpretation system, including isochores from structural horizons in addition to isochores calculated from pointsets;

FIGS. 56 and 57 show forming well log zone average visualizations of the predetermined geological region from the present geological interpretation system, including isochores from structural horizons in addition to zone averages calculated from pointsets;

FIGS. 58 and 59 exhibit functions of performing one-step conformable mapping operations for the predetermined geological region from the present geological interpretation system;

FIG. 60 shows performing a one-step seismic tie to log pick operations on the predetermined geological region from the present geological interpretation system;

FIG. 61 presents how the present system executes a set of instructions for tieing fault surfaces to fault-picks in selected wells of the predetermined geological region from the present geological interpretation system;

FIGS. 62 and 63 present how the present system executes a set of instructions for performing recursive conformable mapping operations between multiple horizons of the predetermined geological region using the present geological interpretation system;

FIG. 64 displays draping external grid values onto three-dimensional structure maps of the predetermined geological region from the present geological interpretation system;

FIG. 65 shows a display for forming three-dimensional dip/azimuth pick displays for picks measured on the predetermined geological region using the present geological interpretation system;

FIGS. 66 and 67 relate to performing surface modeling operations using three-dimensional dip/azimuth pick information of the predetermined geological region using the present geological interpretation system;

FIGS. 68 and 69 relate to performing interactive three-dimensional datuming of seismic cross-sections and slices of the predetermined geological region from the present geological interpretation system;

FIGS. 70 and 71 relate to forming three-dimensional visualizations of cross-sections for wells of the predetermined geological region from the present geological interpretation system;

FIG. 72 display views of forming three-dimensional visualizations of cross-sections for wells of the predetermined geological region from the present geological interpretation system;

FIG. 73 show performing interactive seismic opacity filtering for a plurality of views of the predetermined geological region;

FIGS. 74 through 76 exhibit forming stratigraphic slicing of three-dimensional seismic volumetric interpretations of the predetermined geological region;

FIG. 77 depicts forming color-filled three-dimensional contours of the predetermined geological region from the present geological interpretation system;

FIGS. 78 and 79 illustrate performing interactive filtering of three-dimensional structure and zone average maps of the predetermined geological region from the present geological interpretation system;

FIG. 80 shows generating substitute curves for missing log curve data from the predetermined geological region;

FIGS. 81 through 83 display how the present system and process function in integrating time-stamped production and completion intervals; and FIGS. 84 through 86 illustrate how the present system presents in multi-dimensional images changes in energy resource injection volumes over time.

DETAILED DESCRIPTION OF THE SPECIFIC EMBODIMENTS

The disclosed geological interpretation system delivers three-dimensional geological interpretation performance with true three-dimensional subsurface solutions, fast interpretation updates, and integration with the Landmark Graphics OpenWorks® and SeisWorks® systems. The effect on user workflow speed and approach is dramatic and translates into higher quality interpretations, lower risk, and improved success.

The disclosed process and system provide high quality interpretation of geological data. A real-time three-dimensional interpretation environment is characterized by the fact that all changes to the interpretation are immediately updated in the three-dimensional, cross-sectional, and base map views. By dramatically speeding the geological interpretation workflow, geoscientists are able to save time, which is used to improve on the quality of the interpretation, effectively lowering finding and development costs.

Using the disclosed geological interpretation system's unique real-time three-dimensional interpretation environment, interpretation changes are made instantaneously. The disclosed system addresses the shortcomings of three-dimensional modeling tools by transferring many of its functions into real-time three-dimensional geological interpretation environment. This eliminates the need for the user to continuously generate multiple three-dimensional models to account for changes to user interpretation. Geoscientists using the disclosed system no longer face the need to master multiple applications in order to complete a geological interpretation workflow. Any changes to the interpretation are immediately updated in three-dimensional, cross-section, and base map views. The disclosed geological interpretation system combines the functionality of these applications into a single three-dimensional interpretation environment, thus reducing the learning curve and increasing the geoscientist's interpretation productivity.

The disclosed geological interpretation system may be designed from the ground up to leverage user existing data management environments such as Landmark® and GeoQuest®. For example, the disclosed system reads and writes data directly to and from the Landmark Graphics OpenWorks® database and accesses three-dimensional seismic directly from the Landmark Graphics SeisWorks® three-dimensional seismic data files. In addition, the disclosed system easily links to best-of-class third-party applications.

The disclosed system includes a process and system for ensuring that any changes to user interpretation are immediately updated in user three-dimensional, cross-section, and base map views. An underlying three-dimensional foundation enables it to solve complex geological interpretation problems that cannot be resolved using software that relies on traditional two-dimensional principles.

The disclosed geological interpretation system's improved geological interpretations lead to more accurate three-dimensional models and reservoir simulations. Accurate models lead to risk reduction and to better business decisions. The disclosed geological interpretation system combines the functionality of multiple applications into a single three-dimensional interpretation environment, thus reducing the learning curve and increases user interpretation productivity. The system employs an interactive three-dimensional spatial environment to maintain unparalleled data quality control by being able to display thousands of well logs together with seismic and production data in three-dimensions.

By dramatically speeding up user geological interpretation workflows using the disclosed system, the user may apply the timesavings to improving the quality of user interpretation, thus lowering user exploration and development costs. The disclosed system's is uniquely equipped to manage the crucial task of data quality analysis and cleanup. By being able to display thousands of wells, together with seismic and production data in three-dimensions, all issues related to data quality may for the first time be addressed in an interactive three-dimensional spatial environment, enabling the user to maintain control over user data.

For example, different stacking patterns (e.g., progradational versus retrogradational, or aggradational) and different geometries (e.g., dip versus strike-orientation) may be composed of completely different facies.

The ability to display core and petrophysical information simultaneously within the well log template, as the disclosed system makes possible, helps interpreters select turn-around points quickly and accurately. Furthermore, in a dynamic interpretation environment, such as here provided, surfaces may be quickly added, deleted, changed, and renamed. This flexibility allows interpreters to select a visualization method that enhances pattern recognition, thereby enhancing their ability to interpret progradational, retrogradational or aggradational stacking patterns in individual wells and develop a stronger correlation framework.

The disclosed geological interpretation technology permits interpreters to correlate in two dimensions or three-dimensions, and to immediately visualize the results in both two- and three-dimensions. Furthermore, interpreters may work with an unlimited number of well logs. By using the sequence stratigraphic methodology, stratigraphic units may be mapped at all scales at the click of a button. Thus, interpreters may quickly display maps in two- and three-dimensions of parasequences, systems tracts, sequences, and composite sequences.

The disclosed interpretation system saves substantial amounts of time by identifying and resolving problems that are traditionally found during the three-dimensional modeling workflow following the geological interpretation phase. This reduces the modeling costs by high grading the geological interpretation. The disclosed system combines and modifies seismic horizons with picks, and allows for the integration of time-stamped production interval data.

The disclosed system calculates log attributes using a free-form equation calculator and maps log attributes in two dimensional and three-dimensional space. The disclosed system allows for multiple correlation framework scenarios to be interactively defined (e.g., to observe the consequences of the inclusion of inter-reservoir shales or high-permeability zones upon transition to the reservoir simulator).

One of the drawbacks of traditional three-dimensional modeling programs is their inadequacy in visualizing well log data in three-dimensions. The disclosed geological interpretation system's ability to visualize large quantities of well log curves in three-dimensions makes it immediately valuable in quality control and data management phases of a reservoir characterization project. Many problems that usually only surface in the petrophysical, three-dimensional modeling, and reservoir simulation stages may now be identified much sooner, thus resulting in significant data management cost-savings.

Raw log curves visualized in three-dimensions immediately highlight problems with normalization of log curves. When investigating curves in two dimensional log visualization software, it is difficult to get a feel for the true spatial variations of the log curves. Differences between measurement errors and geological variation may readily be resolved by investigating the log curves in three-dimensions.

The disclosed system provides interactive zone averaging for identifying and resolving correlation mis-ties, and optimizing log correlations. Various gridding algorithms provided with the present system permit structural, thickness, and zone average mapping and surface modeling. Also, one or more minimum curvature algorithms are optimized for speed as well as traditional search radius based algorithms that closely resembles prior art algorithms.

The disclosed geological interpretation system's next-generation gridding algorithms are optimized to ensure a quick response to changes in the interpretation. The speed of the algorithms allows for a smooth workflow emphasizing true dynamic interpretation. This new design principle has led to the prevention of time-consuming workflow obstacles (e.g., application switching) which are still hampering traditional log correlation and mapping applications.

The disclosed geological interpretation system's open data architecture has been designed to directly interface with industry-standard, third-party data management solutions such as Landmark's OpenWorks®. Links between the disclosed system and other best-of-class software products in the exploration and production industry, permit integrating with third-party applications to ensure a smooth workflow in today's multi-vendor application environment.

The disclosed system has a unique ability to generate scaled hardcopy plots directly from its three-dimensional displays. Hardcopy plots may be generated from all three of the disclosed system views: three-dimensional, two dimensional cross-section, and base map view. In the three-dimensional view the two dimensional plots are obtained by sorting the three-dimensional polygons in the three-dimensional view into a single two-dimensional plane after which the display may be output as a standard CGM or Postscript scaled hardcopy file. These files may be scaled to any size while honoring the native resolution of the hardcopy device.

The disclosed system allows the user to change user interpretation in three-dimensions, whereas other programs only allow a user to visualize it in three-dimensions, and require the user to return to two dimensional point products or modules to perform user interpretation tasks.

Although not a three-dimensional modeling tool, the presently disclosed system operates synergistically with Landmark's Stratamodel® and Powermodel®, Paradigm/EDS's GOCAD®, Roxar's RMS®, or SIS Petrel®. The system may be positioned in front of the three-dimensional modeling workflow and complements these products by allowing geoscientists to quickly change and update their interpretations during a three-dimensional modeling phase.

Figure 1:
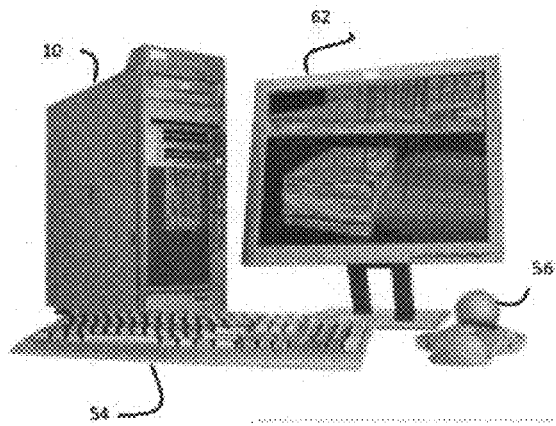
Figure 2:
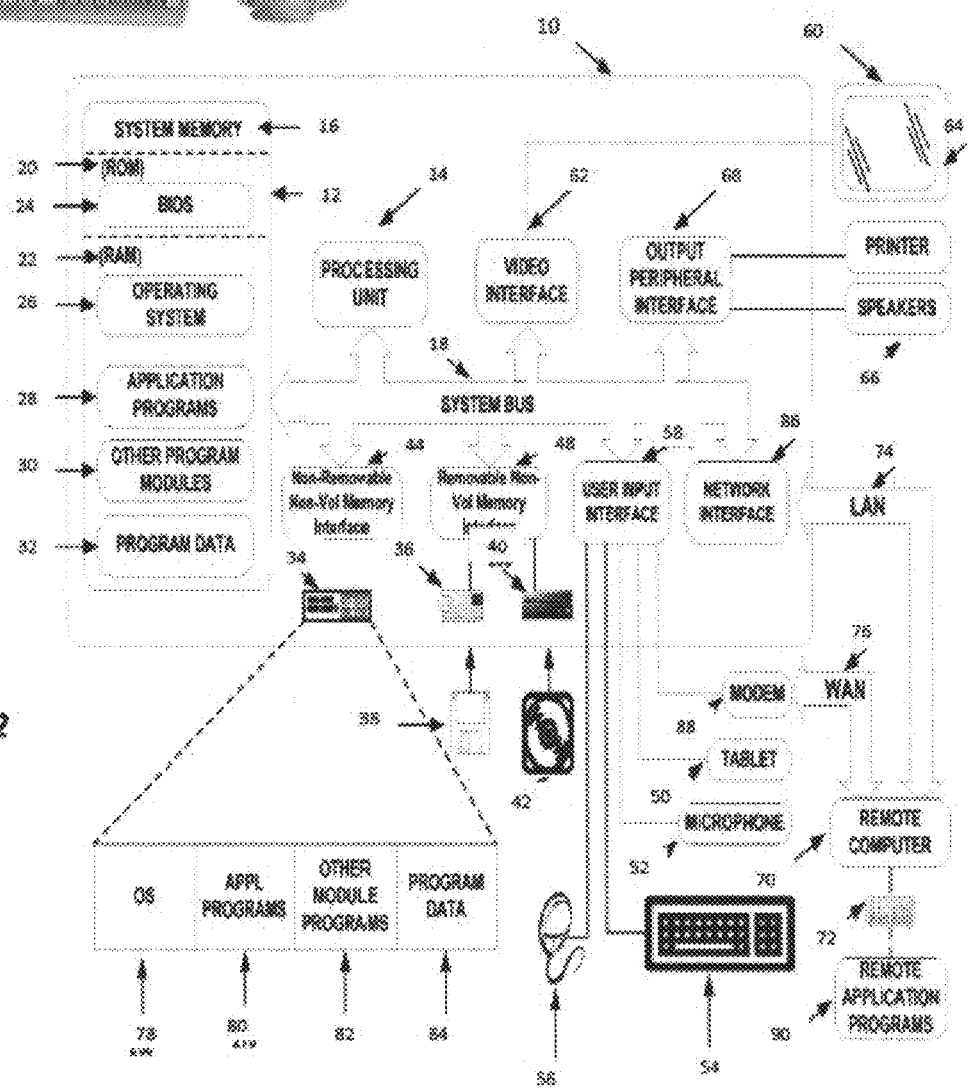

Operating in association with tools like Paradigm's Geolog® or Landmark's PetroWorks®. Working in conjunction with these products, the disclosed system provides three-dimensional log visualization and free-form well log calculator features aids in improving the petrophysical analysis workflow. FIGS. 1 and 2 an exemplary system within a computing environment for implementing the system of the present disclosure and which includes a general purpose computing device in the form of a computing system 10, commercially available from Intel, IBM, AMD, Motorola, Cyrix and others. Components of the computing system 10 may include, but are not limited to, a processing unit 14, a system memory 16, and a system bus 46 that couples various system components including the system memory to the processing unit 14.

The system bus 46 may be any of several types of bus structures including a memory bus or memory controller, a peripheral bus, and a local bus using any of a variety of bus architectures.

Computing system 10 typically includes a variety of computer readable media. Computer readable media may be any available media that may be accessed by the computing system 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computing system 10.

The system memory 16 includes computer storage media in the form of volatile and/or nonvolatile memory such as read only memory (ROM) 20 and random access memory (RAM) 22. A basic input/output system 24 (BIOS), containing the basic routines that help to transfer information between elements within computing system 10, such as during start-up, is typically stored in ROM 20. RAM 22 typically contains data and/or program modules that are immediately accessible to and/or presently being operated on by processing unit 14. By way of example, and not limitation, FIG. 1 illustrates operating system 26, application programs 30, other program modules 30 and program data 32.

Figure 4:
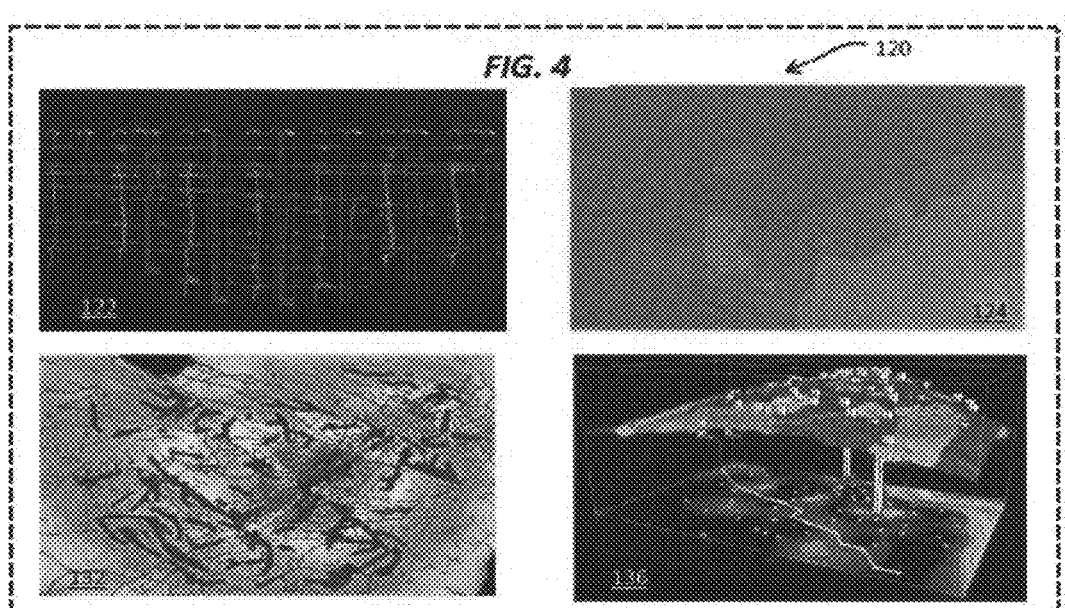

Computing system 10 may also include other removable/non-removable, volatile/nonvolatile computer storage media. By way of example only, FIG. 4 illustrates a hard disk drive 34 that reads from or writes to non-removable, nonvolatile magnetic media, a magnetic disk drive 36 that reads from or writes to a removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 34 is typically connected to the system bus 46 through a non-removable memory interface such as interface 44, and magnetic disk drive 36 and optical disk drive 40 are typically connected to the system bus 46 by a removable memory interface, such as interface 48.

The drives and their associated computer storage media, discussed above and illustrated in FIG. 1, provide storage of computer readable instructions, data structures, program modules and other data for the computing system 10. In FIG. 1, for example, hard disk drive 34 is illustrated as storing operating system 78, application programs 80, other program modules 82 and program data 84. Note that these components may either be the same as or different from operating system 26, application programs 30, other program modules 30, and program data 32. Operating system 78, application programs 80, other program modules 82, and program data 84 are given different numbers hereto illustrates that, at a minimum, they are different copies.

A user may enter commands and information into the computing system 10 through input devices such as a tablet, or electronic digitizer, 50, a microphone 52, a keyboard 54, and pointing device 56, commonly referred to as a mouse, trackball, or touch pad. These and other input devices are often connected to the processing unit 14 through a user input interface 58 that is coupled to the system bus 18, but may be connected by other interface and bus structures, such as a parallel port, game port or a universal serial bus (USB).

A monitor 60 or other type of display device is also connected to the system bus 18 via an interface, such as a video interface 62. The monitor 60 may also be integrated with a touch-screen panel or the like. Note that the monitor and/or touch screen panel may be physically coupled to a housing in which the computing system 10 is incorporated, such as in a tablet-type personal computer. In addition, computers such as the computing system 10 may also include other peripheral output devices such as speakers 64 and printer 66, which may be connected through an output peripheral interface 68 or the like.

Computing system 10 may operate in a networked environment using logical connections to one or more remote computers, such as a remote computing system 70. The remote computing system 70 may be a personal computer, a server, a router, a network PC, a peer device or other common network node, and typically includes many or all of the elements described above relative to the computing system 10, although only a memory storage device 72 has been illustrated in FIG. 1. The logical connections depicted in FIG. 1 include a local area network (LAN) 74 connecting through network interface 86 and a wide area network (WAN) 76 connecting via modem 88, but may also include other networks. Such networking environments are commonplace in offices, enterprise-wide computer networks, intranets and the Internet.

For example, in the present embodiment, the computer system 10 may comprise the source machine from which data is being migrated, and the remote computing system 70 may comprise the destination machine. Note however that source and destination machines need not be connected by a network or any other means, but instead, data may be migrated via any media capable of being written by the source platform and read by the destination platform or platforms.

The central processor operating system or systems may reside at a central location or distributed locations (i.e., mirrored or stand-alone). Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor may read information from, and write information to, the storage medium. In the alternative, the storage medium may be integral to the processor. The processor and the storage medium may also reside in an ASIC. The bus may be an optical or conventional bus operating pursuant to various protocols that are well known in the art. A recommended system may include a Linux workstation configuration with a Linux 64-bit or 32-bit Red Hat Linux WS3 operating system, and an NVIDIA Quadro graphics card. However, the disclosed system may operate on a wide variety of Linux PC hardware, ranging from custom-built desktops to leading laptop vendors.

The present system may display an unlimited number of wells, logs, picks and grids in two dimensional correlation view. The system provides speed-optimized, interactive well correlation and interpretation with instant update of picks, grids and profiles in all views. The system allows a user to add, edit or delete tops and fault picks in all windows, including three-dimensions. Fast interwell pick interpretations with instant update of grids empower the user to define well-to-well and/or arbitrary cross-sections in two dimensional and three-dimensional. Fixed spacing correlation views and interactive switching between XYZ and fixed spacing views in two dimensional, as well as measured depth-based, fixed spacing correlation modes are provided. The user may move or generate new pick with "ghost curves" using any combination of curves in two dimensional.

The present disclosure allows the user to datum an entire data volume (including seismic and wells with and without datum top pick) in two dimensions and/or three-dimensions, display deviated and horizontal well templates in three-dimensions, as well as deviated wells with logs projected into the line of section. The present system provides true XYZ space two dimensional cross-section displays, and well-to-well and pick-based distance measurements. Additional features include interactive changes of line-of-section and associated wells with automatic recalculation of well projections, display independent curve fills in well template (e.g., lithology, fluid type).

The present disclosure provides posting the base map at base of three-dimensional box display. Interactive, graphical AOI redefinition with immediate two dimensional and three-dimensional update, together with net-to-gross maps based on well log cutoffs or calculated log curves. Speed-optimized three-dimensional minimum curvature and search radius mapping algorithms for horizons, faults, isochores and zone average maps.

The disclosed system Cascade Technology™: automatic update of all structures, isochores, and zone average maps in all views upon interpretation changes. Isochores from structural horizons in addition to calculated isochore pointsets. three-dimensional display of structure maps, isochores, and zone average maps. One-step conformable mapping one-step seismic tie to log picks. Tie fault surfaces to fault-picks in wells. Recursive conformable mapping between multiple horizons.

Display unlimited number of wells, logs, picks and grids in three-dimensional view. three-dimensional dip/azimuth pick display. Multiple three-dimensional pick marker types. Interactive three-dimensional visualization and editing of structural surfaces, isochores, and zone average maps. Immediate update of three-dimensional cross-section profiles. Interactive three-dimensional datuming of well logs, cross-sections and horizons. Interactive vertical and lateral scaling in three-dimensions. Interactive three-dimensional datuming of seismic cross-sections and slices. Interwell interpretation on cross section (including seismic backdrop). Three-dimensional and two dimensional seismic visualization of well-to-well cross-sections.

Figure 3:
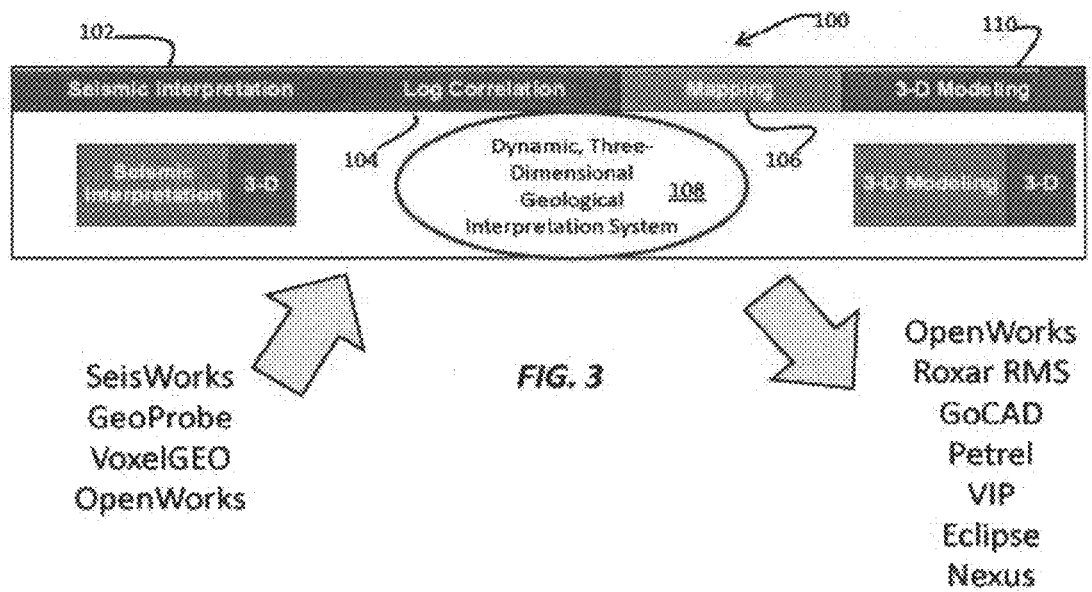

FIG. 2 depicts a three-window communication and workflow design process of the disclosed subject matter. FIG. 3 shows selected aspects of the three-dimensional interpretation environment for the disclosed method and system. In particular, geological interpretation environment 100 forms a process environment that augments and empowers a variety of pre-existing geological visualization and modeling systems. For example, in a seismic interpretation environment 102, a variety of applications provide the ability to interpret seismic data, some providing three-dimensional visualizations of seismic information. Such applications may include SeisWorks®, GeoProbe®, VoxelGEO®, and OpenWorks®, here disclosed. With data from such applications, the geological interpretation environment of the present disclosure operates in conjunction with log correlation functions 104 and mapping applications 106 to establish a dynamic three-dimensional geological interpretation set of functions 108.

In contrast to the known two-dimensional static, and extensively laborious, processes of extracting data and using from the various seismic interpretation programs, the disclosed system provides an interactive, dynamic, and automatic platform for three-dimensional geological interpretation. As a result of the information, knowledge, and intelligence that the disclosed system provides, further interface with three-dimensional modeling and other software systems 110 becomes increasing facile. Such programs may include the already-mentioned OpenWorks®, as well as other modeling systems, such as Roxar RMS®, Paradigm/EDS GOCAD®, SIS Petrel®, Landmark VIP®, SIS Eclipse®, and/or Landmark Nexus®, as well as other similarly capable programs and systems.

Figure 5:

FIGS. 4 and 5 yet further distinguish the result of the presently disclosed system from known programs. For instance, in FIG. 4 appear examples 120 conventional two-dimensional displays of geological interpretation results. One such result includes display 122 of picks interpreted on well log curves in a cross-section view. In such display, three-dimensional views are not available. In addition to well log data display, some known systems provide two-dimensional maps 124 of geological interpretations. Unfortunately, however, such systems provide a manually and laboriously controlled interface. Such interfaces show static displays which do not interactively respond to changes in pick locations or otherwise responds to dynamic queries that a user may desire.

FIG. 5, in contrast, shows examples of displays 130 and functions of the significantly more robust three-dimensional system of the present disclosure. For instance, such displays may include three-dimensional gamma ray well log overlay displays 132, combinations of seismic, horizontal wells and production interval data 134, and various stratigraphic overlays 136, as well as other dynamic displays and configurations as herein disclosed and described.

Figure 6:
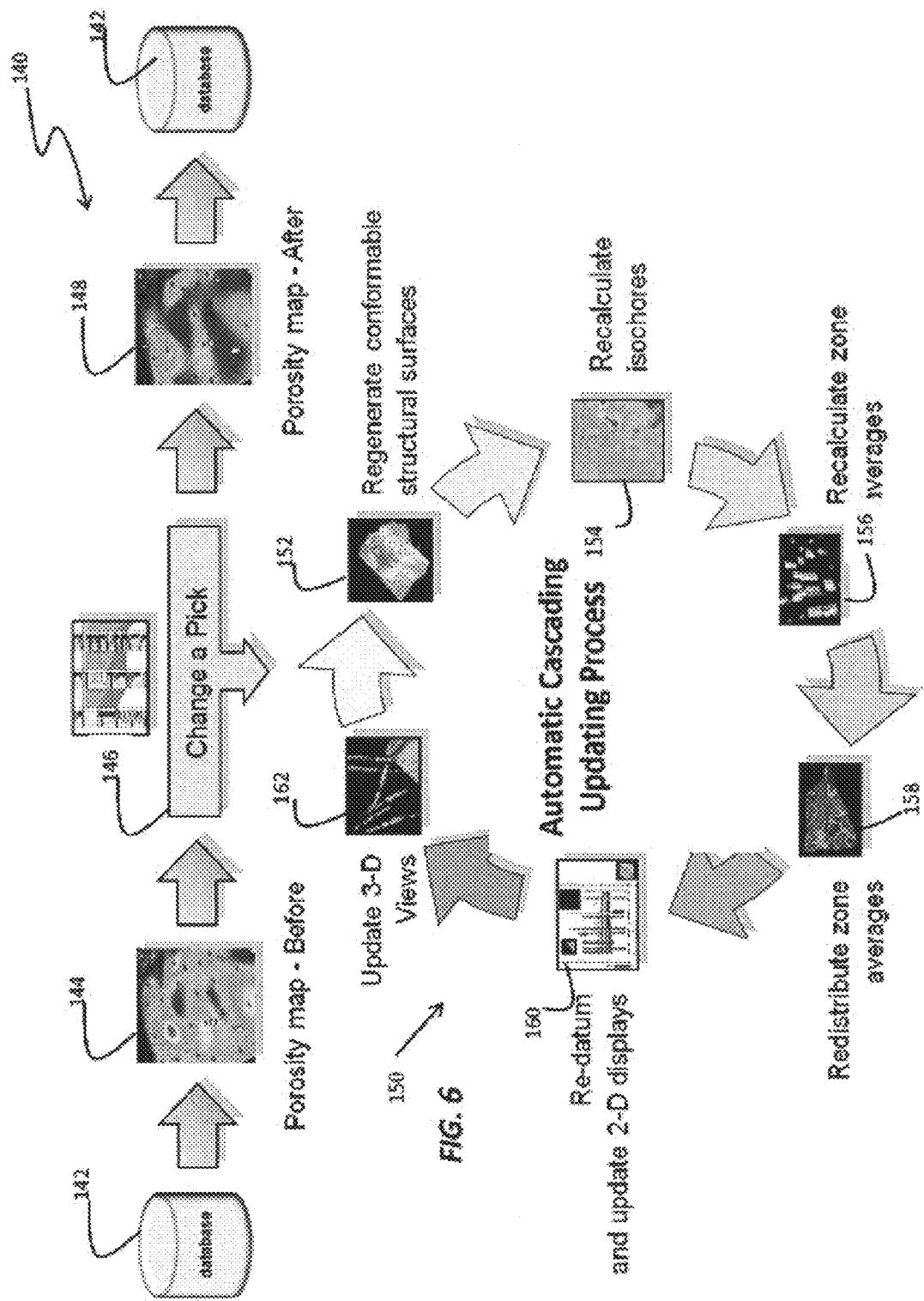
Figure 7:
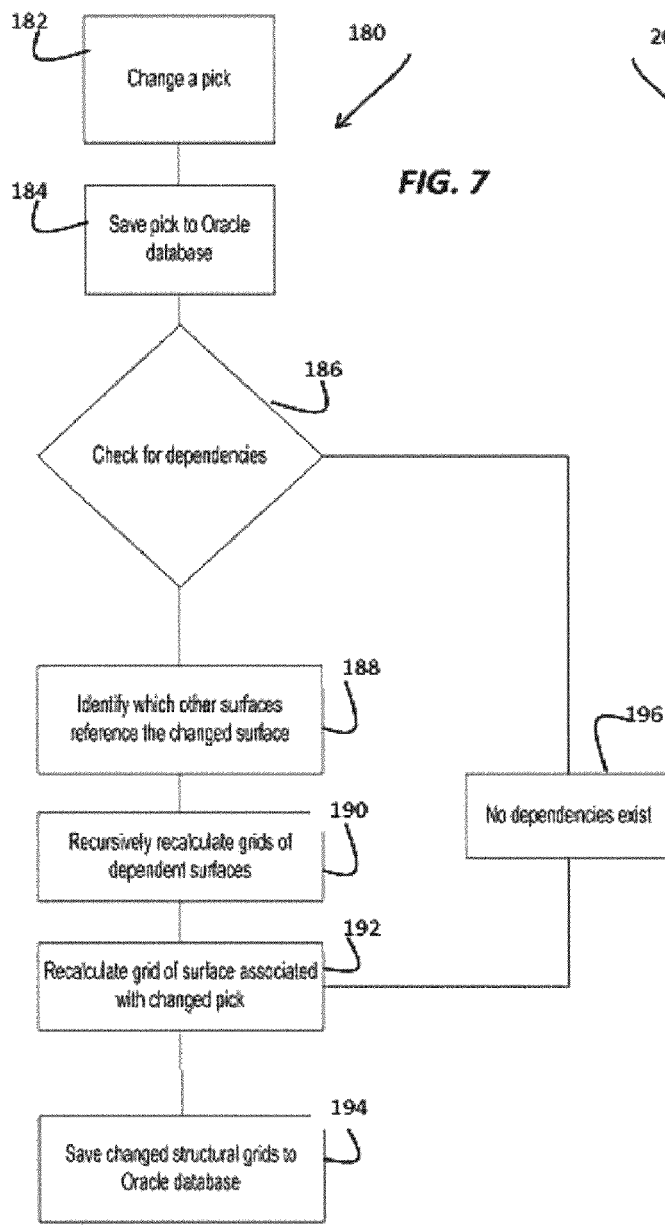

FIG. 6 shows important novel aspects of the presently dynamic, three-dimensional system 108, here referred to as cascading process 140. In the operation of geological interpretation system 140, a database 108 may be accessed to provide interpretation data 144 and other data describing the location and various related sets of information relating to a geological region. A valuable and novel aspect of the disclosed subject matter includes the ability to change a pick, as shown in step 144, and, in response to the changed pick, instantaneously produce a new porosity map 146 for the geological region. Afterwards, the new porosity map 146 may be stored in the same or a different database 148 for use in various applications.

FIG. 6 further shows the instantaneously update sub-process 150 of cascading process 140. Update process 150 begins at step 152 wherein a regeneration of the conformable structural surfaces occurs. Next, isochore recalculation occurs at step 154, followed by recalculation of zone averages at step 156. Step 158 shows the step of redistributing zone averages, and step 160 portrays the step of re-datuming and updating two-dimensional displays. Finally, at step 162, update process 150 updates the various three-dimensional views of system 108.

FIGS. 7 through 11 depict functional process diagrams for the steps of instantaneous update sub-process 150, as described above in FIG. 6. In particular, FIG. 7 describes the regeneration process 180 of the present embodiment for generating conformable structural surfaces following a pick change and which corresponds to step 152 of sub-process 150. Regeneration process 180 begins at step 182, wherein a user selects to change a pick. In response to the change, regeneration process 180 saves the pick to a database 142, such as an Oracle database, at step 184. At step 186, regeneration process 180 checks for dependencies. If there are dependencies, then, at step 188, regeneration process 180 identifies which other surfaces reference the changed surface. At step 190, regeneration process 180 recursively recalculates grids of dependent surfaces and at step 192 recalculates a grid of the surface associated with the changed pick. Also, if, at query 186, the determination was made of their being no dependencies, regeneration process 180 also progresses to step 192. Finally, at step 194, the changed structural grids are saved to the database 142

Figure 8:
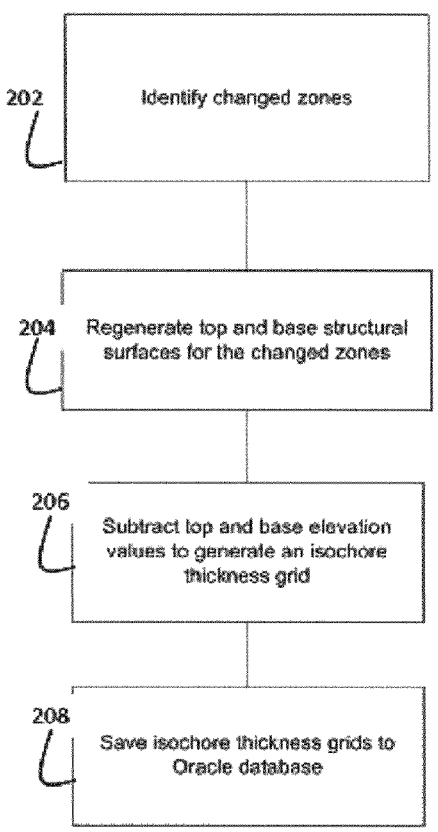

FIG. 8 depicts isochore recalculation process 200 of the present disclosure for regenerating isochores as corresponding to step 154 of sub-process 150. In particular, following regeneration process 180, isochore recalculation process 200 begins at step 202 for identifying changed zones. At step 204, recalculation process 200 regenerates top and base structural surfaces for the changed zones. Then, at step 206, recalculation process 200 subtracts top and base elevation values to generate an isochore thickness grid. Step 208 includes saving the isochore thickness grids to a database 142 and allows sub-process 150 to advance to step 156 wherein zone averages are recalculated.

Figure 9:
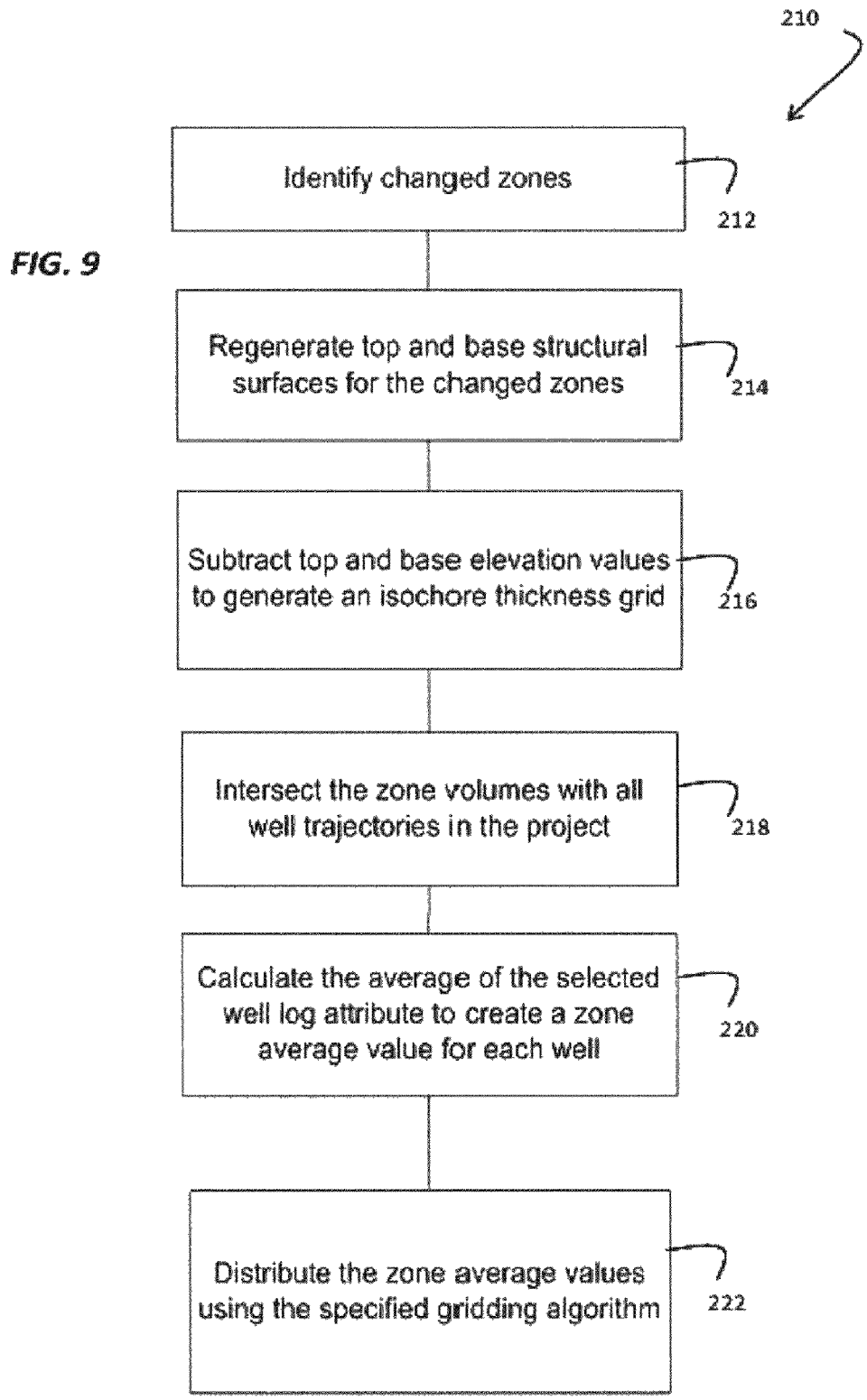

FIG. 9 illustrates flow diagram 210 corresponding to step 156 wherein sub-process 150 recalculates zone averages. Beginning at step 212, zone averaging process 210 identifies changed zones and then regenerates top and base structural surfaces for the changed zones at step 214. Zone averaging process 210 then subtracts top and base elevation values to generate an isochore thickness grid at step 216. At step 218, zone averaging process 210 intersects the zone volumes with all well trajectories in the project. Then, zone averaging process 210 continues, at step 220, to calculate the average of the selected well log attribute to create a zone average value for each well. At step 222, the process 210 distributes the zone average values using a pre-specified specified gridding algorithm and sub-process 150 flow continues to step 158, wherein the redistribution of zone averages occurs.

FIG. 10 exhibits re-datuming process 230 for further aspects of the cascade sub-process 150 including the step 158 of re-datuming and updating two-dimensional displays. Re-datuming process 230 begins at query 232 wherein the test of whether any displays are datumed occurs. If not, re-datuming process 230 terminates. Otherwise, process 230 proceeds to step 234 at which the step of updating structural surface profiles are displayed in the two-dimensional cross section view. Step 236 then follows whereupon updated isochores are displayed in the two-dimensional cross section view. Then, at step 238, the updated zone averages are displayed in the two-dimensional cross section view.

Re-datuming process 230 also includes step 240 for updating structural surfaces that are displayed in the basemap views, as well as step 242 for updating isochores displayed in the basemap view. Finally, re-datuming process 230 includes the step of updating zone averages in the basemap view. Then, the cascading sub-process 150 proceeds to step 162, wherein the three-dimensional views are updated.

FIG. 11 depicts three-dimensional updating process 250 of cascading sub-process 150. Three-dimensional updating process 250 begins at query 252 for the determination of whether there are any displays datumed. If not, updating process 250 terminates. If so, updating process 250 continues to step 254 wherein updating of structural surface profiles displayed in three-dimensional views occurs. At step 256, updated isochores are displayed in three-dimensional views. Step 258 represents the step of displaying updated zone average in three-dimensional views, and step 260 finally represents updating zone averages cylinders in three-dimensional views. Following updating process 250, as already mentioned, cascading sub-process 150 is complete at step 162 and a new porosity map 148 is displayed to the user.

Having described the essentially functionality of the cascading sub-process 150 for the presently disclosed system 108, what follows are elucidations of the capabilities here disclosed. To provide such descriptions, this disclosure presents a library of visualizations that the present method and system present to the user.

Figure 12:
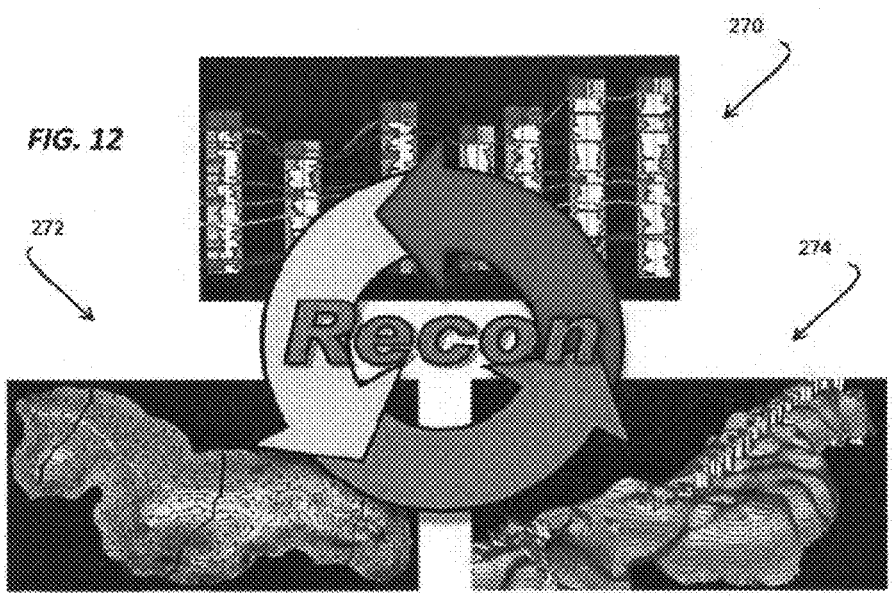

Because of the rich set of visualizations and interpretations here presented, the user clearly has the ability to perform geological interpretations and related analyses at the computer workstation. FIGS. 12 through 86 here described in more detail make such geological interpretations and analyses practical. Thus, what follows are a listing of the many screens available to a user.

FIG. 12 portrays geological interpretation as a single workflow application according to the present disclosure. The presently disclosed manipulable three-dimensional system, for example, allows the user to interpret in screen 270, which represents various pick sets with two-dimensional geological representations, and see the contents of screen 272 displays updated immediately. The results will also be updated in screen 274 which includes vivid multi-colored, 3-D contour maps of the subject geological region. The same results occur when interpreting in screen 272 or screen 274; the other windows will be automatically updated.

Figure 13:
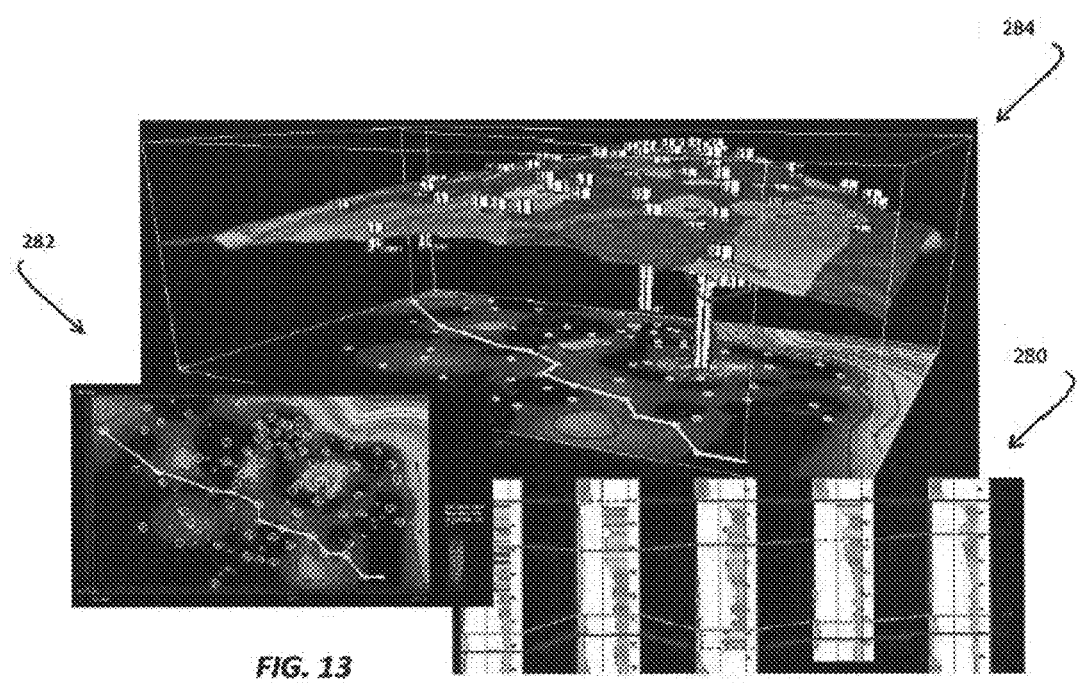
FIG. 13 depicts aspects of geological interpretation using a three-window communication and workflow user interface.
Figure 16:
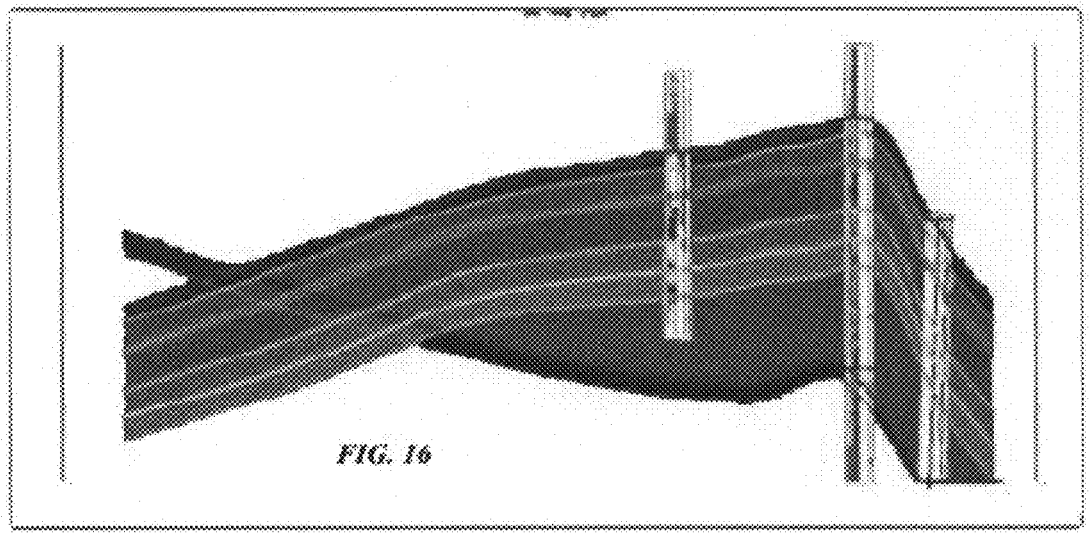
Figure 17:
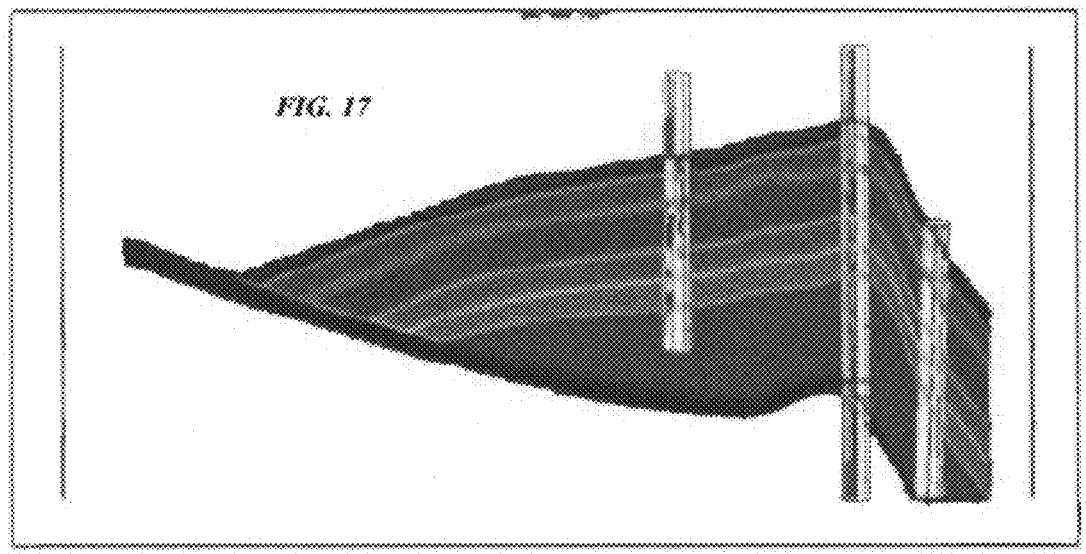
Figure 18:
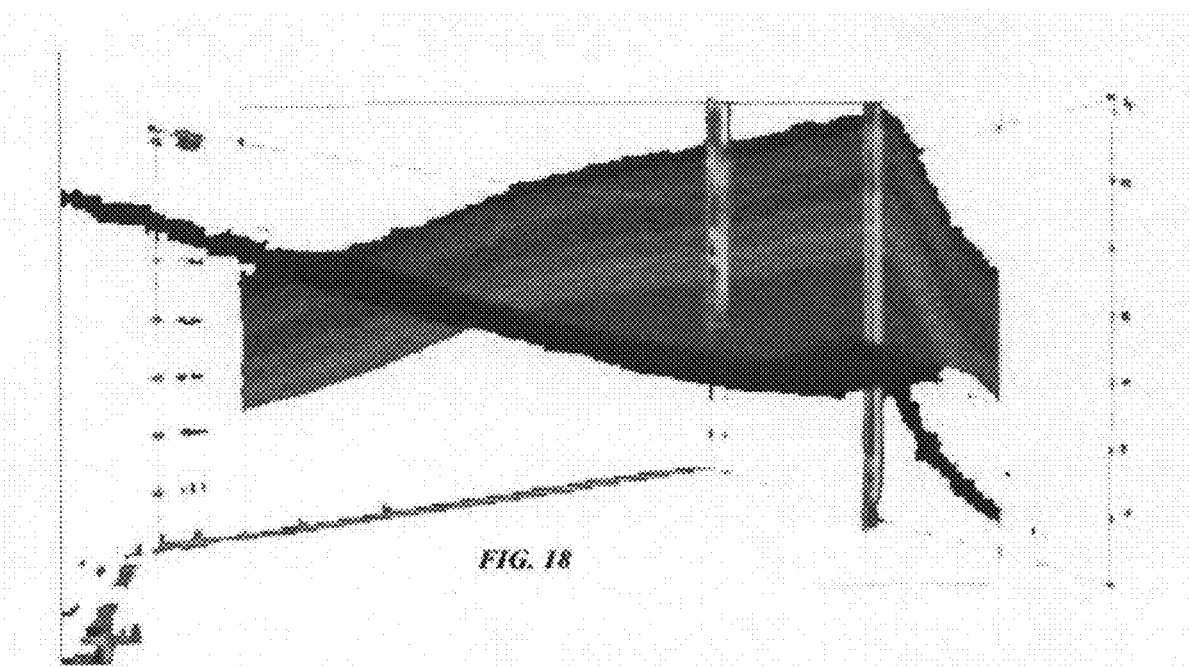
Figure 19:
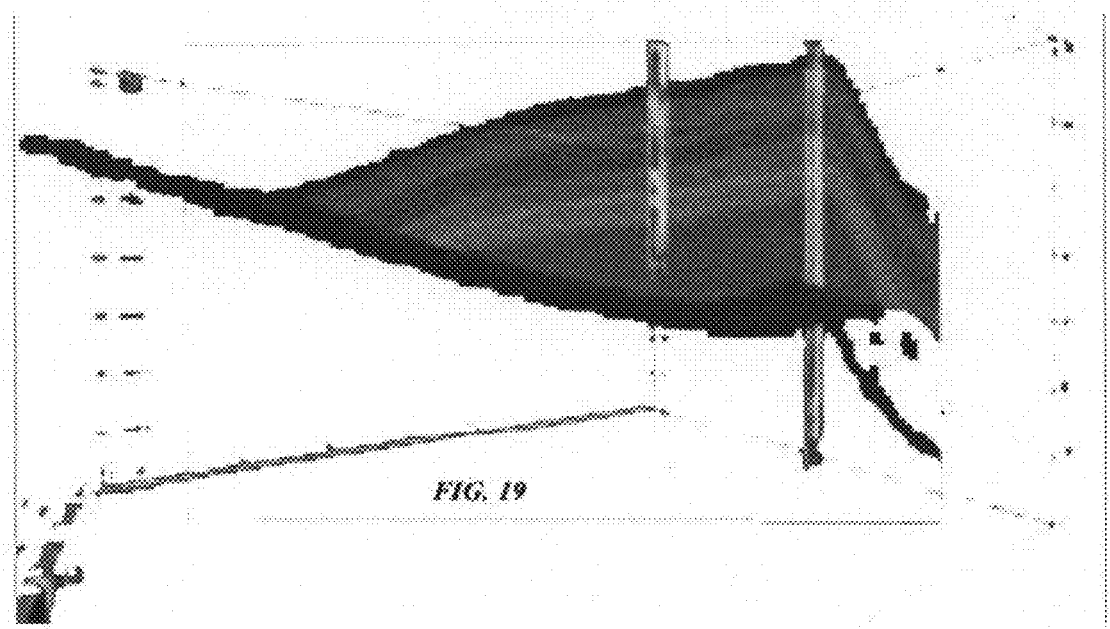

FIG. 13, likewise, depicts aspects of geological interpretation using a three-window communication and workflow user interface. In FIG. 13, pick data screen 280 presents to the user information that may be integrated with two-dimensional geological map information and image 282. The result becomes three-dimensional visualization 284. A key advantage of the present disclosure includes the ability to dynamically generate three-dimensional interpretation visualizations 284 in real-time.

FIG. 14 shows the disclosed functions of immediately updating all interpretational changes in all views of the present geological interpretation system. Thus, with a change in screen shot 290 relating to pick data, the presently disclosed system will automatically update screen shots 292, for showing in three dimensions the new pick or pick data, as well as cross-section screen shot 294 and base map view screen shot 296. FIG. 15 shows how the present system communicates data with a plurality of third-party geological data management systems. FIGS. 16 through 19 exhibit integrating stratigraphic erosional rules into the present geological interpretation system.

FIGS. 20 through 22 show importing log curve data into the present system. FIGS. 23 and 24 importing three-dimensional seismic data into the present system. FIGS. 25 and 26 display importing deviated and horizontal well data into the present system.

Figure 27:
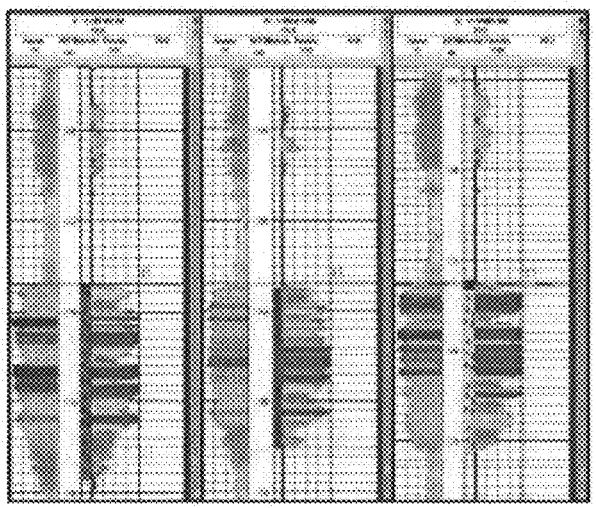
Figure 28:
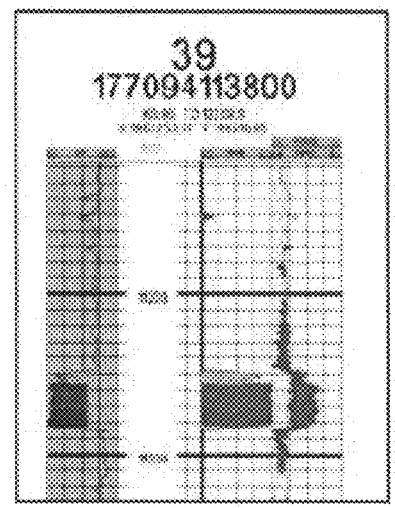
Figure 29:
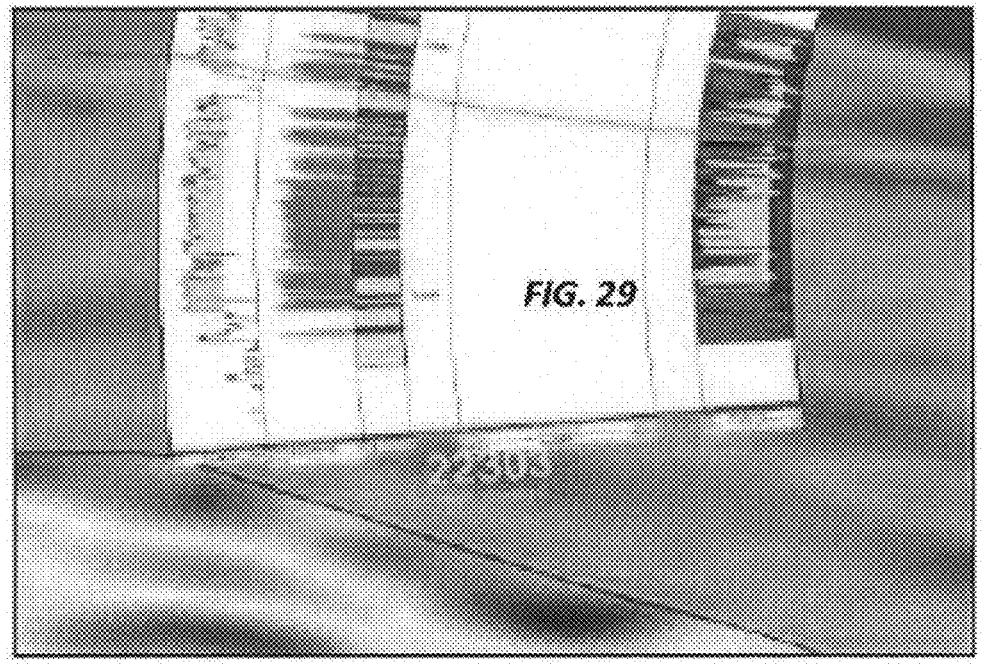
Figure 30:
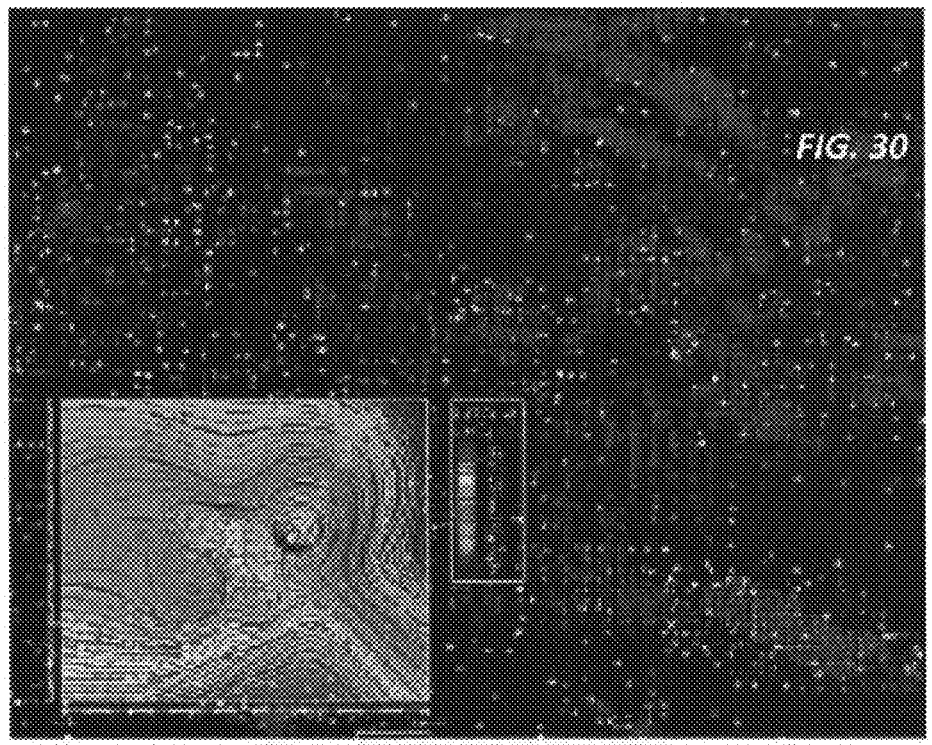

FIGS. 27 through 30 depict an instance of importing well header data into the present geological interpretation system. In particular, FIGS. 27 and 28 show two-dimensional pick plots of information derived from a prior geological survey. Based on this information, FIGS. 29 and 30 display how the information of FIGS. 27 and 28 may appear in a three-dimensional visualization of the subject geological region using the functions and features of the presently disclosed system. FIGS. 31 and 32 further show importing interval data into the present system.

FIGS. 33 and 34 present views of importing pointset data into the present geological interpretation system. FIG. 35 shows exporting grid and map data from the present system. FIGS. 36 and 37 depict graphical data querying and filtering in association with manipulation of the present system. FIG. 38 shows adding three-dimensional editable pick representations in association with manipulation of the present system. FIGS. 39 and 40 provide views of interwell pick interpretation in association with manipulation of the present system. FIGS. 41 and 42 exhibit forming cross-sectional definitions in association with manipulation of the present geological interpretation system.

FIG. 43 shows forming correlation representations of the predetermined geological region from the present geological interpretation system. In particular, FIG. 43 outlines the options for understanding three-dimensional geology cross section displays and projection modes available in the present system. Such options include the ability to select fixed spacing and distance spacing visualizations, as well as measured depth representations. The visualizations provide stratigraphic datum displays, template display styles, and true stratigraphic thickness presentations. In addition, a user may select seismic backdrop representations.

FIGS. 44 and 45 present performing three-dimensional thickness calculations in association with manipulation of the present system. FIGS. 46 and 47 show displays from the group consisting essentially of structure maps, isochore maps, and well log zone average maps in association with manipulation of the present geological interpretation system. In particular, FIG. 46, with its set of two-dimensional screen shots 300, 302, and 304. provide color visualizations of a geological region that may include a set of related picks. While such information is highly useful, it simply does not compare to the three-dimensional visualizations appearing in respectively corresponding screen shots 306, 308, and 310 of FIG. 47. In particular, screen shot 308 shows how a full set of picks may be integrated with a contour visualization. Screen shot 310, moreover, shows how the three-dimensional pick representations of screen shot 308 may be rotated, enlarged, and shown in perspective view as is not possible in corresponding screen shot 304 of FIG. 46.

FIGS. 48 and 49 display seismic slices of the predetermined geological region. FIGS. 50 and 51 show how net-to-gross maps are generated based on well log cutoffs or calculated log curves for the predetermined geological region in association with manipulation of the present system. FIG. 52 present performing surface and fault modeling of the predetermined geological region in association with manipulation of the present system.

FIGS. 53 through 55 show forming isochore visualizations of the predetermined geological region from the present geological interpretation system, including isochores from structural horizons in addition to isochores calculated from isochore pointsets. That is, with reference to FIG. 53, there appear two representations 320 and 322 of the same set of isochore measurements taken at picks 324, 326, 328, and 330. In the case of isochore creation using top and base picks: Well 324 includes measured picks 332 and 334 and Well 326 includes picks 336 and 338. In this case, no isochore values are calculated for isochore 328 and 330, because the top and base picks are not both present. Well 328, in contrast only includes pick measurement 340, while well 330 only includes point measurement 342. The resulting isochore map generated using this dataset is therefore not inclusive of all available data.

The presently disclosed system may determine that the pick measurements 332, 336, and 340 form a structural horizon 344. Likewise pick measurements 334, 338, and 342 form a structural horizon 346. This is determined even though there is not a pick measurement on well 328 to associate with structural horizon 346. Nor is there a pick measurement on well 330 to associate with structural horizon 344. The present system, that is, has the ability to associate utilize all picks and the resulting structural horizons to calculate isochore pointsets that result in the determination of structural horizons.

FIG. 54 shows the isochore calculated only using those wells where both the top and base picks for the zone are defined. FIG. 55 shows the isochore calculated while utilizing all picks for the top and base surfaces. FIGS. 56 and 57 show forming well log zone average visualizations of the predetermined geological region from the present system, including isochores from structural horizons in addition to zone averages calculated from zone average pointsets. FIGS. 58 and 59 exhibit functions of performing one-step conformable mapping operations for the predetermined geological region from the present system. FIG. 60 shows performing a one-step seismic tie to log pick operations on the predetermined geological region from the present system.

FIG. 61 presents how the present system executes a set of instructions for tying fault surfaces to fault-picks in selected wells of the predetermined geological region from the present system. FIGS. 62 and 63 present how the present system executes a set of instructions for performing recursive conformable mapping operations between multiple horizons of the predetermined geological region using the present system. FIG. 64 displays draping external grid values onto three-dimensional structure maps of the predetermined geological region from the present geological interpretation system. FIG. 65 shows three-dimensional dip/azimuth pick displays for picks measured on the predetermined geological region using the present geological interpretation system. FIGS. 66 and 67 relate to performing surface modeling operations using three-dimensional dip/azimuth pick information of the predetermined geological region using the present system—The Dip/azimuth information contained in the picks is honored by all surface modeling algorithms.

FIGS. 68 and 69 relate to performing interactive three-dimensional datuming of seismic cross-sections and slices of the predetermined geological region from the present system. FIGS. 70 and 71 relate to forming three-dimensional visualizations of cross-sections for wells of the predetermined geological region from the present system. FIG. 72 display views of forming three-dimensional visualizations of seismic fence diagrams of the predetermined geological region from the present system. FIG. 73 shows performing interactive seismic opacity filtering for a plurality of views of the predetermined geological region. FIG. 74 through 76 exhibit forming stratigraphic slicing of three-dimensional seismic volumetric interpretations of the predetermined geological region.

FIG. 77 depicts forming color-filled three-dimensional contours of the predetermined geological region from the present geological interpretation system. FIGS. 78 and 79 illustrate performing interactive filtering of three-dimensional structure and zone average maps of the predetermined geological region from the present geological interpretation system. FIG. 80 shows displays utilizing substitute curves for missing log curve data for a particular well from the predetermined geological region. FIG. 81 through 83 display how the present system and process function in integrating time-stamped production and completion intervals. Finally, FIGS. 84 through 86 illustrate how the present system presents in multi-dimensional images changes in energy resource injection volumes over time.

Then, having described the various illustrative three-dimensional displays, the following description shows various ways in which the dynamic, real-time three-dimensional updating and geological interpretation functions support interpretation of an essentially unlimited number of well logs in two- and three-dimensional space. A grid of sequence stratigraphic cross-sections may be generated across the entire field within which one may recognize geological features, such as a carbonate ramp, made up of high-frequency depositional sequences.

Isochore and zone attribute maps of sequence stratigraphic units showed the distribution of reservoir facies through time. As correlation changes may be made, the maps may be instantaneously updated, allowing for quick reinterpretation. For an oil field that contains hundreds of horizontal wells that penetrate a reservoir interval containing more than 1,000 faults, the challenge of interpreting chrono- and lithostratigraphic picks in the hundreds of horizontal wells may be significantly reduced by system 108, which correlates these wells directly in three-dimensions, without the need for creating complex, and often confusing, projections of the three-dimensional well trajectories into two dimensional cross-sections.

Horizons interpreted in seismic interpretation software may be imported for comparison with the well log-based picks. After correcting the stratigraphic picks in the wells, any structural anomalies caused by velocity variations may be corrected with the click of a button, upon which the seismic horizon may be tied to the final picks, while also honoring the seismic horizons and faults. The well log correlation of hundreds of horizontal and vertical wells may be aided by the integration of dynamic production data, including production and injection intervals.

All interval data may be displayed in both the well log templates as well as cylinders along the three-dimensional trajectories of the well logs in three-dimensional. Because all interval data may be time-stamped, three-dimensional queries may be performed, leading to the corroboration of correlation hypotheses, as well as providing insight into development related issues affecting the day-to-day operation of the field.

The end result of the integration of all the available data may be a robust correlation of the sequence stratigraphic framework of the field, combining all horizontal wells, faults, seismic horizons and production data. System 108 provides a central database environment for storing a wide range of data types, allowing applications to more easily access and share data crucial to the successful interpretation of a field. The system communicates with as many industry-standard databases as possible, while also focusing on direct interaction with all available best-of-class software applications.

The cascading sub-process 150 allows changing one parameter and, in response to the change, automatically modifies an entire interpretation for the affected geological region. For example, if the user shows a porosity map for a zone in the base map, and then makes a change to the top structure pick for that zone, cascading sub-process 150 will automatically update all parameters required for the final update of the porosity map (i.e., all the steps shown in the circular diagram).

After placing the pick for the top of the channel, cascading sub-process will automatically regenerate the top of channel structural surface using the new top pick, the base of the channel surface, re-datum the wells using the new structures. Then cascading sub-process 150 automatically regenerates the zone average values at the wells using the new structures, distribute the zone average values across the reservoir, and applies the porosity cutoff filter. Then, system 108 will show the updated display in three-dimensional, base map, and cross-section views.

System 108 provides a flexible, free-form interval database that adjusts to the data instead of forcing the user to conform to a predefined data structure. This enables the interpreter to quickly and easily integrate contextual interval data from a wide range of sources. The larger the variety of data that is made available in the disclosed system's three-dimensional interpretation environment, the higher the quality of the resulting interpretation will be.

The data to define any interval includes class name (e.g., facies or production), type name (e.g., grainstone or perforated), top measured depth, base measured depth, and well name or UWI. A simple space delimited, column based text file containing interval data may be imported using the wizard. System 108 will automatically construct a spreadsheet with multiple sheets representing the various classes containing the interval types. After importing the intervals, the user may create, combine, or delete classes and types and assign colors and fill patterns for the individual interval types. Optional interval attributes include start and stop time, value, and text remarks.

System 108 defines intervals in the disclosed system, which may be defined and edited directly on the wells displayed in a two-dimensional correlation window. The user may click and drag the computer 10 cursor to define an interval for both straight and deviated wells, as well as drag-and-drop defined intervals between wells to speed up interactive interval interpretation workflow.

The user may select and edit intervals directly in three-dimensions. After selecting an interval, the user may change the class, type, interval depth or values. All intervals may be time stamped using start and stop dates. The user may perform such queries as "show all injection intervals with volumes greater than 500 b/d from 2001 through 2004" and see the results displayed in three-dimensions.

All intervals may be referenced in well log templates. The user may combine the interval data with log curves to highlight facies changes or completion intervals. The user may fill a log curve with an interval class, which will automatically pick up all types with their color and pattern fill parameters. Depth-referenced text comments may be placed in templates using the interval remark fields. Intervals may be calculated and used in equations in the disclosed system log calculator.

The disclosed geological interpretation system's two dimensional correlation view may datum any seismic cross-section based on any three-dimensional horizon. This stratigraphic datum mode is very useful when interpreting subtle stratigraphic traps. Using the disclosed geological interpretation system cascading sub-process 150, an interpreter may drag-and-drop picks for a datum horizon and see the seismic cross-section shift in real-time.

The geological interpretation system 108 ability to load an unlimited number of wells to be displayed in the base map does not force the user to map horizons over the entire project area. An interpreter may easily resize the project area-of-interest (AOI) in the base map, after which the disclosed system will automatically redisplay the requested map using the same mapping parameters (e.g., a porosity map for a particular zone) specified by the user. Real-time roaming through the base map is accomplished by simply clicking and dragging a new AOI rectangle. A unique advantage of this feature is to enable the merging of both regional scale well log and seismic data with detailed field level data in a single the disclosed system project. This ensures that interpretations are kept consistent between regional and local scales, providing for a more accurate geological interpretation—the disclosed system's base map roaming is an example of its scalable applicability ranging from small, early stage exploration projects through large, mature development projects.

The three-dimensional geological interpretation workflows here disclosed are aided by its linked two dimensional correlation views. To bridge the spatial differences between these two dimensional representations and the three-dimensional world, the disclosed system allows the interpreter to change lines-of-section in the base map in real-time and to observe the immediate re-projection of these wells in the two dimensional cross-section view. Apart from changing the line-of-section in real-time, the interpreter may also change which wells are projected into the line-of-section. Clicking on the wells in the base map or in 3-D will add or subtract projected wells from the two dimensional correlation view. The direct link between the two dimensional and three-dimensional interpretation views helps geoscientists more quickly determine the optimal geological interpretation.

The interpretation while drilling (IWD) workflows of system 108 may be integrated with the three-dimensional geological interpretation environment, combining three-dimensional views with cross-section and base map views to give the asset team the most comprehensive view of the subsurface situation and enabling the team to change its interpretations on the fly.

There are several ways to integrate logging while drilling (LWD) data and measurement while drilling (MWD) into the disclosed system during the drilling process. With the disclosed system, the user may qualitatively and quantitatively check whether user grid honors the input data points by visualizing user log data, user interpreted picks, and the surfaces based on user interpretation in three-dimensional. Users canoverlay three-dimensional log templates of horizontal wells onto a faulted surface mapped conformable to a seismic horizon.

The disclosed system may access three-dimensional seismic data directly from Landmark SeisWorks® projects and may visualize seismic data along user-defined cross-sections, and along in-lines and cross-lines for both the seismic project and the geological area-of-interest. Seismic time-slices may also be shown in three-dimensions and in the base map. All visualization is performed in real-time, allowing the user to dynamically drag cross-sections across the volume to interactively interpret the wells-logs in conjunction with the seismic.

As with all of the disclosed three-dimensional cross-sections, the seismic cross-sections may be datumed interactively in two dimensional and three-dimensional, and the user may continue to interpret in the stratigraphically datumed seismic view. Besides seismic color ramp controls, the disclosed system may apply opacity and filtering parameters to the seismic shown in three-dimensions.

Interactive XY grid increment changes. All the disclosed system structural surface grids share the gridding area-of-interest parameters defined in the limits dialog. This allows the user to change the X and Y increments for all of the disclosed system structure grids at one time. The user may use this feature to reduce the amount of time spent in generating structural surfaces. For example, the user may initially generate all structural surfaces at a relatively large XY increment ensuring quick response during interpretation.

One example of the advantages of having a true three-dimensional foundation may be found in the disclosed system's ability to automatically back-interpolate picks at the location where a structural surface intersects a well without a pick for that surface. In its two dimensional correlation view the disclosed geological interpretation, system uses these back-interpolated picks to shift wells without picks for the datum surface to the datum, thus improving the correlation workflow.

In geological interpretation system 108, the user may switch between two different zone thickness calculation methods on the fly. The user may have the disclosed system calculate thickness values between top and base picks at the well and pass this point set to the various gridding algorithms. Alternatively, the disclosed system may generate the individual top and base surfaces using different algorithms and then calculate the thickness between them using a grid operation. The added advantage of generating isochores from structural grids is that the user may access the disclosed system's conformable gridding functionality to incorporate relations between structural horizons as well as seismic structure information in the interwell region.

Geological interpretation system 108 saves significant amounts of time and resources by enabling the user to off-load all of the interpretation-dependent three-dimensional modeling tasks to the disclosed system. Using system's dynamic zone averaging, a quick study of the influence of sampling intervals on vertical heterogeneity may be made.

In summary, the present disclosure provides a method and system for performing geological interpretation operations in support of energy resources exploration and production perform well log correlation operations for generating a set of graphical data describing the predetermined geological region. The process and system interpret the geological environment of the predetermined geological region from measured surface and fault data associated with the predetermined geological region. Allowing the user to query and filter graphical data representing the predetermined geological region, the method and system present manipulable three-dimensional geological interpretations of two-dimensional geological data relating to the predetermined geological region and provide displays of base map features associated with the predetermined geological region. The method and system automatically update the manipulable three-dimensional geological interpretations of two-dimensional data relating to the predetermined geological region, as well as calculate three-dimensional well log and seismic interpretations of geological data relating to the predetermined geological region. Moreover, time-related visualizations of production volumes relating to the predetermined geological region are provided for enhancing the ability to interpret and model various geological properties of various geological regions.

The processing features and functions described herein for a method and system for dynamic, three-dimensional geological interpretation and modeling may be implemented in various manners. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Thus, the claimed subject matter is not intended to be limited to the embodiments shown herein but is to be accorded the widest scope consistent with the principles and novel features disclosed herein.

We claim:

1. A system for performing geological interpretation operations in support of energy resources exploration and production, comprising:
   a storage medium for storing a plurality of instructions for execution; and
   a processor for receiving said plurality of instructions and executing a set of steps for geological interpretation, said steps comprising:
   performing well log correlation operations, comprising forming dynamic cross-sections of a predetermined geological region for energy resources exploration and production, for generating a set of graphical data describing said predetermined geological region;
   interpreting the geological environment of said predetermined geological region from measured surface and fault data associated with said predetermined geological region;
   permitting the querying and filtering of graphical data representing said predetermined geological region;
   presenting manipulable three-dimensional geological interpretations of two-dimensional geological data relating to said predetermined geological region;
   displaying a plurality of base map features associated with said predetermined geological region;
   automatically updating said manipulable three-dimensional geological interpretations of two-dimensional data relating to said predetermined geological region;
   creating three-dimensional well log and seismic interpretations of geological data relating to said predetermined geological region; and
   presenting time-related visualizations of production volumes relating to said predetermined geological region.

2. The system of claim 1, wherein said processor further executes a set of instructions for performing said set of steps for geological interpretation as a single workflow application.

3. The system of claim 1, wherein said processor further comprises circuitry and instructions for automatic reprojections of well trajectories into the cross-sections.

4. The system of claim 1, wherein said processor further comprises circuitry and instructions for drag & drop repositioning of cross-section in basemap with immediate updates in multi-dimensional correlation views.

5. The system of claim 1, wherein said processor further comprises circuitry and instructions for 3-D graphical drag & drop of surface & fault picks for said predetermined geological region.

6. The system of claim 1, wherein said processor further comprises circuitry and instructions for 3-D graphical drag & drop of interwell surface picks, fault picks, and points for said predetermined geological region.

7. The system of claim 1, wherein said processor further comprises circuitry and instructions for interpretation of surfaces & faults on seismic cross-sections in 3-D for said predetermined geological region.

8. The system of claim 1, wherein said processor further executes a set of instructions for performing said set of steps for geological interpretation using a three-window communication and workflow user interface.

9. The system of claim 1, wherein said processor further executes a set of instructions for immediately updating all interpretational changes in all views of said manipulable three-dimensional geological interpretations.

10. The system of claim 1, wherein said processor further executes a set of instructions for communicating data with a plurality of third-party geological data management systems.

11. The system of claim 1, wherein said processor further executes a set of instructions for integrating stratigraphic erosional rules into said manipulable three-dimensional geological interpretations.

12. The system of claim 1, wherein said processor further executes a set of instructions for importing log curve data into said manipulable three-dimensional geological interpretations.

13. The system of claim 1, wherein said processor further executes a set of instructions for importing three-dimensional seismic data into said manipulable three-dimensional geological interpretations.

14. The system of claim 1, wherein said processor further executes a set of instructions for importing deviated and horizontal well data into said manipulable three-dimensional geological interpretations.

15. The system of claim 1, wherein said processor further executes a set of instructions for importing well header data into said manipulable three-dimensional geological interpretations.

16. The system of claim 1, wherein said processor further executes a set of instructions for importing interval data into said manipulable three-dimensional geological interpretations.

17. The system of claim 1, wherein said processor further executes a set of instructions for importing pointset data into said manipulable three-dimensional geological interpretations.

18. The system of claim 1, wherein said processor further executes a set of instructions for exporting grid and map data from said manipulable three-dimensional geological interpretations.

19. The system of claim 1, wherein said processor further executes a set of instructions for graphical data querying and filtering in association with manipulation of said manipulable three-dimensional geological interpretations.

20. The system of claim 1, wherein said processor further executes a set of instructions for adding three-dimensional editable pick representations in association with manipulation of said manipulable three-dimensional geological interpretations.

21. The system of claim 1, wherein said processor further executes a set of instructions for interwell pick interpretation in association with manipulation of said manipulable three-dimensional geological interpretations.

22. The system of claim 1, wherein said processor further executes a set of instructions for forming cross-sectional definitions in association with manipulation of said manipulable three-dimensional geological interpretations.

23. The system of claim 1, wherein said processor further executes a set of instructions for forming correlation representations of said predetermined geological region from said manipulable three-dimensional geological interpretations.

24. The system of claim 1, wherein said processor further executes a set of instructions for performing three-dimensional thickness calculations in association with manipulation of said manipulable three-dimensional geological interpretations.

25. The system of claim 1, wherein said processor further executes a set of instructions for displaying from the group consisting essentially of structure maps, isochore maps, and well log zone average maps in association with manipulation of said manipulable three-dimensional geological interpretations.

26. The system of claim 1, wherein said processor further executes a set of instructions for displaying seismic slices of said predetermined geological region.

27. The system of claim 1, wherein said processor further executes a set of instructions for manipulating net-to-gross maps based on well log cutoffs or calculated log curves for said predetermined geological region in association with manipulation of said manipulable three-dimensional geological interpretations.

28. The system of claim 1, wherein said processor further executes a set of instructions for performing surface modeling of said predetermined geological region in association with manipulation of said manipulable three-dimensional geological interpretations.

29. The system of claim 1, wherein said processor further executes a set of instructions for forming isochore visualizations of said predetermined geological region from said manipulable three-dimensional geological interpretations—Isochores from structural horizons in addition to isochors calculated from pointsets.

30. The system of claim 1, wherein said processor further executes a set of instructions for forming well log zone average visualizations of said predetermined geological region from said manipulable three-dimensional geological interpretations—Isochores from structural horizons in addition to zone averages calculated from pointsets.

31. The system of claim 1, wherein said processor further executes a set of instructions for performing one-step conformable mapping operations for said predetermined geological region from said manipulable three-dimensional geological interpretations.

32. The system of claim 1, wherein said processor further executes a set of instructions for performing one-step seismic tie to log pick operations on said predetermined geological region from said manipulable three-dimensional geological interpretations.

33. The system of claim 1, wherein said processor further executes a set of instructions for tieing fault surfaces to fault-picks in selected wells of said predetermined geological region from said manipulable three-dimensional geological interpretations.

34. The system of claim 1, wherein said processor further executes a set of instructions for performing recursive conformable mapping operations between multiple horizons of said predetermined geological region using said manipulable three-dimensional geological interpretations.

35. The system of claim 1, wherein said processor further executes a set of instructions for forming overlay of external grid values onto three-dimensional structure maps of said predetermined geological region from said manipulable three-dimensional geological interpretations.

36. The system of claim 1, wherein said processor further executes a set of instructions for forming overlay of values from the group consisting essentially of satellite images, culture data, annotations, and fault polygons on surfaces onto three-dimensional structure maps of said predetermined geological region from said manipulable three-dimensional geological interpretations.

37. The system of claim 1, wherein said processor further executes a set of instructions for forming three-dimensional dip/azimuth pick displays for picks measured on said predetermined geological region using said manipulable three-dimensional geological interpretations.

38. The system of claim 1, wherein said processor further executes a set of instructions for performing surface modeling operations using three-dimensional dip/azimuth pick information of said predetermined geological region using said manipulable three-dimensional geological interpretations.

39. The system of claim 1, wherein said processor further executes a set of instructions for performing interactive three-dimensional datuming of seismic cross-sections and slices of said predetermined geological region from said manipulable three-dimensional geological interpretations.

40. The system of claim 1, wherein said processor further executes a set of instructions for forming three-dimensional visualizations of cross-sections for wells of said predetermined geological region from said manipulable three-dimensional geological interpretations.

41. The system of claim 1, wherein said processor further executes a set of instructions for forming a set of fence diagrams of seismic backdrop cross-sections of said predetermined geological region from said manipulable three-dimensional geological interpretations.

42. The system of claim 1, wherein said processor further executes a set of instructions for performing interactive seismic opacity filtering for a plurality of views of said predetermined geological region.

43. The system of claim 1, wherein said processor further executes a set of instructions for forming stratigraphic slicing of three-dimensional seismic volumetric interpretations of said predetermined geological region.

44. The system of claim 1, wherein said processor further executes a set of instructions for forming color-filled three-dimensional contours of said predetermined geological region from said manipulable three-dimensional geological interpretations.

45. The system of claim 1, wherein said processor further executes a set of instructions for performing interactive filtering of three-dimensional structure and zone average maps of said predetermined geological region from said manipulable three-dimensional geological interpretations.

46. The system of claim 1, wherein said processor further executes a set of instructions for displaying substitute curves for missing log curve data from said predetermined geological region.

47. The system of claim 1, wherein said processor further executes a set of instructions for integrating time-stamped production and completion intervals.

48. The system of claim 1, wherein said processor further executes a set of instructions for presenting in multi-dimensional images changes in energy resource injection volumes over time.

49. A method for performing geological interpretation operations in support of energy resources exploration and production, comprising the steps of:
performing well log correlation operations, comprising forming dynamic cross-sections of a predetermined geological region for energy resources exploration and production, for generating a set of graphical data describing said predetermined geological region;
interpreting the geological environment of said predetermined geological region from measured surface and fault data associated with said predetermined geological region;
permitting the querying and filtering of graphical data representing said predetermined geological region;
presenting manipulable three-dimensional geological interpretations of two-dimensional geological data relating to said predetermined geological region;
displaying a plurality of base map features associated with said predetermined geological region;
automatically updating said manipulable three-dimensional geological interpretations of two-dimensional data relating to said predetermined geological region;
calculating three-dimensional well log and seismic interpretations of geological data relating to said predetermined geological region; and presenting time-related visualizations of production volumes relating to said predetermined geological region.

50. The method of claim 49, further comprising the step of integrating time-stamped production and completion intervals.

51. The method of claim 49, further comprising the step of presenting in multi-dimensional images changes in energy resource injection volumes over time.

52. The method of claim 49, further comprising the step of performing said set of steps for geological interpretation as a single workflow application.

53. The method of claim 49, further comprising the step of performing said set of steps for geological interpretation using a three-window communication and workflow user interface.

54. The method of claim 49, further comprising the step of immediately updating all interpretational changes in all views of said manipulable three-dimensional geological interpretations.

55. The method of claim 49, further comprising the step of communicating data with a plurality of third-party geological data management systems.

56. The method of claim 49, further comprising the step of integrating stratigraphic erosional rules into said manipulable three-dimensional geological interpretations.

57. The method of claim 49, further comprising the step of importing log curve data into said manipulable three-dimensional geological interpretations.

58. The method of claim 49, further comprising the step of importing three-dimensional seismic data into said manipulable three-dimensional geological interpretations.

59. The method of claim 49, further comprising the step of importing three-dimensional seismic file data into said manipulable three-dimensional geological interpretations.

60. The method of claim 49, further comprising the step of importing deviated and horizontal well data into said manipulable three-dimensional geological interpretations.

61. The method of claim 49, further comprising the step of importing well header data into said manipulable three-dimensional geological interpretations.

62. The method of claim 49, further comprising the step of importing interval data into said manipulable three-dimensional geological interpretations.

63. The method of claim 49, further comprising the step of importing pointset data into said manipulable three-dimensional geological interpretations.

64. The method of claim 49, further comprising the step of exporting grid and map data from said manipulable three-dimensional geological interpretations.

65. The method of claim 49, further comprising the step of graphical data querying and filtering in association with manipulation of said manipulable three-dimensional geological interpretations.

66. The method of claim 49, further comprising the step of adding three-dimensional editable pick representations in association with manipulation of said manipulable three-dimensional geological interpretations.

67. The method of claim 49, further comprising the step of interwell pick interpretation in association with manipulation of said manipulable three-dimensional geological interpretations.

68. The method of claim 49, further comprising the step of forming interwell cross-sectional definitions in association with manipulation of said manipulable three-dimensional geological interpretations.

69. The method of claim 49, further comprising the step of forming fixed spacing correlation representations of said predetermined geological region from said manipulable three-dimensional geological interpretations.

70. The method of claim 49, further comprising the step of performing three-dimensional stratigraphic thickness calculations in association with manipulation of said manipulable three-dimensional geological interpretations.

71. The method of claim 49, further comprising the step of displaying from the group consisting essentially of structure maps, isochore maps, and well log zone average maps in association with manipulation of said manipulable three-dimensional geological interpretations.

72. The method of claim 49, further comprising the step of displaying seismic slices of said predetermined geological region.

73. The method of claim 49, further comprising the step of manipulating net-to-gross maps based on well log cutoffs or calculated log curves for said predetermined geological region in association with manipulation of said manipulable three-dimensional geological interpretations.

74. The method of claim 49, further comprising the step of performing surface modeling of said predetermined geological region in association with manipulation of said manipulable three-dimensional geological interpretations.

75. The method of claim 49, further comprising the step of forming isochore visualizations of said predetermined geological region from both structural horizons and pointsets relating to said manipulable three-dimensional geological interpretations.

76. The method of claim 49, further comprising the step of calculating isochore pointsets of said predetermined geological region from said manipulable three-dimensional geological interpretations.

77. The method of claim 49, further comprising the step of forming visualizations of said predetermined geological region from said manipulable three-dimensional geological interpretations, said visualizations comprising graphical displays from the group consisting essentially of structure maps, isochores, and zone average maps.

78. The method of claim 49, further comprising the step of performing one-step conformable mapping operations for said predetermined geological region from said manipulable three-dimensional geological interpretations.

79. The method of claim 49, further comprising the step of performing one-step seismic tie to log pick operations on said predetermined geological region from said manipulable three-dimensional geological interpretations.

80. The method of claim 49, further comprising the step of tieing fault surfaces to fault-picks in selected wells of said predetermined geological region from said manipulable three-dimensional geological interpretations.

81. The method of claim 49, further comprising the step of performing recursive conformable mapping operations between multiple horizons of said predetermined geological region using said manipulable three-dimensional geological interpretations.

82. The method of claim 49, further comprising the step of forming overlay of external grid values onto three-dimensional structure maps of said predetermined geological region from said manipulable three-dimensional geological interpretations.

83. The method of claim 49, further comprising the step of performing interactive filtering of three-dimensional zone average distributions on said predetermined geological region from said manipulable three-dimensional geological interpretations.

84. The method of claim 49, further comprising the step of forming three-dimensional dip/azimuth pick displays for picks measured on said predetermined geological region using said manipulable three-dimensional geological interpretations.

85. The method of claim 49, further comprising the step of performing interactive three-dimensional datuming of seismic cross-sections and slices of said predetermined geological region from said manipulable three-dimensional geological interpretations.

86. The method of claim 49, further comprising the step of forming three-dimensional visualizations of well-to-well cross-sections for wells of said predetermined geological region from said manipulable three-dimensional geological interpretations.

87. The method of claim 49, further comprising the step of forming a set of fence diagrams of seismic backdrop cross-sections of said predetermined geological region from said manipulable three-dimensional geological interpretations.

88. The method of claim 49, further comprising the step of performing interactive seismic opacity filtering for a plurality of views of said predetermined geological region.

89. The method of claim 49, further comprising the step of forming stratigraphic slicing of three-dimensional seismic volumetric interpretations of said predetermined geological region.

90. The method of claim 49, further comprising the step of forming geomorphological slicing of three-dimensional seismic volumetric interpretations of said predetermined geological region.

91. The method of claim 49, further comprising the step of forming color-filled three-dimensional contours of said predetermined geological region from said manipulable three-dimensional geological interpretations.

92. The method of claim 49, further comprising the step of performing interactive filtering three-dimensional structure and zone average maps of said predetermined geological region from said manipulable three-dimensional geological interpretations.

93. The method of claim 49, further comprising the step of generating substitute curves for missing log curve data from said predetermined geological region.

* * * * *